(12) United States Patent
Russell et al.

(10) Patent No.: US 7,753,269 B2
(45) Date of Patent: *Jul. 13, 2010

(54) POS-BASED CODE DRIVEN RETAIL TRANSACTION SYSTEM CONFIGURED TO ENABLE THE READING OF CODE SYMBOLS ON CASHIER AND CUSTOMER SIDES THEREOF, DURING A RETAIL TRANSACTION BEING CARRIED OUT AT A POINT-OF-SALE (POS) STATION, AND DRIVEN BY A RETAIL TRANSACTION APPLICATION PROGRAM

(75) Inventors: Garrett Russell, Wilmington, DE (US); Mark Schmidt, Williamstown, NJ (US); Ronald Jackson, Williamstown, NJ (US); Sung Byun, Cherry Hill, NJ (US); Timothy A. Good, Clementon, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/805,837

(22) Filed: May 24, 2007

(65) Prior Publication Data

US 2007/0290043 A1 Dec. 20, 2007

Related U.S. Application Data

(63) Continuation of application No. 11/203,669, filed on Aug. 12, 2005, now abandoned, which is a continuation of application No. 10/348,195, filed on Jan. 16, 2003, now abandoned, which is a continuation-in-part of application No. 10/138,934, filed on May 3, 2002, now abandoned, and a continuation-in-part of application No. 10/053,486, filed on Jan. 16, 2002, now abandoned, and a continuation-in-part of application No. 10/045,577, filed on Jan. 11, 2002, now Pat. No. 6,918,540, and a continuation-in-part of application No. 10/045,605, filed on Jan. 11, 2002, now Pat. No. 6,830,190.

(51) Int. Cl.
*G06K 15/00* (2006.01)

(52) U.S. Cl. .................. 235/383; 235/375; 235/462.14; 235/385; 235/462.01; 235/462.13; 235/462.32; 235/462.43; 902/22; 902/30

(58) Field of Classification Search .................. 235/375, 235/383, 385, 462.01, 462.13, 462.14, 463.32, 235/462.43; 902/22, 30; 705/16, 17, 20, 705/21, 22, 23, 24, 25, 416; 177/25.15
See application file for complete search history.

(56) References Cited

U.S. PATENT DOCUMENTS 3,902,048 A 8/1975 Fleischer et al.

(Continued)

FOREIGN PATENT DOCUMENTS

| EP | 0 663 643 A2 | 7/1995 |
|---|---|---|
| WO | WO 99/01839 | 1/1999 |

OTHER PUBLICATIONS

"NCR Dynakey Advanced Retail Interface", copyright 2001 (no month available), 2 pages.*
Product Brochure for the Magellan SL 360-Degree Scanner/Scale by PSC Inc., Webster, NY, Feb. 2000, pp. 1-2.
2003 Search Report for International Application No. PCT/US03/01738.

*Primary Examiner*—Michael G Lee
*Assistant Examiner*—Kristy A Haupt
(74) *Attorney, Agent, or Firm*—Thomas J. Perkowski, Esq., P.C.

(57) ABSTRACT

Novel POS-based bar code symbol reading systems are disclosed having an integrated customer-kiosk terminal. Also disclosed are novel POS-Based Bar Code Reading Cash Register Systems having Integrated Internet-Enabled Customer-Kiosk Terminals.

13 Claims, 39 Drawing Sheets

U.S. PATENT DOCUMENTS

| | | | |
|---|---|---|---|
| 4,652,732 A | 3/1987 | Nicki | |
| 4,766,298 A | 8/1988 | Meyers | |
| 5,019,694 A | 5/1991 | Collins | |
| 5,042,619 A | 8/1991 | Kohno | |
| 5,083,638 A | 1/1992 | Schneider | |
| 5,153,585 A * | 10/1992 | Negishi et al. | 705/21 |
| 5,155,345 A | 10/1992 | Ito | |
| 5,206,491 A | 4/1993 | Katoh et al. | |
| 5,229,588 A | 7/1993 | Detwiler et al. | |
| 5,256,863 A * | 10/1993 | Ferguson et al. | 705/21 |
| 5,426,282 A | 6/1995 | Humble | |
| 5,459,308 A | 10/1995 | Detwiler et al. | |
| 5,491,328 A | 2/1996 | Rando | |
| 5,495,097 A | 2/1996 | Katz et al. | |
| 5,557,093 A | 9/1996 | Knowles et al. | |
| 5,684,289 A | 11/1997 | Detwiler et al. | |
| 5,691,528 A | 11/1997 | Wyatt et al. | |
| 5,723,852 A | 3/1998 | Rando et al. | |
| 5,754,655 A * | 5/1998 | Hughes et al. | 705/17 |
| 5,801,370 A * | 9/1998 | Katoh et al. | 235/462.01 |
| 5,834,708 A | 11/1998 | Svetal et al. | |
| 5,837,988 A | 11/1998 | Bobba et al. | |
| 5,838,536 A | 11/1998 | Miyazawa et al. | |
| 5,869,827 A | 2/1999 | Rando | |
| 5,886,336 A * | 3/1999 | Tang et al. | 235/462.43 |
| 5,950,173 A | 9/1999 | Perkowski | |
| 6,098,885 A | 8/2000 | Knowles et al. | |
| 6,112,857 A | 9/2000 | Morrison | |
| 6,167,381 A | 12/2000 | Swaine et al. | |
| 6,179,206 B1 * | 1/2001 | Matsumori | 235/383 |
| 6,213,397 B1 | 4/2001 | Rando | |
| 6,223,986 B1 | 5/2001 | Bobba et al. | |
| 6,237,852 B1 | 5/2001 | Svetal et al. | |
| 6,244,510 B1 * | 6/2001 | Ring et al. | 235/462.43 |
| 6,325,290 B1 | 12/2001 | Walter et al. | |
| 6,330,973 B1 | 12/2001 | Bridgelall et al. | |
| 6,354,498 B1 | 3/2002 | Lutz | |
| 6,363,366 B1 | 3/2002 | Henty | |
| 6,427,915 B1 | 8/2002 | Wilke, Jr. et al. | |
| 6,457,644 B1 | 10/2002 | Collins, Jr. et al. | |
| 6,502,749 B1 * | 1/2003 | Snyder | 235/383 |
| 6,539,422 B1 * | 3/2003 | Hunt et al. | 709/217 |
| 6,588,549 B2 * | 7/2003 | Wike et al. | 186/61 |
| 6,834,596 B2 * | 12/2004 | Kerber | 108/42 |
| 6,974,084 B2 | 12/2005 | Bobba et al. | |
| 2001/0017320 A1 | 8/2001 | Knowles et al. | |
| 2002/0015055 A1 | 2/2002 | Foran | |
| 2002/0085007 A1 | 7/2002 | Nelson et al. | |

\* cited by examiner

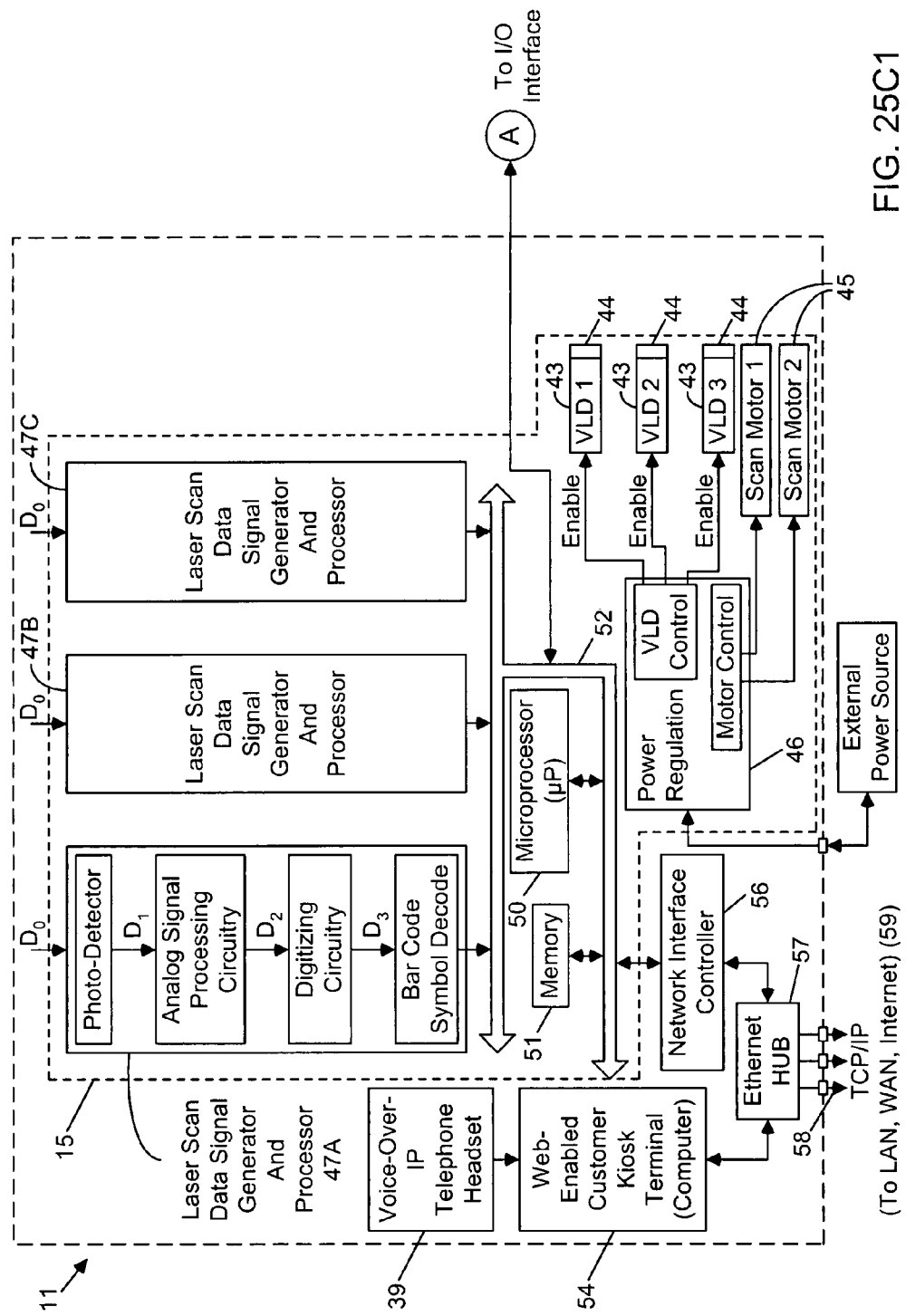
FIG. 25C1

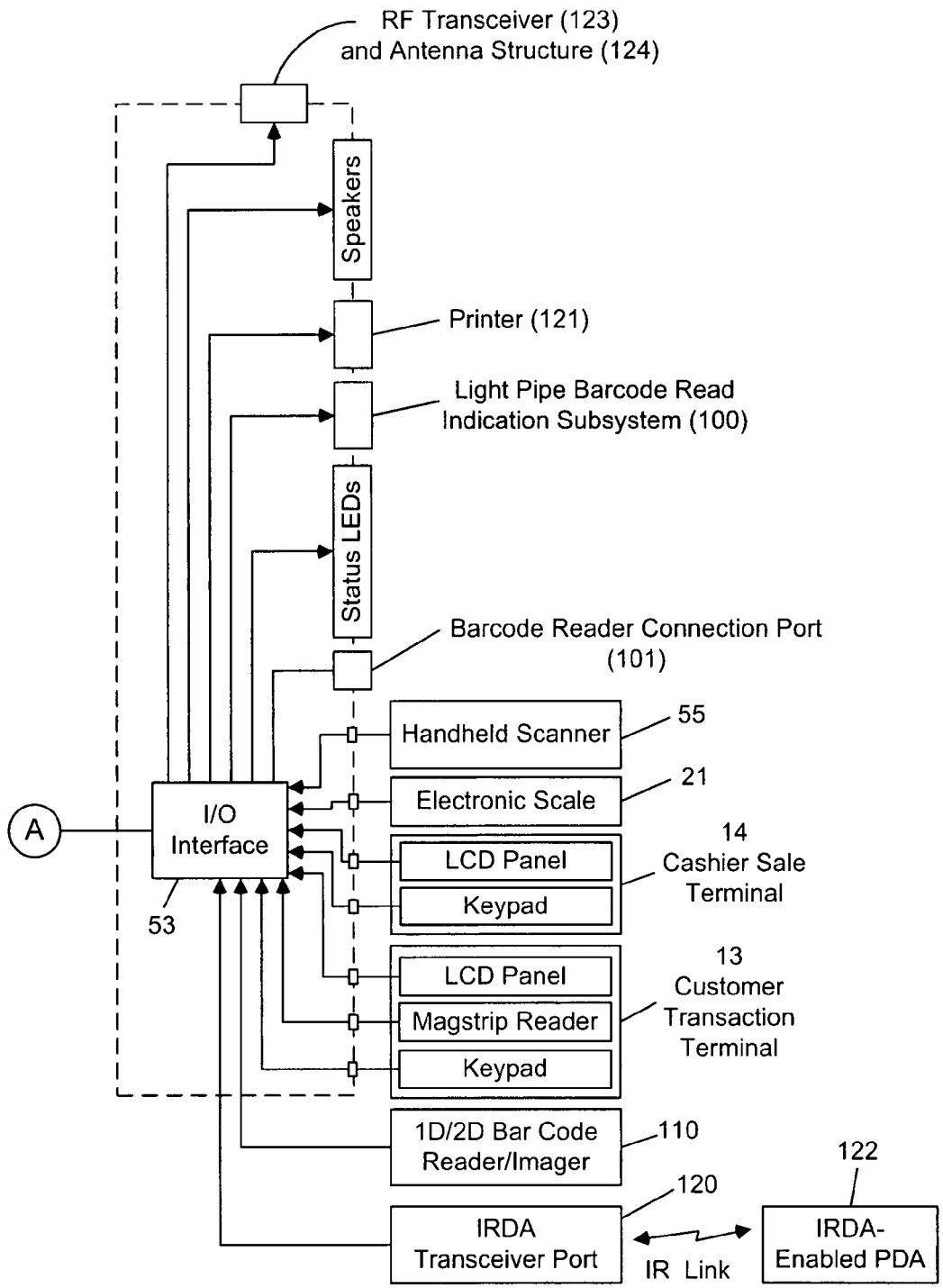
FIG. 25C2

POS-BASED CODE DRIVEN RETAIL TRANSACTION SYSTEM CONFIGURED TO ENABLE THE READING OF CODE SYMBOLS ON CASHIER AND CUSTOMER SIDES THEREOF, DURING A RETAIL TRANSACTION BEING CARRIED OUT AT A POINT-OF-SALE (POS) STATION, AND DRIVEN BY A RETAIL TRANSACTION APPLICATION PROGRAM

CROSS-REFERENCE TO RELATED U.S. APPLICATIONS

This is a Continuation of application Ser. No. 11/203,669 filed Aug. 12, 2005 now abandoned; which is a Continuation of application Ser. No. 10/348,195 filed Jan. 16, 2003 now abandoned; which is a Continuation-in-Part of application Ser. Nos. 10/138,934 filed May 3, 2002 now abandoned; 10/053,486 filed Jan. 16, 2002 now abandoned; 10/045,577 filed Jan. 11, 2002 now U.S. Pat. No. 6,918,540; application Ser. No. 10/045,605 filed Jan. 11, 2002 now U.S. Pat. No. 6,830,190; each of said Applications being owned by Assignee, Metrologic Instruments, Inc., of Blackwood, N.J., and incorporated herein by reference as if fully set forth herein.

BACKGROUND OF INVENTION

1. Field of Invention

The present invention relates to retail point of sale (POS) scanning and checkout systems which enable retail cashiers to check out goods and services for purchase, while enabling customers to verify the price of products being purchased as they are being scanned, and also learn about consumer products and services offered by retailers through advertisements, promotions and other forms of electronic-education delivered to consumers at a POS-based checkout counter, and receive additional customer services which create value and help improve the quality of life.

2. Brief Description of the State of the Art

POS-based checkout systems of the type illustrated in FIG. 1 are well known in the art and appear to be setting standards in the retail industry, particularly in high-volume checkout applications such as supermarkets, discount stores, superstores, and the like. Such POS-based checkout systems have either a projection-type or a bioptical laser scanner mounted in the countertop between the cashier, who stands on one side of the checkout counter, and the customer, who stands on the other side thereof during checkout operations.

At the checkout system 1 shown in FIG. 1, purchase items are automatically identified by the laser scanning bar code reader 2 as the cashier moves the items in the direction towards the package area where the scanned items are bagged. Automatically the price of each scanned item is displayed on a price display monitor 3 typically located above the cash register terminal 4 in a direction facing away from the item movement direction, illustrated in FIG. 1. Conventional checkout counter arrangements of such design render it difficult for customers to visually track scanned items with their purchased price information being displayed on the price verification display monitor 3. Visual tracking becomes even more difficult when large checkout lines are formed and the cashier is pressured to scan purchase items at the highest speeds humanly possible. In such instances, the customer is typically resigned to accept that scanned items have been properly marked with correct price information, as price verification on the display 3 by the customer is virtually impossible if and when the slightest distraction occurs along the checkout counter. When the customer is accompanied by children, visual price verification tends to become even more difficult.

As shown in FIG. 1, a conventional courtesy stand 5 often straddles POS-based projection and/or bioptical laser scanner 2, and provides support for an ATM device 6 and its accompanying mag-stripe reader 7. Typically, this scanner/ATM arrangement occupies a large amount of valuable space at the retail checkout counter, and generally detracts from the overall appearance of the checkout counter where products and produce are purchased and sold.

Moreover, while most price verification display monitors 3 located above the cash register terminal are capable of displaying advertisements and promotions to the customers as they checkout their product purchases, such monitors are not capable of performing any other functions in conventional POS-based checkout environments.

Also, the LED indicator lights and audible transducers used in conventional POS based scanners, to indicate that a scanned bar code symbol has been successful scanned and decoded (i.e. read), generally detract from the aesthetic qualities of conventional POS based systems and overall end-user experience enabled at POS-based checkout environments.

Thus, there is a great need in the art for improved POS-based bar code reading systems that are capable of satisfying the diverse requirements of modern checkout operations conducted in physical retail environments, while avoiding the shortcomings and drawbacks of prior art POS-based systems and methodologies.

OBJECTS AND SUMMARY OF THE INVENTION

Accordingly, a primary object of the present invention is to provide a novel POS-based bar code symbol reading system having an integrated customer-kiosk terminal, and being essentially free of the shortcomings and drawbacks of prior art POS-based systems and methodologies.

Another object of the present invention is to provide a novel POS-based bar code reading system with an integrated customer-kiosk terminal is installed in the countertop surface so that (i) the cashier is capable of entering product price information into the computer-based cash register system during the check-out of weighed purchase items, while (ii) the customer is able to view the price, weight and item-identity data of scanned items on the LCD panel located on the customer side of the system.

Another object of the present invention is to provide a novel POS-based bar code reading system with an integrated Internet-enabled customer-kiosk terminal, wherein a POS-based bioptical laser scanning bar code reading unit is integrated with a cashier-scale-terminal/customer-kiosk-terminal module via a housing interconnection technique, and wherein the POS-based bioptical scanning unit supports a produce weigh tray having a recessed surface region for slidably receiving the full weight of produce items under gravitational loading so that the full weight of the produce items to be purchased is accurately measured by an electronic produce scale integrated within the bottom portion of the POS-based bioptical scanning unit.

Another object of the present invention is to provide a novel POS-based bar code reading system with an integrated Internet-enabled customer-kiosk terminal, wherein its ATM submodule is removably detachable from a first installation port provided on the right side of the cashier-scale-terminal/customer-kiosk-terminal module, and its voice-over-IP courtesy phone submodule is removably detachable from a second installation port provided on the left side of the cashier-scale-terminal/customer-kiosk-terminal module.

Another object of the present invention is to provide a novel POS-based bar code reading system with an integrated Internet-enabled customer-kiosk terminal, wherein the cashier at the POS station faces the vertical scanning window of a POS-based bioptical laser scanning bar code reading unit as well as a cashier-scale-terminal (with LCD panel and membrane keyboard) provided on the cashier's side of the POS-based laser scanning bar code reading system, while the customer faces (i) an Internet-enabled customer-kiosk terminal (with LCD panel and touch-screen keyboard integrated therewith) provided on the cashier's side of the system, as well as (ii) the financial transaction terminal associated with the ATM submodule, (iii) the hand-set associated with the voice-over-IP phone module, and (iv) the courtesy desk surface disposed beneath the customer-kiosk transaction terminal.

Another object of the present invention is to provide such a POS-based bar code reading system with an integrated Internet-enabled customer-kiosk terminal, wherein the cashier-scale-terminal is provided with an integrated 2-D bar code symbol reader located on the cashier's side of the terminal, for the purpose of reading 2-D bar code symbols applied on various types of substrates such as, for example, personal identification cards bearing identification photographs.

Another object of the present invention is to provide a POS-based bar code driven retail transaction terminal system, wherein both the cashier and customer interact with each other and with touch-screen driven LCD screens, on which graphical user interfaces (GUIs) are automatically and sequentially displayed in accordance with a cashier-clerk/customer interaction script automatically generated by a cashier-clerk/customer retail transaction application running on the computing platform driving the POS-based retail transaction terminal system.

Another object of the present invention is to provide such a POS-based bar code driven retail transaction terminal system, wherein the behavioral interaction of both the cashier/salesclerk and the customer are automatically guided under the retailer's service script driving the cashier/customer interactive transaction terminal so as to ensure that a predetermined quality of customer service is delivered to the customer by the retail cashier/salesclerk at the retailer POS station while permitting a high degree of improvisation naturally demanded by customers and retail cashiers and clerks (i.e. retail service personnel).

Another object of the present invention is to provide such a POS-based bar code driven retail transaction terminal system, wherein retailer's service script comprises corresponding sets of visual and/or graphical instructions that are sequentially displayed on the LCD panels on the cashier's side and the customer's side of the terminal system, respectively, cuing the cashier/clerk to make initiatives and conversation about particular phases of the retail transaction being carried out at the terminal system and/or particular kinds of services being offered by the retailer at the POS-based terminal station, and also cuing the customer to respond to such initiatives and conservation in a pleasant and enjoyable manner.

Another object of the present invention is to provide such a POS-based bar code driven retail transaction terminal system, wherein retailer's service script further comprises the display of motivational and/or inspiring quotes and/or imagery on the LCD panels both the cashier and customer sides of the terminal system, so as to encourage positive attitudes, cordial responses and compassionate levels human interaction within the retail store, as well as a sense of well being and value experienced at the POS-based terminal system.

Another object of the present invention is to provide such a dual-LCD panel type cashier/customer POS-based retail transaction terminal system, wherein a receipt printer is provided on the customer side of the terminal system for printing out receipts for the various kinds of retail transactions and services supported by the system.

Another object of the present invention is to provide such a dual-LCD panel type cashier/customer POS-based retail transaction terminal system, wherein a wireless 2-way RF transceiver is installed within the system housing so that the system can function as a base station for enabling 2-way RF-based data communication with a plurality of wireless RF-enabled portable data communication terminals (PDTs) or portable digital assistants (PDAs).

Another object of the present invention is to provide such a dual-LCD panel type cashier/customer POS-based retail transaction terminal system, wherein an IrDA data communication port is provided on the customer side of the terminal system for uploading/receiving digital data associated with electronic coupons that have been transmitted from the IrDA data communications port of the customer's PDA to the IrDA communication port on the customer side of the terminal system at a prespecified time during the retailer's transaction script.

Another object of the present invention is to provide such a dual-LCD panel type cashier/customer POS-based retail transaction terminal system, wherein the electronic coupons are stored within the customer's IrDA-enabled PDA in response to reading the UPC product codes on products either within or outside of the retailer's store, and that these electronic coupons represent the right of the customer who collects the same to receive a rebate from product manufacturer and/or retailer on the purchase price of the product.

Another object of the present invention is to provide such a POS-based bar code reading system with an integrated Internet-enabled customer-kiosk terminal, wherein a LED-driven light-pipe based bar code read indication subsystem is mounted through the system housing so that both the cashier and customer alike can be visually cued (i.e. alarmed) each time a scanned bar code symbol has been successfully scanned and decoded (i.e. read), in an aesthetically pleasing, if not beautiful manner, to the enjoyment of the cashier and customer at the POS station.

Another object of the present invention is to provide such a POS-based bar code reading system with an integrated Internet-enabled customer-kiosk terminal, wherein the customer-kiosk terminal is provided with an integrated 2-D bar code symbol reader provided on the cashier's side of the terminal.

Another object of the present invention is to provide a novel POS-based bar code reading system with an integrated Internet-enabled customer-kiosk terminal, wherein, the display screen associated with the customer kiosk terminal is provided with an advertisement/promotion mode of display operation so that it is capable of displaying advertisements and promotions (of the hosting retailer or other retailers) while the cashier is not scanning products and the price and product information thereof is being displayed during its price/product information display mode.

Another object of the present invention is to provide a novel POS-based bar code reading system with an integrated Internet-enabled customer-kiosk terminal, wherein such advertising and promotions can relate to the products offered for sale in the hosting retailer store, services and products offered for sale in local and/or regional markets, as well as community news, sporting events, recreational events as well as local educational programs and the like.

Another object of the present invention is to provide a novel POS-based bar code reading system with an integrated Internet-enabled customer-kiosk terminal, comprising: a plurality of VLDs, light focusing optics, scanning motors and scanning optics for producing and scanning laser scanning beams so as to project a laser scanning pattern through the horizontal and vertical scanning windows of the system, and scan bar codes on objects being moved past these windows by the cashier, and light collection optics for collecting the focusing the return laser light signal for subsequent photodetection; a plurality of laser scan data generator and processing modules including a plurality of photodetectors, for producing scan data signals, that are ultimately decode-processed in order to produce symbol character data representative of the bar code symbol scanned by the system; a microprocessor, memory architecture, system bus architecture (having different levels of buses) and an I/O interface connected to such buses for enabling the collection, processing and transport of data elements generated by the various components in the system; a cashier-scale terminal having a LCD panel, keypad and associated circuitry; a customer-transaction terminal (i.e. having a LCD panel, a keypad, a magstripe reader, and associated circuitry); Internet-enabled customer-kiosk terminal (i.e. computer subsystem) realized as a microcomputing system running an operating system (OS), networking software to support the TCP/IP protocol, Internet access software (e.g. Web browser software such as Microsoft Explorer) to access the WWW and other information resources on the Internet, and peripheral hardware and software components such as a LCD panel, touch-screen keypad mounted thereon, and a speech/voice recognition interface and a bar code symbol reader integrated with the microcomputing system; a voice-over-IP telephone handset integrated with the microcomputing system, and having software components running thereon to support its voice communication functions over the Internet, or alternatively, over a Public Telecommunications Switching Network (PTSN) in a manner known in the art; a network interface controller (NIC) card operably connected to system bus architecture, for enabling data packet communications over an packet-switched information network (e.g. Internet); an multiport Ethernet hub device connected to the NIC card and the Internet-enabled customer-kiosk terminal, so that entire POS-based bar code reading system with Internet-enabled customer-kiosk terminal has one or more Ethernet data ports for operable connection to a TCP/IP network such as a retail LAN which, in turn, is connected to the Internet.

Another object of the present invention is to provide a novel POS-based bar code reading system with an integrated Internet-enabled customer-kiosk terminal, which comprises a POS-based bioptical laser scanning bar code reading unit integrated with a cashier-scale-terminal/customer-kiosk-terminal unit and contained in a housing of generally unitary construction.

Another object of the present invention is to provide a novel POS-based bar code reading cash register system with an integrated Internet-enabled customer-kiosk terminal, comprising a POS-based bottom-type bar code reading unit which is integrated with a cashier-scale-transaction-terminal/customer-kiosk-terminal unit and enclosed in a scanner/kiosk housing of unitary construction.

Another object of the present invention is to provide such novel POS-based bar code reading cash register system, wherein an electronically-controlled cash drawer is operably associated with the system, and mountable beneath a counter surface in a manner well known in the art.

Another object of the present invention is to provide a novel POS-based bar code reading cash register system with an integrated and Internet-enabled customer-kiosk terminal, comprising: a cashier transaction terminal (with a LCD panel and a membrane keyboard) provided on the cashier's side of the system; a customer-kiosk transaction terminal (with a LCD panel and a touch-screen keyboard integrated therewith) supported on a customer-transaction module on the customer's side of the system; a transaction terminal associated with an ATM submodule mounted to a first side of the scanner/kiosk housing; a hand-set associated with the voice-over-IP phone module mounted to the second side of the scanner/kiosk housing; and a courtesy desk surface disposed beneath the customer-kiosk transaction terminal.

Another object of the present invention is to provide such a POS-based bar code reading cash register system with an integrated Internet-enabled customer-kiosk terminal, wherein the cashier-transaction terminal is provided with an integrated 2-D bar code symbol reader located on the cashier's side of the terminal, for the purpose of reading 2-D bar code symbols applied on various types of substrates such as, for example, personal identification cards bearing identification photographs.

Another object of the present invention is to provide such a POS-based bar code reading cash register system with an integrated Internet-enabled customer-kiosk terminal, wherein a LED-driven light-pipe based bar code read indication subsystem is mounted through the system housing so that both the cashier and customer alike can be visually cued (i.e. alarmed) each time a scanned bar code symbol has been successfully scanned and decoded (i.e. read), in an aesthetically pleasing, if not beautiful manner, to the enjoyment of the cashier and customer at the POS station.

Another object of the present invention is to provide a novel POS-based bar code reading cash register system with an integrated and Internet-enabled customer-kiosk terminal, comprising: a plurality of VLDs, light focusing optics, scanning motors and scanning optics for producing and scanning laser scanning beams so as to project a laser scanning pattern through the horizontal scanning window of the system, and scan bar codes on objects being moved thereby by the cashier, and light collection optics for collecting the focusing the return laser light signal for subsequent photodetection; a plurality of laser scan data generator and processing modules including a plurality of photodetectors, for producing scan data signals, that are ultimately decode-processed in order to produce symbol character data representative of the bar code symbol scanned by the system; a microprocessor, memory architecture, system bus architecture (having different levels of buses) and an I/O interface connected to such buses for enabling the collection, processing and transport of data elements generated by the various components in the system; a cashier-scale-transaction terminal having a LCD panel, keypad and associated circuitry, for entering and processing information relating to (i) purchase items to be weighed by the electronic scale subsystem, as well as (ii) customer information enabling a consumer transaction to be transacted at the system, and enable the opening of the electronically-controlled cash drawer during the appropriate stage of the consumer transaction; a customer-transaction terminal (i.e. having a LCD panel, a keypad, a magstripe reader, and associated circuitry); Internet-enabled customer-kiosk terminal (i.e. computer subsystem) realized as a microcomputing system running an operating system (OS), networking software to support the TCP/IP protocol, Internet access software (e.g.

Web browser software such as Microsoft Explorer) to access the WWW and other information resources on the Internet, and peripheral hardware and software components such as a LCD panel, touch-screen keypad mounted thereon, and a speech/voice recognition interface and a bar code symbol reader integrated with the microcomputing system; a voice-over-IP telephone handset integrated with the microcomputing system, and having software components running thereon to support its voice communication functions over the Internet, or alternatively, over a Public Telecommunications Switching Network (PTSN) in a manner known in the art; a network interface controller (NIC) card operably connected to system bus architecture, for enabling data packet communications over an packet-switched information network (e.g. Internet); an multiport Ethernet hub device connected to the NIC card and the Internet-enabled customer-kiosk terminal so that entire POS-Based Bar Code Reading System With Internet-Enabled Customer-Kiosk Terminal has one or more Ethernet data ports for operable connection to a TCP/IP network such as a retail LAN which, in turn, is connected to the Internet.

Another object of the present invention is to provide a novel POS-based bar code reading cash register system with an integrated and Internet-enabled customer-kiosk terminal, wherein by virtue of its novel construction, the POS-based bar code reading cash register system with an integrated Internet-enabled customer-kiosk Terminal is capable of performing all of the functions enabled by prior art POS-based checkout counter systems, with the advantage that the system of the present invention does so in a system form factor having a unitary construction that occupies only a fraction of the space required by the prior art, while enabling a variety of Internet-based services that offer real value to customers as they are checking out their purchase items.

Another object of the present invention is to provide a novel POS-based bar code reading cash register system with an integrated and Internet-enabled customer-kiosk terminal, wherein a POS-based vertical/projection-type laser scanning bar code reading unit is integrated with a cashier-transaction-terminal/customer-kiosk-terminal unit which are enclosed in a housing of unitary construction.

Another object of the present invention is to provide such a novel POS-based bar code reading cash register system with an integrated and Internet-enabled customer-kiosk terminal, wherein an electromagnetic-based demagnetization coil structure is contained with a thin support base plate, for demagnetizing product security tags, labels and the like during retail checkout operations.

Another object of the present invention is to provide such a novel POS-based bar code reading cash register system with an integrated and Internet-enabled customer-kiosk terminal, wherein an electronically-controlled cash drawer which can be mounted beneath a counter surface, is operably associated with the system.

Another object of the present invention is to provide a novel POS-based checkout station embodying any one of the POS-based bar code reading systems disclosed herein Another object of the present invention is to provide a novel method of checking out products and produce items in a retail store environment.

Another object of the present invention is to provide a novel method of displaying product and service advertisements in physical retail store environments, while customers checkout their purchased items.

These and other objects of the present invention will become apparent hereinafter and in the Claims to Invention.

BRIEF DESCRIPTION OF THE DRAWINGS

In order to more fully understand the Objects of the Present Invention, the following Detailed Description of the Illustrative Embodiments should be read in conjunction with the accompanying Figure Drawings in which:

FIGS. 25C1 and 25C2, taken together, set forth a block-schematic representation of the system diagram of the POS-based bar code reading system shown in FIGS. 24A through 24C.

DETAILED DESCRIPTION OF THE ILLUSTRATIVE EMBODIMENTS OF THE PRESENT INVENTION

Figure 1:
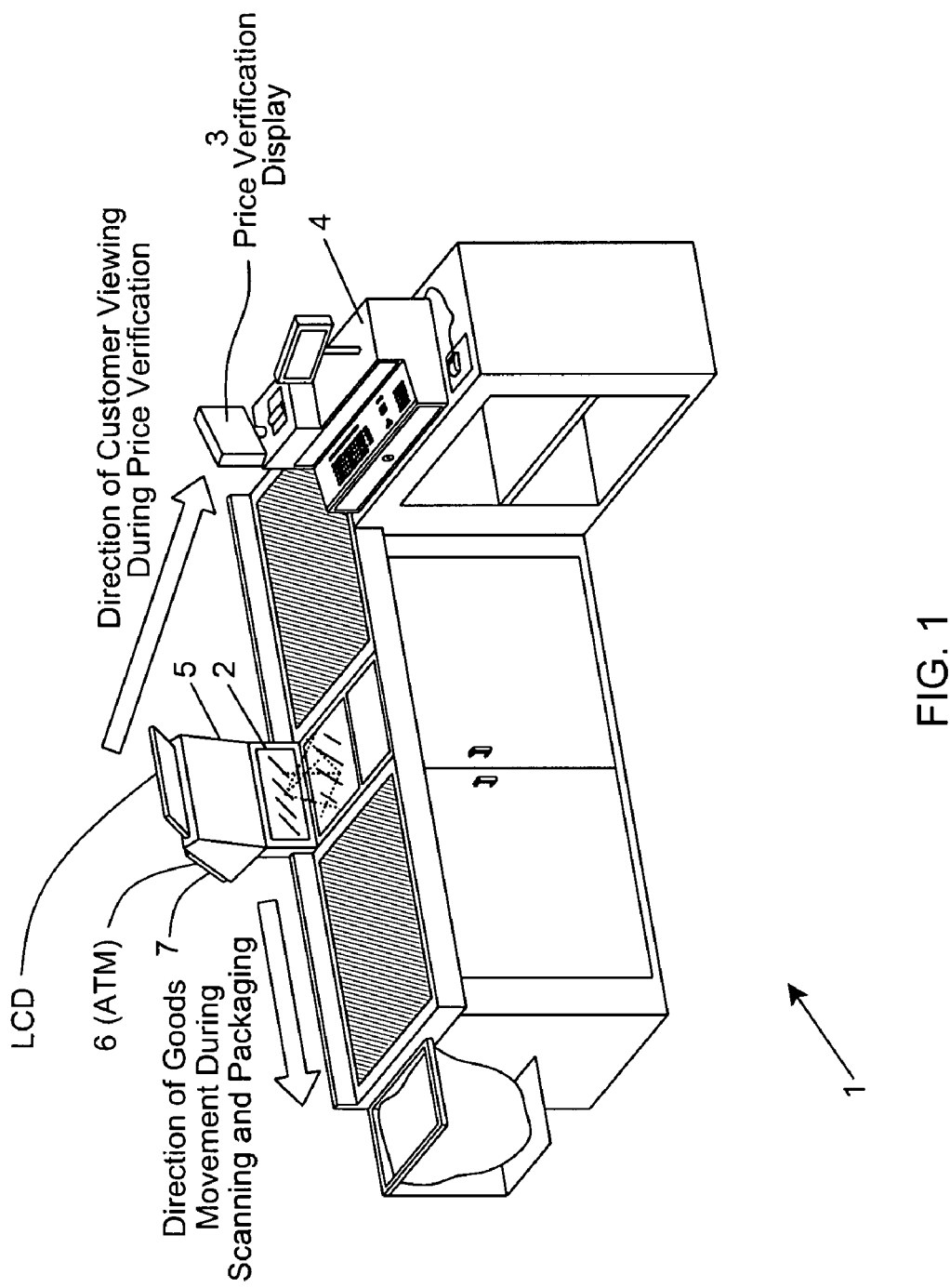
FIG. 1 is a schematic representation of a conventional (i.e. prior art) POS checkout station, wherein (i) a projection-type or bioptical-type laser-scanning bar code symbol reading system with an integrated electronic produce scale subsystem is installed within the countertop surface (e.g. between a pair of conveyor belts), (ii) a customer courtesy stand straddles the laser scanner and supports an ATM terminal on the customer side of the checkout counter, whereas a cashier scale terminal (comprising a LCD panel and keyboard) is supported on the cashier side of the counter to enable the cashier to enter (i.e. key) information into the system about products and produce items to be weighed by the electronic scale subsystem, and (iii) a computer-based cash register system having a customer-viewable price-verification and advertisement display panel which is installed on the cashier side of the check-out counter away from but interfaced with the bar code scanning system and electronic product scale subsystem.

Referring now to the figure drawings, the Objects of the Present Invention will be best understood by reading the following Detailed Description Of the Illustrative Embodiments in conjunction with the appended Drawings, wherein like structures and elements are indicated by like reference numerals.

Figure 2:
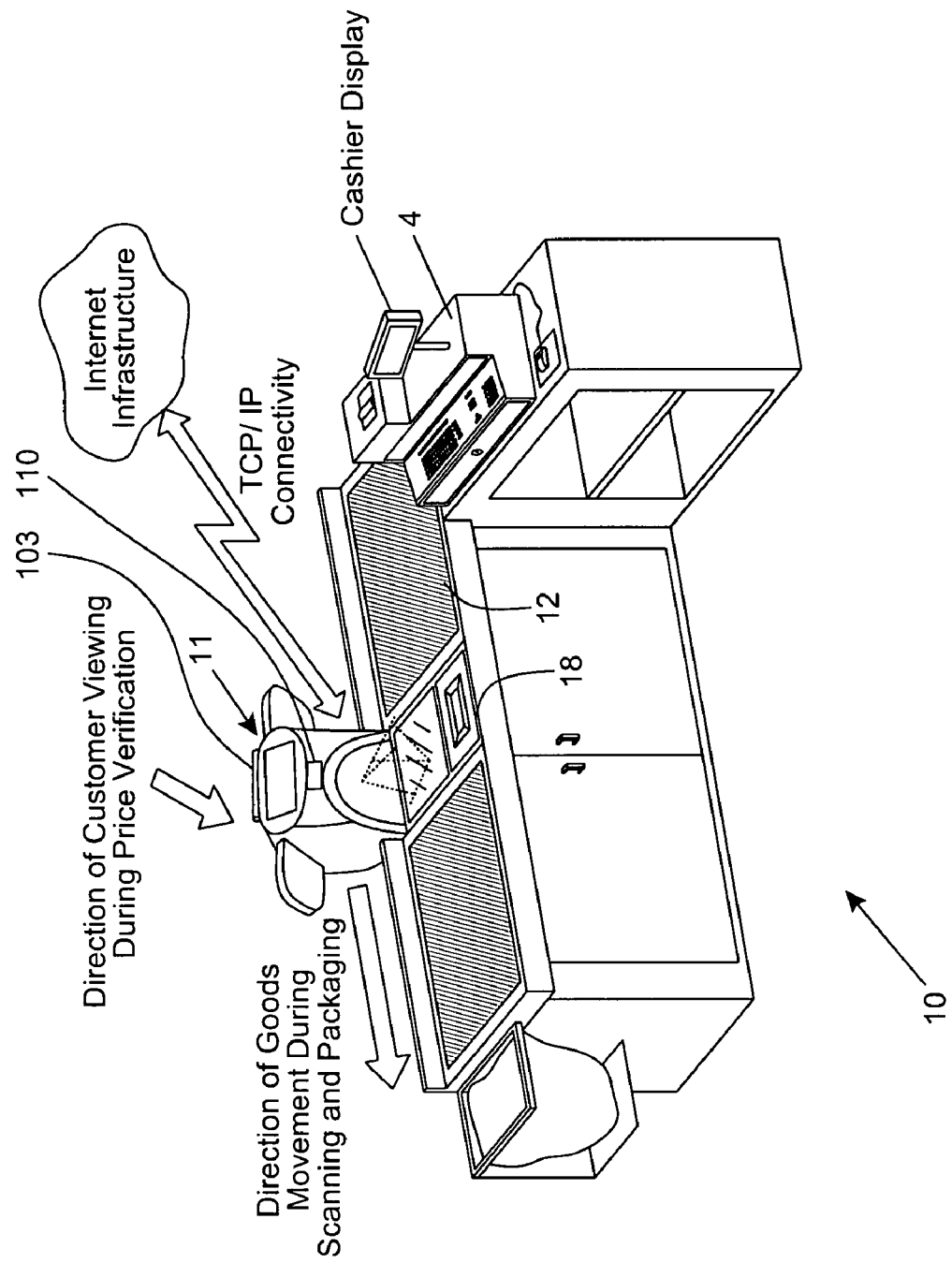
FIG. 2 is a schematic representation of a POS-based check-out station configured in accordance with the principles of the present invention, wherein a first illustrative embodiment of the POS-based bar code reading system with an integrated customer-kiosk terminal is shown installed in the countertop surface so that (i) the cashier is capable of entering product price information into the computer-based cash register system during the check-out of weighed purchase items, while (ii) the customer is able to view the price, weight and item-identity data of scanned items on the LCD panel located on the customer side of the system.

First Illustrative Embodiment of the POS-Based Laser Scanning Bar Code Reading System with an Integrated Internet-Enabled Customer-Kiosk Terminal of the Present Invention In FIG. 2, there is shown a POS-based checkout station 10 configured in accordance with the principles of the present invention. In this checkout station design, a first illustrative embodiment of the POS-based bar code reading system with internet-enabled customer-kiosk terminal 11 is shown. This system is installed in a countertop surface 12 so that (i) the cashier is capable of entering product price information into the system 4 via a cashier-scale terminal 14 during the checking out of weighed purchase items, while (ii) the customer is able to view the product price, weight and identity information about scanned items on the LCD panel 13 located on the customer side of the system. While the first illustrative embodiment of the POS-based bar code reading system with an integrated internet-enabled customer-kiosk terminal 11 is shown installed within a POS-based checkout station 10, it is understood that all other embodiments of the POS-based bar code reading system of the present invention disclosed herein can be installed and used within such a retail environment with or without modification.

Figure 3A:
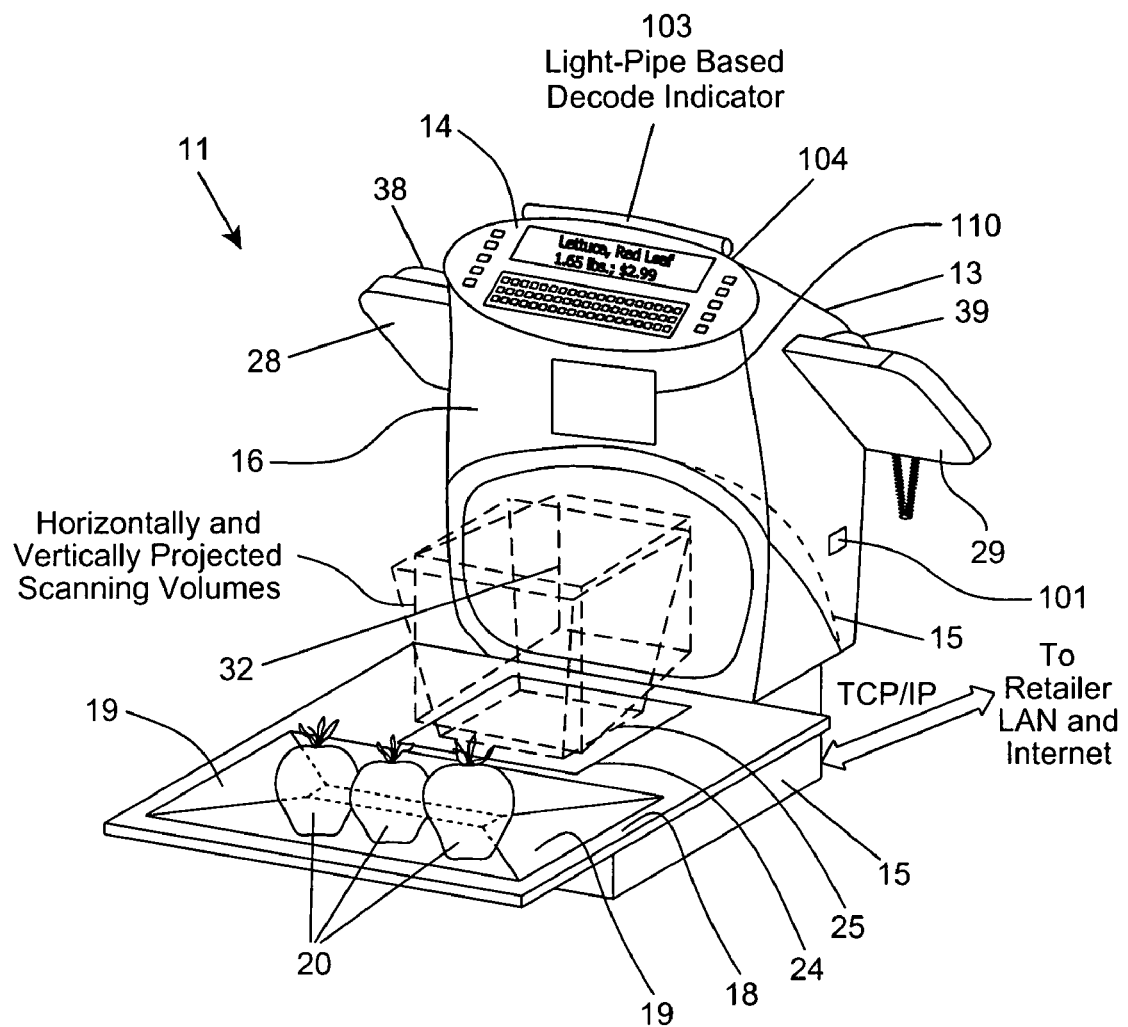
FIG. 3A is a perspective view of the first illustrative of the POS-based bar code reading system with an integrated Internet-enabled customer-kiosk terminal, showing a POS-based bioptical laser scanning bar code reading unit integrated with a cashier-scale-terminal/customer-kiosk-terminal module via a housing interconnection technique, wherein the POS-based bioptical scanning unit supports a produce weigh tray having a recessed surface region for slidably receiving the full weight of produce items under gravitational loading so that the full weight of the produce items to be purchased is accurately measured by an electronic produce scale integrated within the bottom portion of the POS-based bioptical scanning unit.
Figure 4A:
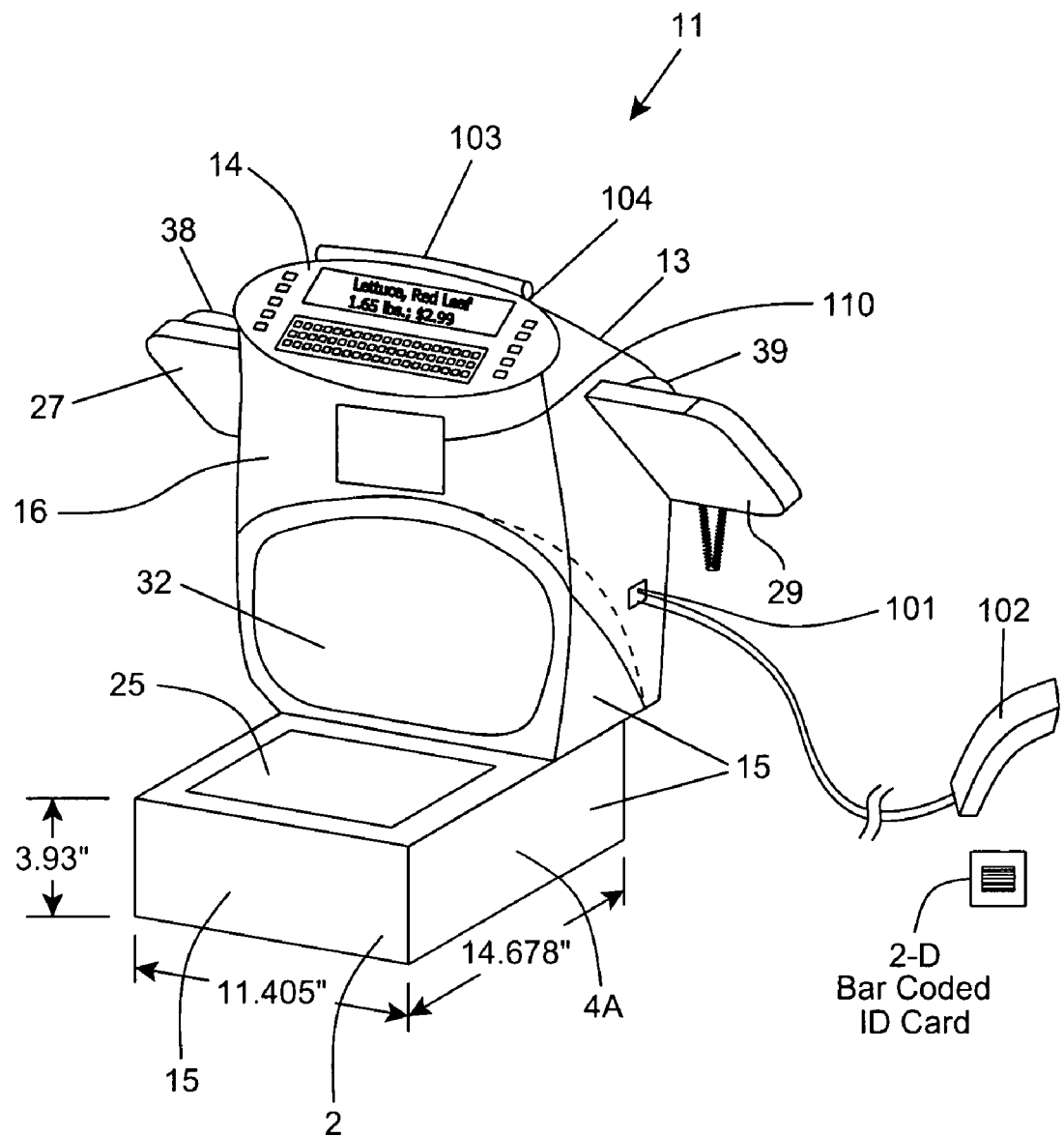
FIG. 4A is a perspective view of the first illustrative embodiment of the POS-based bar code reading system with an integrated Internet-enabled customer-kiosk system terminal in FIGS. 3A and 3B, wherein the Produce Weigh Tray thereof is shown removed from the electronic produce scale integrated therewith.
Figure 4B:
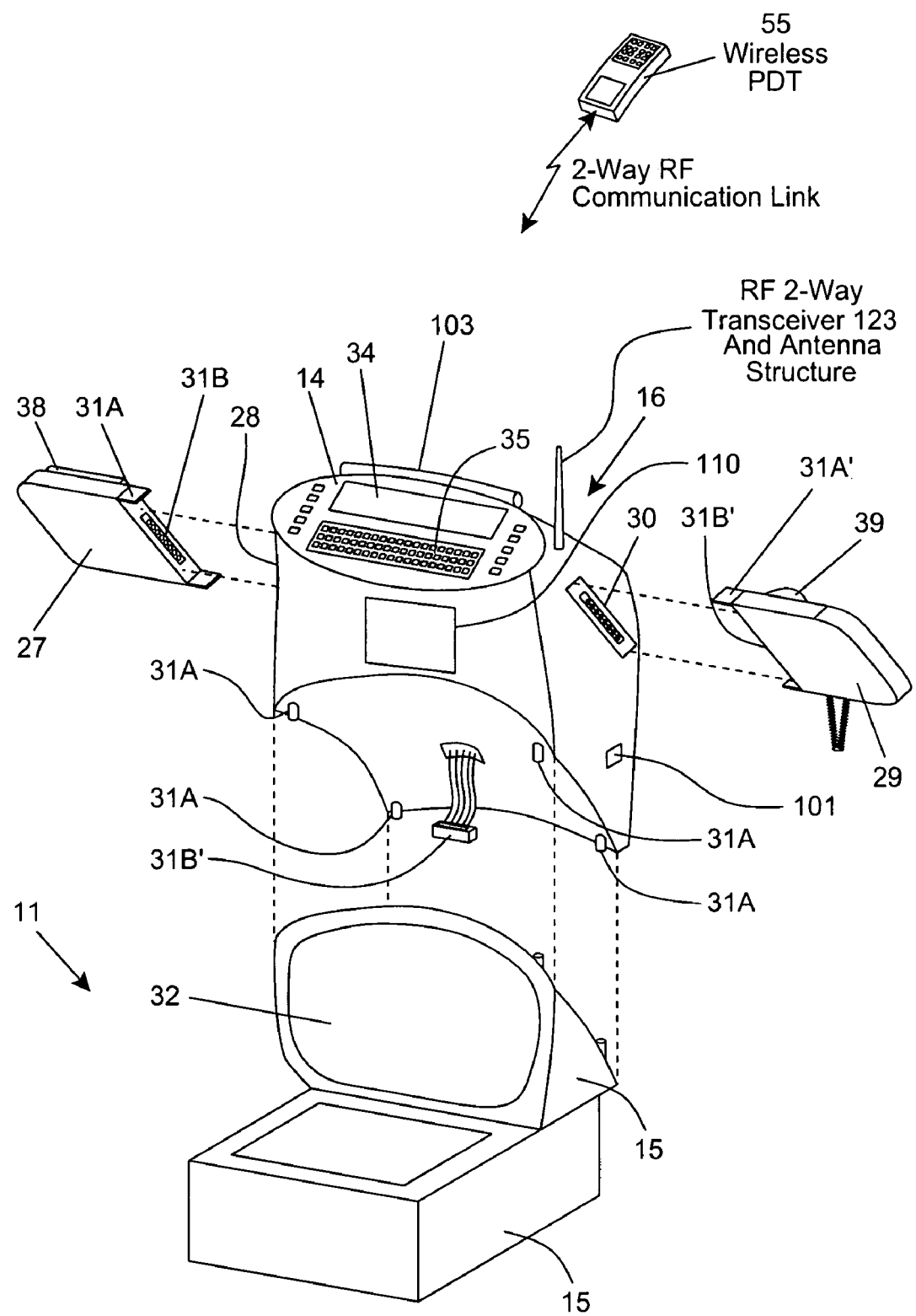
FIG. 4B is a partially exploded diagram of the POS-based bar code reading system with an integrated Internet-enabled customer-kiosk terminal illustrated in FIG. 4A, showing the cashier-scale-terminal/customer-kiosk-terminal module removably detached from its POS-based bioptical laser scanning bar code reading unit, and its ATM submodule removably detached from a first installation port provided on the right side of the cashier-scale-terminal/customer-kiosk-terminal module and its voice-over-IP courtesy phone submodule removably detached from a second installation port provided on the left side of the cashier-scale-terminal/customer-kiosk-terminal module.

As shown in FIG. 3A, POS-based bar code reading system with an integrated internet-enabled customer-kiosk terminal 11 comprises a POS-based bioptical laser scanning bar code reading unit 15 integrated with a cashier-scale-terminal/customer-kiosk-terminal module 16 using housing interconnection techniques shown in FIG. 4B. The POS-based bioptical laser scanning bar code reading unit 15 can be realized using any of the products taught in copending application Ser. Nos. 09/990,585 filed Nov. 21, 2001; 09/999,687 filed Oct. 31, 2001; 09/954,477 filed Sep. 17, 2001; and 09/551,887 filed Apr. 18, 2000, and International Application PCT/US01/44011 filed Nov. 21, 2001, published by WIPO as WO 02/43195 A2; each incorporated herein by reference.

As shown in FIG. 3A, the POS-based bar code reading system 11 is provided with an integrated 2-D bar code symbol reader 110 (and/or imager) located on the cashier's side of the terminal. The purpose of the 2-D bar code symbol reader 110 is to enable the reading of 2-D bar code symbols and optical characters applied on various types of substrates such as, for example, personal identification cards, the holders of which may be required to present by law when entering into particular kinds of consumer transactions (e.g. purchase of alcoholic beverages, tobacco, firearms, ammunition, and other controlled substances). Exemplary 1D/2D bar code symbol readers and linear and area type imagers 110 are disclosed in U.S. Pat. Nos. 6,347,163; 6,123,262; 6,036,094; 5,988,505; 5,621,203; and 5,523,552; as well as in copending application Ser. No. 09/990,585, and International Application PCT/US01/44011 filed Nov. 21, 2001, published by WIPO as WO 02/43195 A2 each said reference being incorporated herein by reference in its entirety.

Figure 3B:
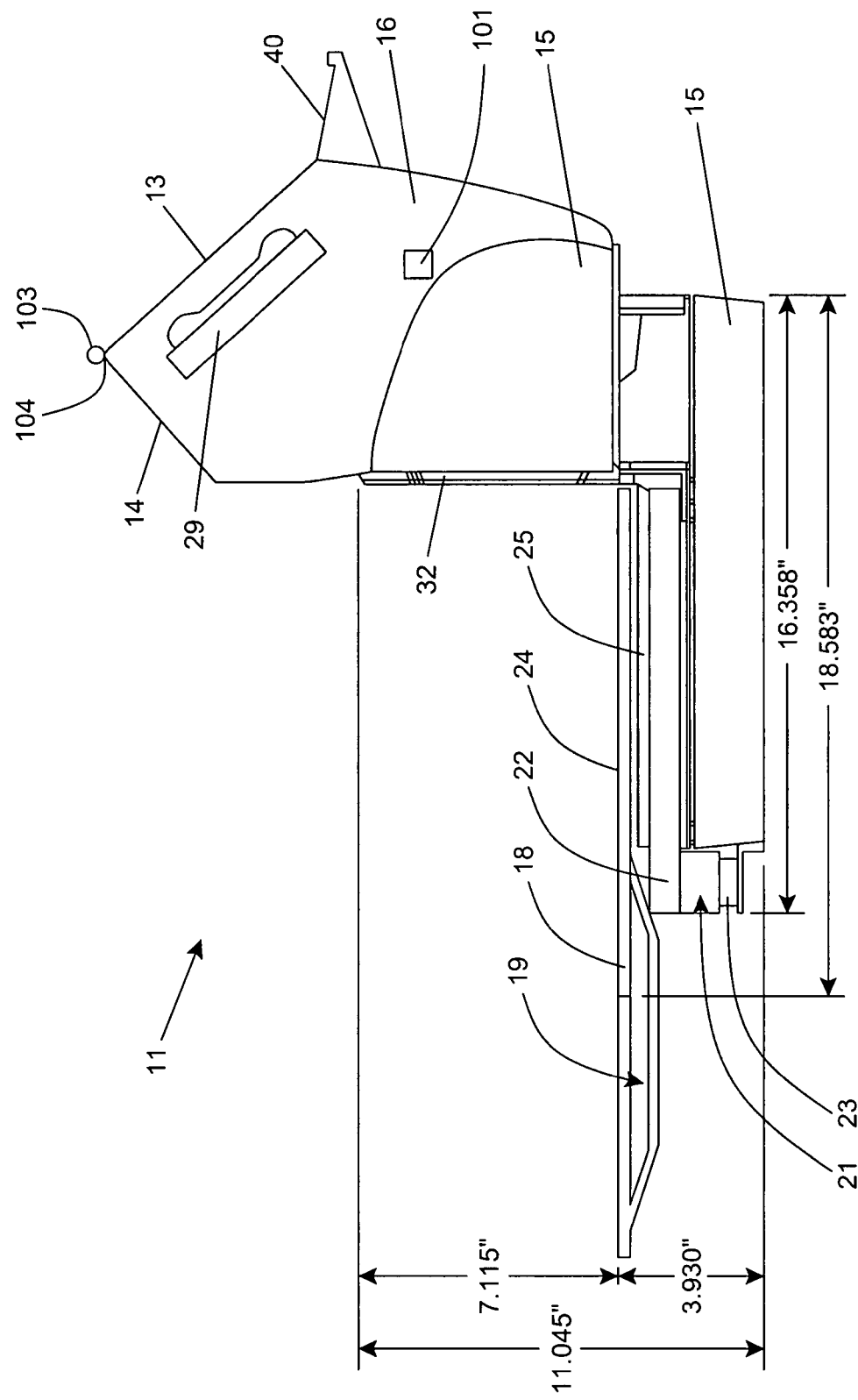
FIG. 3B is an elevated side view of the POS-based bar code reading system with an integrated Internet-enabled customer-kiosk terminal illustrated in FIGS. 3A and 3B, showing that the produce weigh tray of the present invention is supported upon an insert resting upon the transducers of the electronic produce scale unit integrated into the system, and the surface recess formed within the produce weigh tray extends below the planar top surface of the scanning window aperture formed therein above the bottom scanning window of the POS-based bioptical laser scanning unit.

As shown in FIG. 3B, the POS-based bioptical laser scanning bar code reading unit 16 supports a novel produce weigh tray 18 having a recessed surface region 19 for slidably receiving the full weight of produce items 20 under the natural forces of gravitational loading so that the full weight of the produce items to be purchased is accurately measured by an electronic produce scale subsystem 21 integrated within the bottom portion of the POS-based bioptical scanning unit 16. As shown in FIG. 3B, the produce weigh tray 18 is supported upon an insert 22 resting upon the transducers 23 associated with the electronic produce scale subsystem 21. The surface recess 19 formed within the produce weigh tray 18 extends below the planar top surface of the scanning window aperture 24 formed therein above the bottom scanning window 25 provided in the POS-based bioptical laser scanning unit 16. By virtue of this novel weigh tray design, retailers can be assured that they will recover the full cost of produce and other items requiring weighing prior to the computation of the purchase price (i.e. all produce items will fall into the tray recess 19 and be accurately weighed). Also, the tray design of the present invention prevents accidental slippage of the spherical shaped produce items onto the floor surface which might cause damage to the produce and render such items unsuitable for sale, or at substantially reduced purchase price.

In the preferred embodiment, it will be desirable to provide a vibration damping mechanism between the scale/bar code reader subsystem and the structures that support the customer kiosk terminal where vibrational energy and shock producing forces will be generated during normal operation. The function of the vibration damping mechanism will be to damp such forces and isolate the weigh scale subsystem therefrom to ensure accurate scale readings.

In FIGS. 4A and 4B, the produce weigh tray 18 is shown removed from the electronic produce scale subsystem 21. As shown in FIG. 4B, the POS-based bar code reading system with an integrated internet-enabled customer-kiosk terminal 11 comprises: a cashier-scale-terminal/customer-kiosk-terminal module 16 removably detachable from POS-based bioptical laser scanning bar code reading unit 16; an ATM submodule 27 removably detachable from a first installation port 28 provided on the right side of the cashier-scale-terminal/customer-kiosk-terminal module 16; a voice-over-IP courtesy phone submodule 29 removably detached from a second installation port 30 provided on the left side of the cashier-scale-terminal/internet-enabled customer-kiosk-terminal module 16; and a data input port 101 (e.g. based on USB standards) for optionally receiving the USB (or other) connector of a 1D/2D bar code symbol reader 102 which may employ either laser scanning and/or image capture and processing techniques known in the art. Exemplary hand-supportable 1D/2D bar code symbol readers and hand-held linear and area type imagers 102 are disclosed in U.S. Pat. Nos. 6,347,163; 6,123,262; 6,036,094; 5,988,505; 5,621,203; and 5,523,552; as well as in International Application PCT/US01/44011 filed Nov. 21, 2001, published by WIPO as WO 02/43195 A2, each said reference being incorporated herein by reference in its entirety. Each module in this system design is provided with releasable mechanical connectors 31A', 31B' that enable the device to connect to a mating surface shown, and electrical connectors 31A, 31B' that can be releasably joined to establish necessary and sufficient electrical connections between the component parts of the system. The advantage of this modular design is that the retailer can build a system that meets the requirements of its customers, and possibly start out with a basic system structure and expand as necessary by adding modules 16, 27 and 29.

Notably, each submodule described above can be provided with a spring-biased hinge-type connector designed to establish the necessary electrical and physical connections between the module and the system housing, while enabling the module to (i) undergo controlled rotation about its hinge when struck by an outside force such as when the customer's hand or arm strikes the module during customer interaction, (ii) retract in a controlled manner, and (iii) automatically return to its original unretracted position. Such a module connector mechanism should reduce the risk of damage to the system and its subcomponents and possibly customers who might bump into the service modules during checkout operations.

As shown in FIG. 4A, the POS-based bar code reading system is provided with an integrated 2-D bar code symbol reader located on the cashier's side of the terminal. The purpose of the 2-D bar code symbol reader 110 is to enable the reading of 2-D bar code symbols applied on various types of substrates such as, for example, personal identification cards, the holders of which may be required to present by law when entering into particular kinds of consumer transactions (e.g. purchase of alcoholic beverages, tobacco, firearms, ammunition, and other controlled substances). The 1-D/2-D bar code symbol reader (imager) 110 can be realized using laser scanning techniques disclosed in U.S. Pat. Nos. 6,347,163; 6,123, 262; 6,036,094; 5,988,505; 5,621,203; and/or using image capture and processing techniques disclosed in International Application PCT/US01/44011 filed Nov. 21, 2001, published by WIPO as WO 02/43195 A2, each of which is incorporated herein by reference in its entirety.

Figure 5:
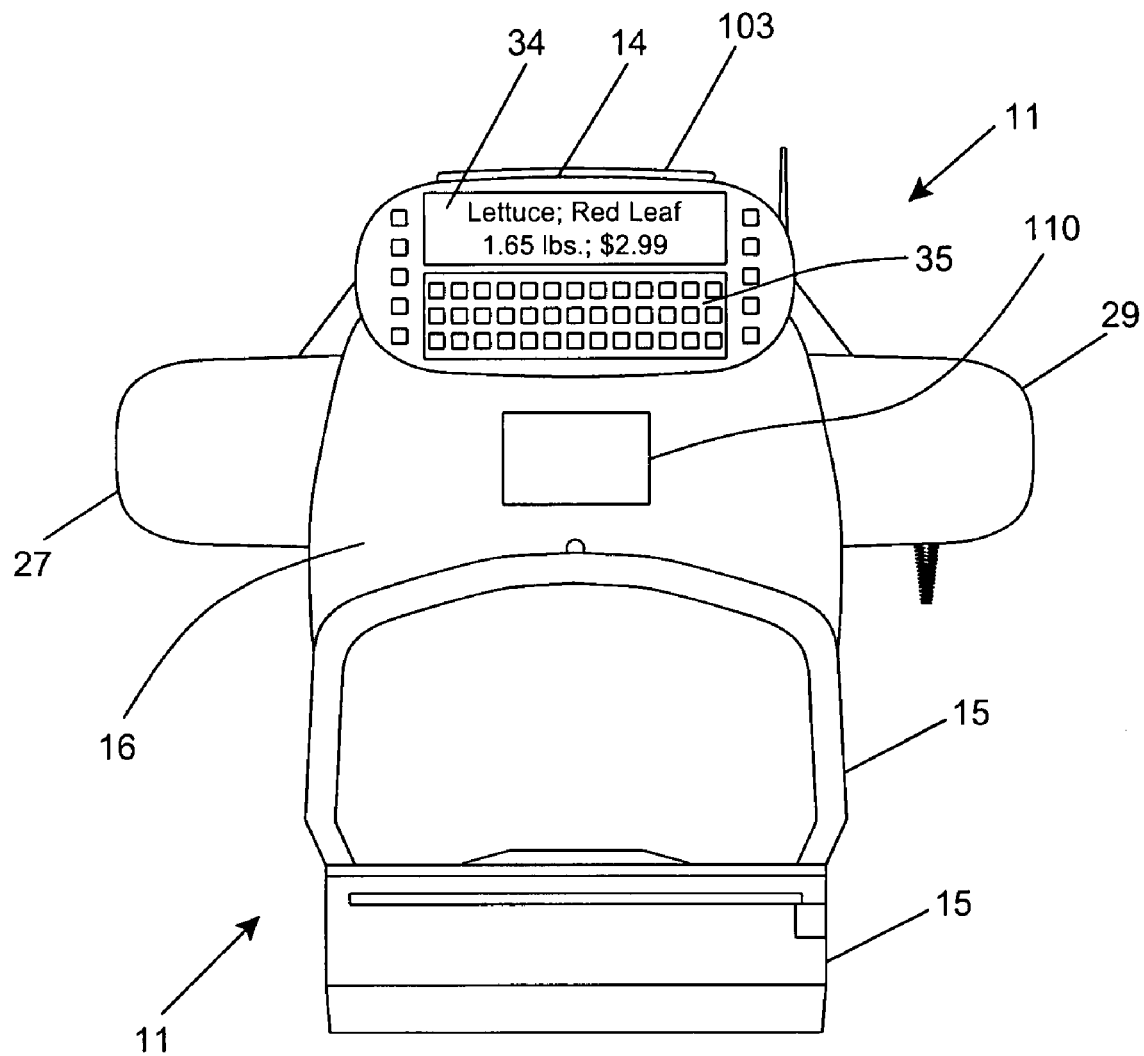
FIG. 5 is an elevated rear view of the POS-based bar code reading system with an integrated Internet-enabled customer-kiosk terminal illustrated in FIGS. 3A through 4B, showing the vertical scanning window of the POS-based bioptical laser scanning bar code reading unit and the cashier checkout terminal (with LCD panel and membrane keyboard) provided on the cashier's side of the system.

As shown in FIG. 5, the cashier at the POS station faces the vertical scanning window 32 of the POS-based bioptical laser scanning bar code reading unit 15 as well as the cashier-scale terminal 14 (with LCD panel 34 and membrane keyboard 35) provided on the cashier's side of the POS-based laser scanning bar code reading system with an integrated internet-enabled customer-kiosk terminal 11.

As shown, an IrDA data communications port 120 is provided on the customer's side of the system below the LCD panel. The purpose of this IrDA communications port is to collect data (e.g. electronic coupon data) collected by an IrDA-enabled PDA used by the customer to collect electronic coupons in or outside of the retailer's store. During the retail transaction, the customer will be prompted by a particular service screen displayed on the LCD panel on the customer's side, to scan any bar coded coupons (or barcode ID card) using 1D/2D bar code reader 55 or transmit any electronic coupons to IrDA data communications port 120 which might be collected in the customer's IrDA-enabled PDA 122 in hand at the time of the retail transaction.

Figure 6:
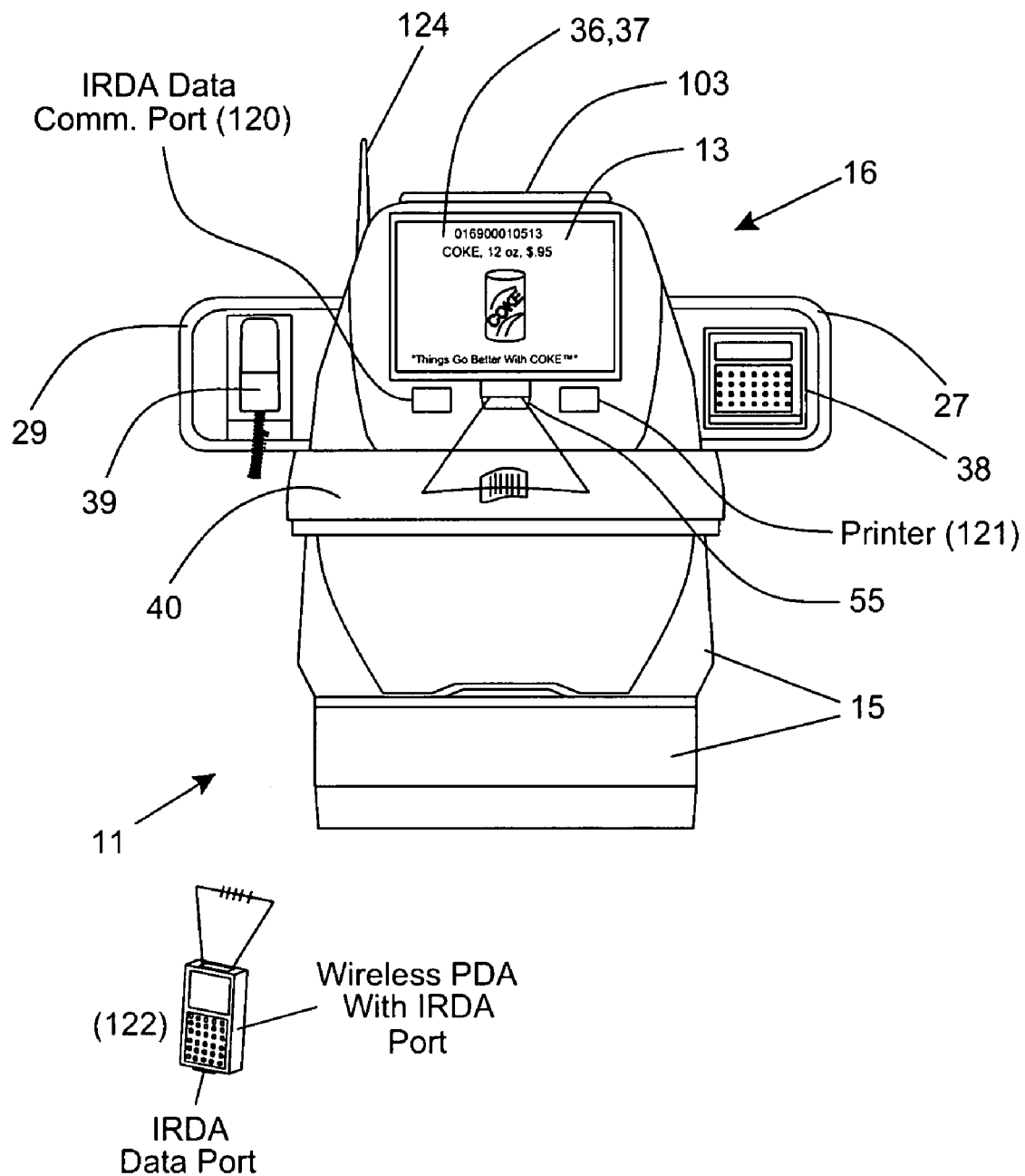
FIG. 6 is an elevated front view of the POS-based bar code reading system with an integrated Internet-enabled customer-kiosk terminal illustrated in FIGS. 3A through 4B, showing (i) the Internet-enabled customer kiosk terminal (with LCD panel and touch-screen keyboard integrated therewith) provided on the cashier's side of the system, (ii) the transaction terminal associated with the ATM submodule, (iii) the hand-set associated with the voice-over-IP phone module, and (iv) the courtesy desk surface disposed beneath the customer-kiosk transaction terminal.

As shown in FIG. 6, the customer at the POS station faces (i) the Internet-enabled customer-Kiosk Terminal 13 (with LCD panel 36 and touch-screen keyboard 37 integrated therewith) provided on the cashier's side of the system, as well as (ii) the financial transaction terminal 38 associated with the ATM submodule 27, (iii) the hand-set 39 associated with the voice-over-IP phone module 29, and (iv) the courtesy desk surface 40 disposed beneath the customer-kiosk transaction terminal 13. Preferably, Internet-enabled kiosk terminal (computer subsystem) 13 is provided with an Advertisement/Promotion Mode of display operation so that, in addition to constantly displaying the name of the retailer's store, address location, time and date of transaction (useful during check writing operations), it is also capable of displaying advertisements and promotions (of the hosting retailer or other retailers) on display 36, 37 while the cashier is not scanning products and the price and product information thereof is not being displayed during its Price/Product Information Display Mode. The enabling infrastructure for enabling the creation and delivery of such product/service advertisements and promotions on the Internet-enabled customer kiosk terminal 13 is taught in great detail in published WIPO Publication No. WO 01/37540 A2 by IPF, Inc., incorporated herein by reference. Such advertising and promotions can relate to the products offered for sale in the hosting retailer store, services and products offered for sale in local and/or regional markets, as well as community news, sporting events, recreational events as well as local educational programs and the like.

Figure 7A:
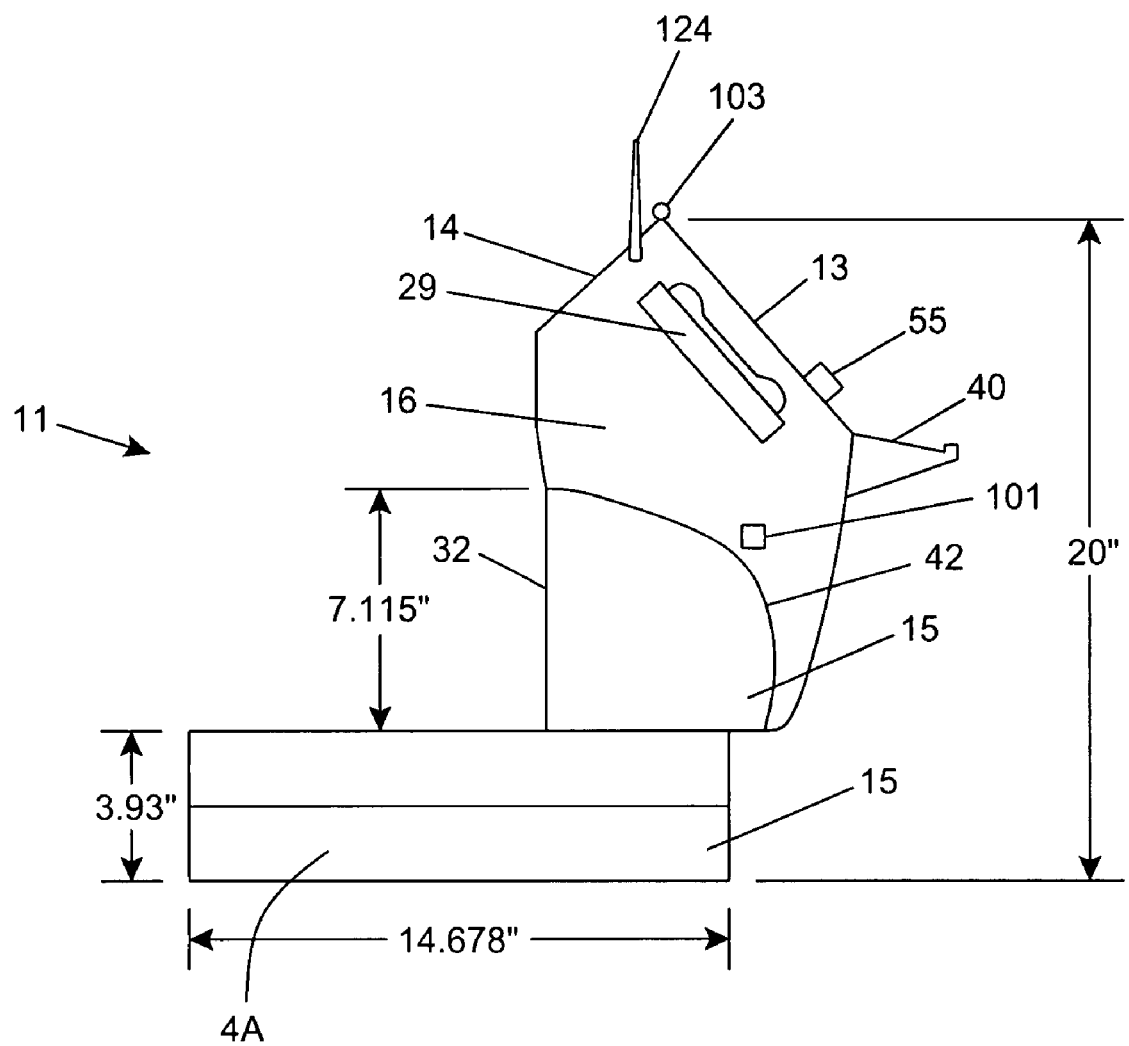
FIG. 7A is an elevated first side view of the POS-based bar code reading system with integrated Internet-enabled customer-kiosk terminal illustrated in FIGS. 3A through 4B.
Figure 7B:
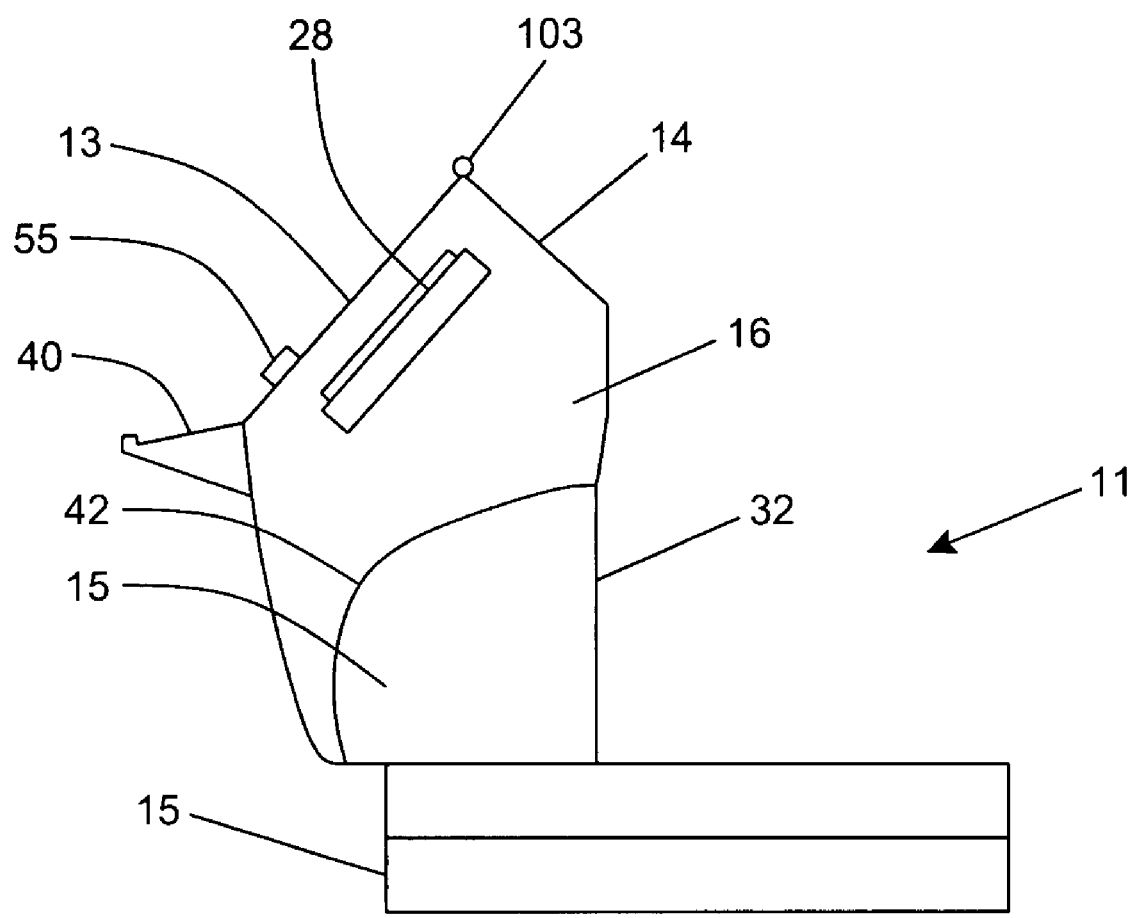
FIG. 7B is an elevated second side view of the POS-based bar code reading with an integrated Internet-enabled customer-kiosk terminal illustrated in FIGS. 3A through 4B.

Side views of the POS-based bar code reading system with an integrated internet-enabled customer-kiosk terminal 11 are shown in FIGS. 7A and 7B, and illustrate that the cashier-scale-terminal/customer-kiosk-terminal module 16 and the POS-based bioptical laser scanning bar code reading unit 15 are contained within separate housings yet interconnected at physical interface-boundary line 42.

Figure 7C:
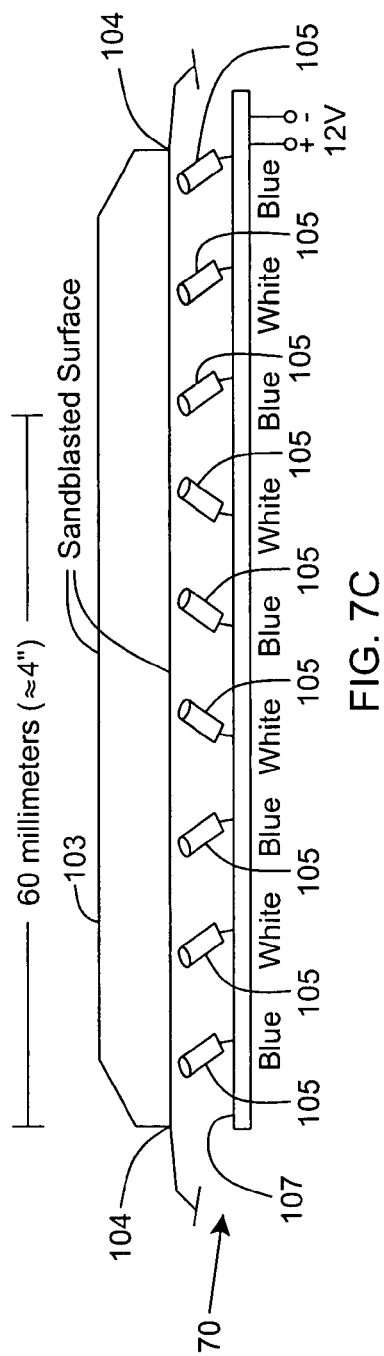
FIG. 7C is an elevated view of the light-pipe based bar code read indication subsystem of the present invention, mounted within the POS-based bar code reading system illustrated in FIGS. 2 through 7B, showing that the light pipe structure is illuminated from below a narrow elongated mounting aperture formed along the apex portion of the system housing, and by way of an array of light brightness white and blue LEDs mounted on a narrow PC board supporting LED driver circuitry powered from the power distribution system provided for within the system housing.
Figure 7D:
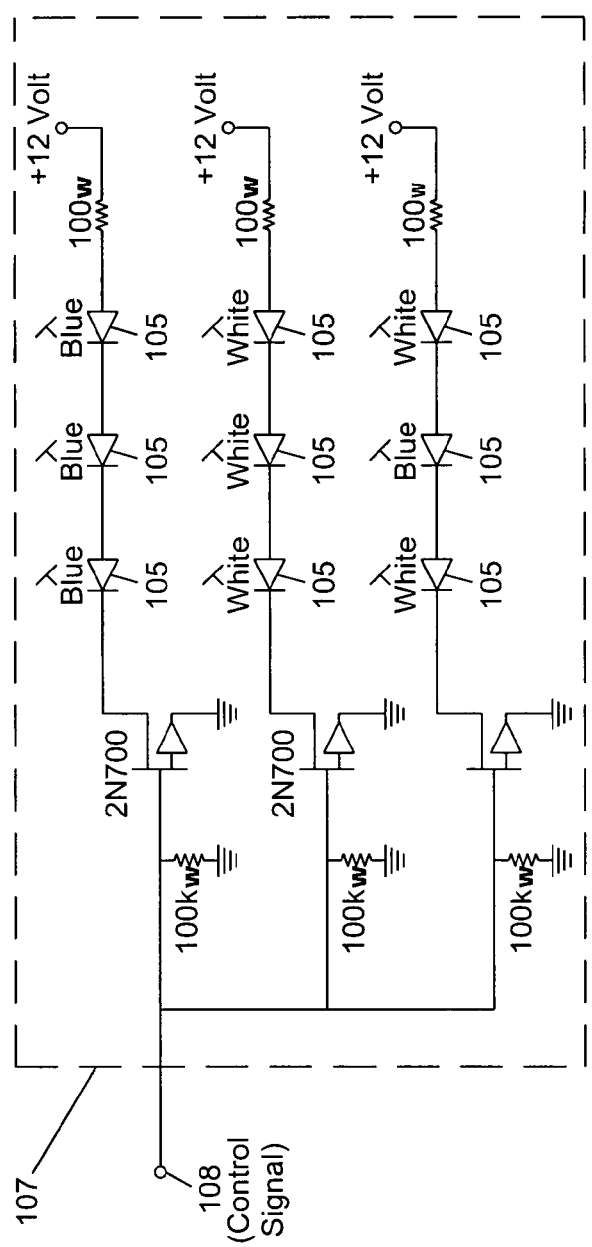
FIG. 7D is a schematic diagram for the LED-driven light-pipe based bar code read indication subsystem of the present invention, shown in FIG. 7C.
Figure 8A:
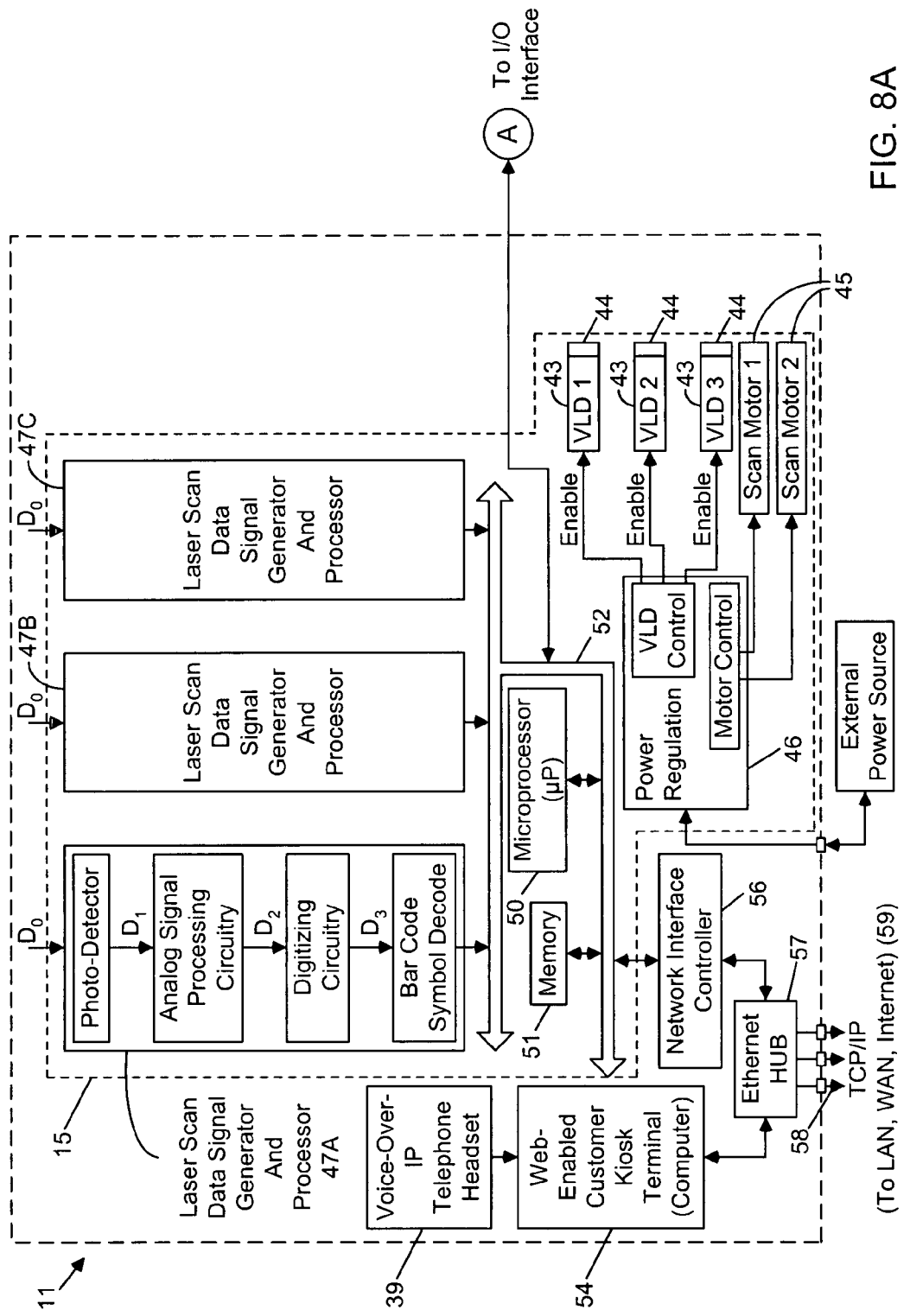
FIGS. 8A and 8B, taken together, set forth a block-schematic representation of the system diagram of the POS-based bar code reading with an integrated Internet-enabled customer-kiosk terminal shown in FIGS. 2 through 7B.
Figure 8B:
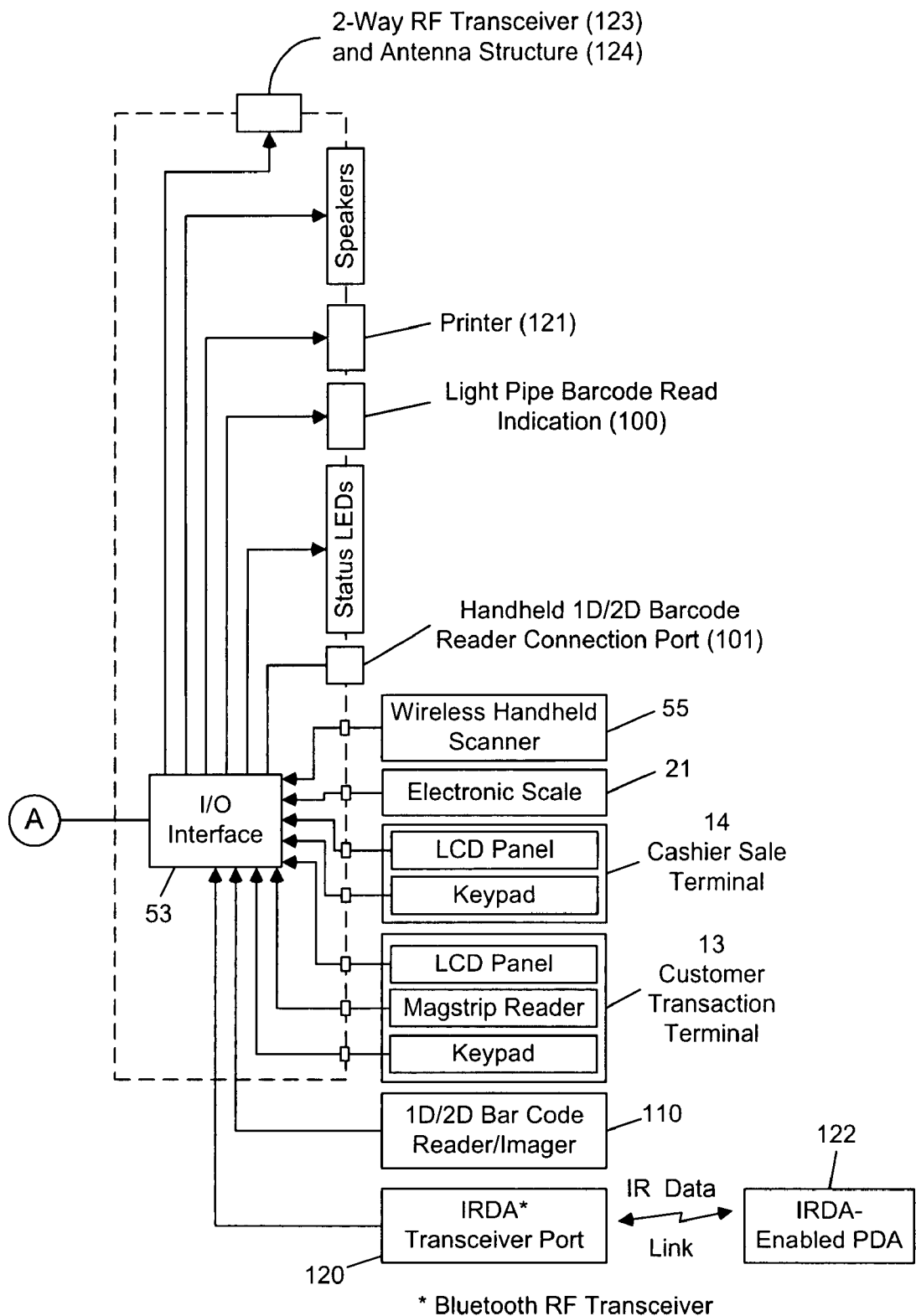

In FIGS. 8A and 8B, a system diagram is provided for the POS-based bar code reading system with an integrated internet-enabled customer-kiosk terminal 11 illustrated in FIGS. 2 through 7B. As shown, the system comprises: a plurality of VLDs 43, light focusing optics 44, scanning motors 45 power regulation circuitry 46, and scanning optics for producing and scanning laser scanning beams so as to project a laser scanning pattern through the horizontal and vertical scanning windows of the system, and scan bar codes on objects being moved thereby by the cashier, and light collection optics for collecting the focusing the return laser light signal for subsequent photodetection; a plurality of laser scan data generator and processing modules 47A, 47B and 47C, including a plurality of photodetectors, for producing scan data signals D0 through D3, that are ultimately decode-processed in order to produce symbol character data representative of the bar code symbol scanned by the system; a microprocessor 50, memory architecture 51, system bus architecture (having different levels of buses) 52 and an I/O interface 53 connected to such buses for enabling the collection, processing and transport of data elements generated by the various components in the system; cashier scale terminal 14 having a LCD panel, keypad and associated circuitry; customer-transaction terminal 15 (i.e. having a LCD panel, a keypad, a magstripe reader, and associated circuitry); Internet-enabled customer-kiosk terminal (i.e. computer subsystem) 54 realized as a microcomputing system running an operating system (OS), networking software to support the TCP/IP protocol, Internet access software (e.g. Web browser software such as Microsoft Explorer) to access the WWW and other information resources on the Internet, and peripheral hardware and software components such as a LCD panel 36, and touch-screen keypad 37 mounted thereon (for using customer-transaction terminal 13), and a speech/voice recognition interface and a bar code symbol reader 55 integrated with the microcomputing system; a voice-over-IP telephone handset 39 integrated with the microcomputing system, and having software components running thereon to support its voice communication functions over the Internet, or alternatively, over a Public Telecommunications Switching Network (PTSN) in a manner known in the art; a network interface controller (NIC) card 56 operably connected to system bus architecture 52, for enabling data packet communications over an packet-switched information network (e.g. Internet); an multiport Ethernet hub device 57 connected to the NIC card 56 and the Internet-enabled customer-kiosk terminal 54, so that entire POS-Based Bar Code Reading System With Internet-Enabled Customer-Kiosk Terminal 11 has one or more Ethernet data ports 58 for operable connection to a TCP/IP network 59 such as a retail LAN which, in turn, is connected to the Internet; a LED-driven light-pipe based bar code read indication subsystem 100, mounted through the surface of the system housing, and being operably connected to the I/O interface 53, and controlled by microprocessor 50; a USB (or like) data communication port connector 101, operably connected to I/O interface 53, for interconnection with a matching USB connector associated with a hand-held 1D/2D bar code reader, or hand-held image-based 1D/2D bar code reader/OCR-enabled imager 102, for reading 1D and 2D bar code symbol structures (e.g. applied to identification cards, passports, shipping labels, etc.) as well as performing OCR processing on captured images of alphanumeric character strings printed on similar types of identification cards, shipping labels, forms, and the like in diverse end-user environments; a printer (i.e. thermal or dot-matrix type) 121 installed in the system housing on the customer side thereof for printing customer receipts for the various types of transactions supported by the system; IrDA data communications port 120 installed on the customer side of the system housing, preferably below the LCD panel on that side of the system, for enabling data communication between IrDA-enabled PDAs (122) or PDTs owned or used by the customer to collect electronic data associated with discount coupons, and other kinds of value-added services; and a 2-way RF transceiver 123 interfaced with the I/O subsystem, and a RF antenna structure 124 coupled to RF transceiver 123, enable the system to function as a RF base station in a retail information network (LAN) and support 2-way RF-based high-speed data communication between the base station and multiple wireless RF-based PDTs used by retailers' employees and customers alike in the retail store environment.

In FIGS. 2 through 7B, the POS-based bioptical laser scanning bar code reading system 11 is shown with a light-pipe based bar code read indication subsystem 100 integrated into the top apex portion of its system housing 16. The primary purpose of this optical arrangement is to visually inform both the cashier and customer, alike, of each instance that a scanned bar code read has been successfully decoded during bar code scanning operations, and to make such visual indications occur in an aesthetically pleasing, if not artistically beautiful manner, to the enjoyment of retail customers at the POS station.

As best shown in FIG. 7C, the light-pipe structure 103 of this subsystem 100 is mounted within through a narrow elongated aperture 104 formed in the apex surface of the system housing. In the illustrative embodiment, the light-pipe structure 103 is about 10 inches (i.e. 10") in length, but could be longer or shorter in other alternative applications of the present invention. The light pipe structure 103 can be maintained in place about elongated aperture 104 by fasteners, adhesive, or other means known in the bar code scanner manufacturing art.

As shown in FIG. 7C, the light pipe structure 103 is illuminated from below the mounting aperture 104, by an array of nine (9) high-brightness LEDs 105 mounted on a narrow PC board 106 supporting LED driver circuitry 107, schematically depicted in detail in FIG. 25B. In the illustrative embodiment, LED driver circuitry 107 is powered from the power distribution system provided for within the system housing. The visible illumination emitted from the LEDs is injected through the bottom surface of the light pipe structure 103, reflects and scatters internally within the optical structure, and escapes at generally all surface points exposed external to the system housing so that both the cashier and customer alike can see the entire light pipe structure glow with bluish-white illumination upon each successful read of a scanned bar code symbol at the POS checkout station. Notably, the light pipe structure of the present invention is designed to minimize total internal reflection (or trapping) of inject light in order to maximize the light transmission efficiency, and thus brightness, of the light pipe structure during illumination.

In FIG. 7D, the electrical circuit used in the LED-driven light-pipe bar code read indication subsystem is shown comprising: a first set of three "blue" light emitting diode (LEDs), connected in electrical series configuration with a 100 Ohm resister, and a current source formed by an FET configured with a 10 kiloOhm resistor, as shown, driven between 12 volts and electrical ground potential; a second set of three "white" light emitting diode (LEDs), connected in electrical series configuration with a 100 Ohm resister, and a current source formed by an FET configured with a 10 kiloOhm resistor, as shown, driven between 12 volts and electrical ground potential; and a third set of three "white" light emitting diode (LEDs), connected in electrical series configuration with a 100 Ohm resister, and a current source formed by an FET configured with a 10 kiloOhm resistor, as shown, driven between 12 volts and electrical ground potential All of these electrical components are mounted on a narrow PC board 106, with the blue and white LEDs arranged in an sequentially alternating manner, as indicated in FIG. 7C. As shown, first and third consecutive triplets of LEDs 105 are oriented at a first angle off normal with respect to the planar input surface of light pipe structure 103, whereas the second consecutive triplet of LEDs 105 is oriented at a second angle off normal with respect to the planar input surface of light pipe structure 103. The PC board 106, in turn, is mounted to the interior of the system housing, directly beneath the light pipe structure.

The light pipe structure 103 can be fabricated from a light transmissive (optically clear) plastic material, either molded, or ground and polished to a suitable geometry required by the particular application at hand. In the illustrative embodiment, all surfaces of the light pipe structure 103 are sandblasted so that incoming light rays from the LEDs are highly diffused as they are injected into the light pipe structure 103. Also, the outgoing light rays are further diffused as they exit the light pipe structure in a substantially isotropic manner. By virtue of such light diffusion, neither the customer nor the cashier can view the LEDs located beneath the light pipe structure 103.

As shown in FIGS. 8A and 8B, the light pipe based bar code read indication subsystem 100 is connected to the I/O interface 53 of the system, and is driven by a control signal 108 supplied to the input of the FETs. Notably, a control signal (e.g. 5.0 Volts) is generated under the control of the microprocessor 50 whenever a bar code symbol is successfully scanned and decoded (i.e. read). The generation of the control signal drives the LEDs in the circuit 107 shown in FIG. 25B and causes the light pipe structure 103 to conspicuously illuminate a bluish-white light along its entire surface. Such illumination indicates to both the cashier and customer that a scanned bar code symbol has been successfully decoded, and that the corresponding product and price information is being displayed on the terminal LCD panels before these parties to the retail transaction.

As described above, the interactive dual-LCD panel POS-based retail transaction terminal system shown in FIGS. 2 through 8B supports various types of retail transactions. When using this interactive cashier/customer terminal system, both the customer and the cashier or sales clerk (i.e. retailer service personnel) are provided with their own color LCD panel, data entry devices and other peripheral-type transaction-supporting equipment necessary to support data entry and display operations on both the cashier and customer sides of the terminal system.

In the illustrative embodiments, microprocessor 50 within the system runs an interactive retail transaction application program stored in memory 51, shown in FIGS. 8A and 8B. Preferably, this interactive retail transaction application is rapidly developed by the retailer on a separate retailer development computer (i.e. PC) using an integrated development and development environment (IDE) like the one taught in copending application Ser. No. 10/342,441 filed Jan. 12, 2003, incorporated herein by reference, and then downloaded to memory 51 to run on microprocessor 50 during run-time or deployment operations within the retail store environment. Preferably, this IDE is used to develop and program the GUI screens sequentially displayed on the LCD panels of both the cashier and customer terminals in the system, in a manner choreographed according to a retailer's transaction or service script that is carried out by the application during the particular retail transaction. Notably, this IDE employs "WYSI-WYG" type GUI display screen editors with simple "drag and drop" operation, visually-operated SQL database editors, and easy to use "event-driven" control logic editors to bind objects at the presentation layer of the system (i.e. within the GUI screens to objects at the database layer of the system (i.e. within the SQL database), occurring at the control layer of the system.

In general, the retailer transaction application will display GUI screens on the cashier's LCD panel s to prompt the cashier or sales clerk to particular forms of human interaction action required to support a specific kind of retail transactions desired by the hosting retailer. At the same time, the retail transaction application also generates corresponding GUI display screens on the customer's LCD panel prompting the customer to respond with appropriate responses and forms of human interactive to carry out the transaction and receive, if desired, particular kinds of services that create value and hopefully meaning in the lives of both the cashier and customer. Notably, within the constraints of the particular retail transaction, the retailer's transaction or service script (embodied within the retailer transaction application) will specify the various scenarios of cashier/customer interaction that the retailer would like to see be played out at the interactive terminal system, so that a particular (ideally unique) kind or brand of customer experience will be consistently delivered to each and every customer that passes through the POS-station, regardless of the level of intellectual and social skills possessed by the retail sales clerk/cashier or customer standing on the other side of the POS-based interactive kiosk terminal system of the present invention, hopefully making eye-to-eye contact with the sales clerk attempting to attend to the needs and wants of the customer, in effort to provide customer satisfaction, and loyalty.

In accordance with such inventive principles, the retailer's transaction or service script (specified by the retailer during application development) can be designed to bring about a particular kind and quality of behavioral interaction between both the cashier/salesclerk and the customer that creates and enhances the brand experience in the retail store, regardless of the fact that the store support high volumes of consumer traffic and offering products and services at discount prices. Such interaction is achieved by displaying GUI screens designed to guide these parties to the retail transaction so that a predetermined quality of customer service is delivered to the customer by the retail cashier/salesclerk at the retailer POS station. At the same time, the retailer's service script can be designed so that it permits a high degree of improvisation naturally demanded by customers and retail cashiers and clerks (i.e. retail service personnel). For example, the retailer's service script can also include the display of motivational and/or inspiring quotes and/or imagery on the LCD panels both the cashier and customer sides of the terminal system, so as to encourage positive attitudes, cordial responses and compassionate levels human interaction within the retail store, in effort to promote a sense of well being and pleasure at the POS-based terminal system.

Figure 9:
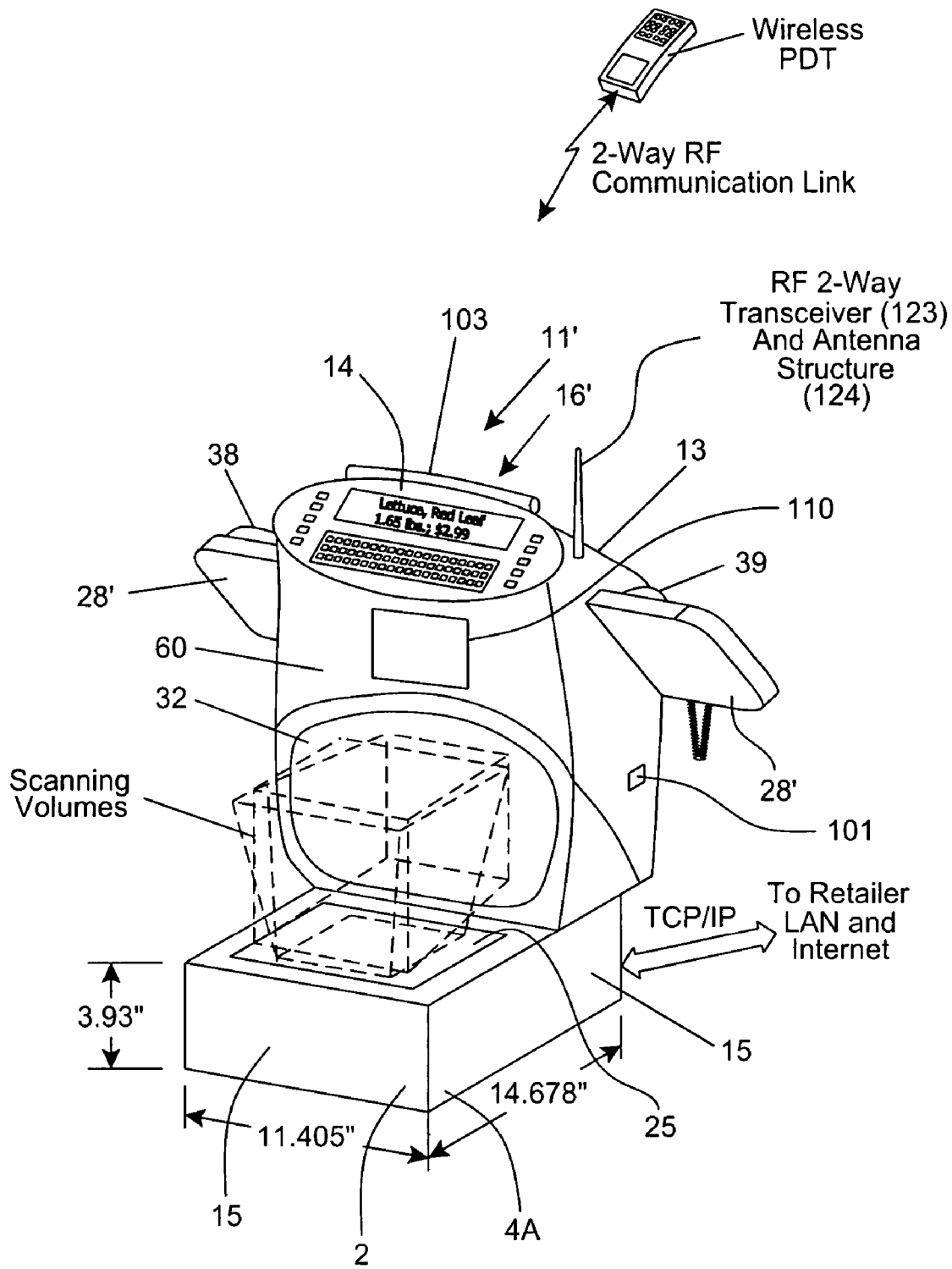
FIG. 9 is a perspective view of the second illustrative embodiment of the POS-based bar code reading system with Internet-enabled customer-kiosk terminal of the present invention, wherein a POS-based bioptical laser scanning bar code reading unit is integrated with a cashier-scale-terminal/customer-kiosk-terminal unit in a housing of unitary construction.

Second Illustrative Embodiment of the POS-Based Bar Code Reading System With Internet-Enabled Customer-Kiosk Terminal of the Present Invention In FIG. 9, there is illustrated the second illustrative of the POS-based laser scanning bar code reading system with an integrated internet-enabled customer-kiosk terminal 11 of the present invention. As shown in FIG. 9, POS-based bar code reading system with an integrated internet-enabled customer-kiosk terminal 11 comprises a POS-based bioptical laser scanning bar code reading unit 15 integrated with a cashier-scale-terminal/customer-kiosk-terminal unit 16' but in this design, Units 15 and 16' are both and contained in a compact housing 60 of generally unitary construction, as shown. The POS-based bioptical laser scanning bar code reading unit 15 can be realized using any of the products taught in copending application Ser. Nos. 09/990,585 filed Nov. 21, 2001; 09/999, 687 filed Oct. 31, 2001; 09/954,477 filed Sep. 17, 2001; and 09/551,887 entitled "Bioptical Holographic Laser Scanning System" filed Apr. 18, 2000, International Application PCT/US01/44011 filed Nov. 21, 2001, published by WIPO as WO 02/43195 A2 and PCT Application No PCT/US03/00910 filed Jan. 13, 2003; each incorporated herein by reference. While not shown, the POS-based bioptical bar code reading unit 15 also supports the novel produce weigh tray structure 18 described in detail above, and therefore, enjoys all of the benefits thereof.

As shown in FIG. 9, the POS-based bar code reading system with an integrated internet-enabled customer-kiosk terminal 11' further comprises: an ATM submodule 28' provided on the right side of the cashier-scale-terminal/customer-kiosk-terminal unit 16'; and a voice-over-IP courtesy phone submodule 29' provided on the left side of the cashier-scale-terminal/internet-enabled customer-kiosk-terminal module 16'. Each module 28', 29' is permanently mounted to its central kiosk housing 60 as shown using physical and electrical connectors that establish necessary mechanical and electrical connections required between the component parts of the system. In the preferred embodiment, it will be desirable to provide a vibration damping mechanism between the scale/bar code reader subsystem and the structures that support the customer kiosk terminal where vibrational energy and shock producing forces will be generated during normal operation. The function of the vibration damping mechanism will be to damp such forces and isolate the weigh scale subsystem therefrom to ensure accurate scale readings.

As shown in FIG. 9, the POS-based bar code reading system is provided with an integrated 1-D/2-D bar code symbol reader 110 located on the cashier's side of the terminal. The purpose of the 1-D/2-D bar code symbol reader 110 is to enable the reading of 2-D bar code symbols and optical characters applied on various types of substrates such as, for example, personal identification cards, the holders of which may be required to present by law when entering into particular kinds of consumer transactions (e.g. purchase of alcoholic beverages, tobacco, firearms, ammunition, and other controlled substances). Exemplary 1D/2D bar code symbol readers and linear and area type imagers 110 are disclosed in U.S. Pat. Nos. 6,347,163; 6,123,262; 6,036,094; 5,988,505; 5,621, 203; and 5,523,552; as well as in International Application PCT/US01/44011 filed Nov. 21, 2001, published by WIPO as WO 02/43195 A2, each said reference being incorporated herein by reference in its entirety.

Figure 10:
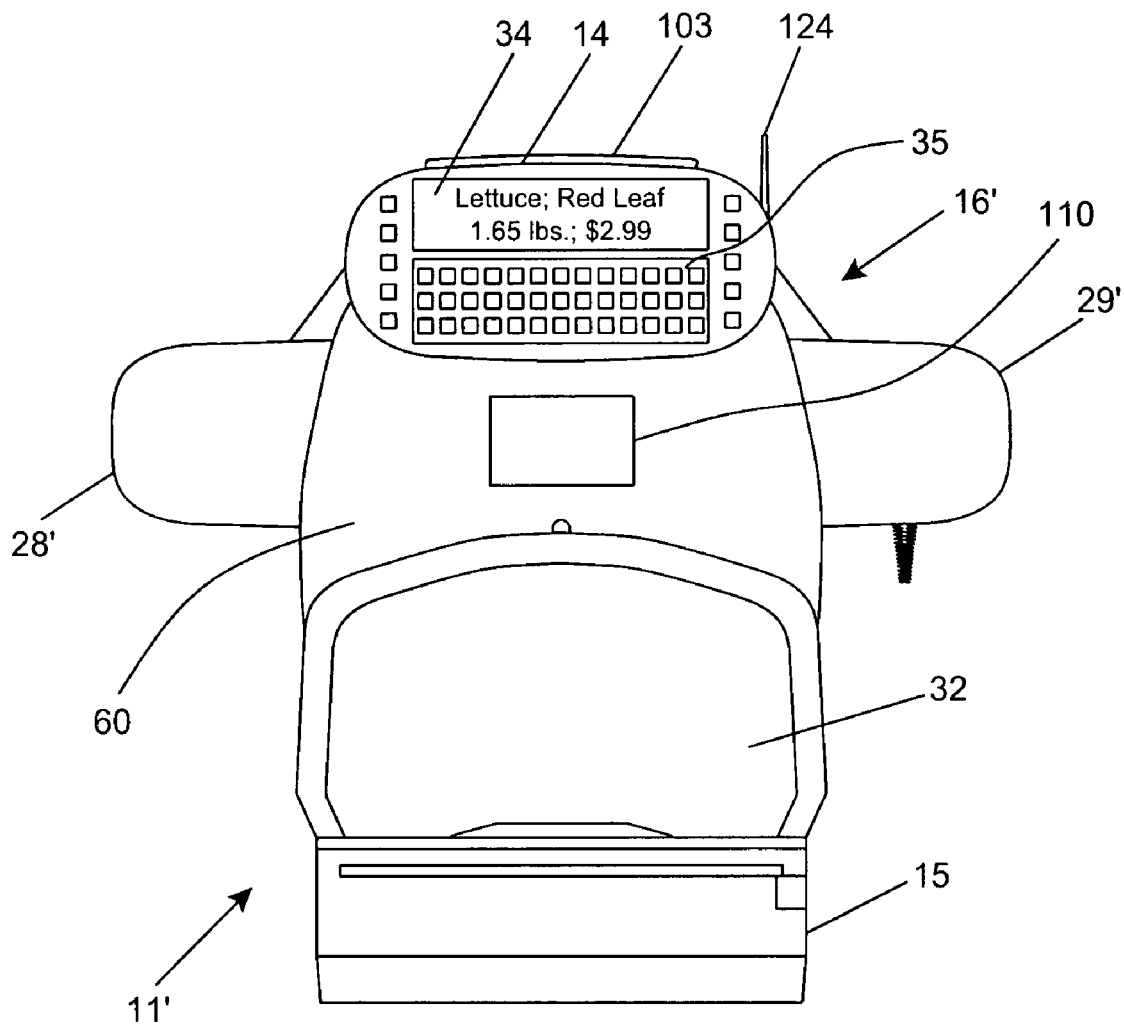
FIG. 10 is an elevated rear view of the POS-based bar code reading system with an integrated Internet-enabled customer-kiosk terminal illustrated in FIG. 9, showing the vertical scanning window of the POS-based bioptical laser scanning bar code reading unit and the cashier scale terminal (with LCD panel and membrane keyboard) provided on the cashier's side of the system.

As shown in FIG. 10, the cashier at the POS station faces the vertical scanning window 32 of the POS-based bioptical bar code reading unit 15 as well as the cashier-scale-terminal 14 (with LCD panel 34 and membrane keyboard 35) provided on the cashier's side of the POS-based bar code reading system with an integrated internet-enabled customer-kiosk terminal 11'.

Figure 11:
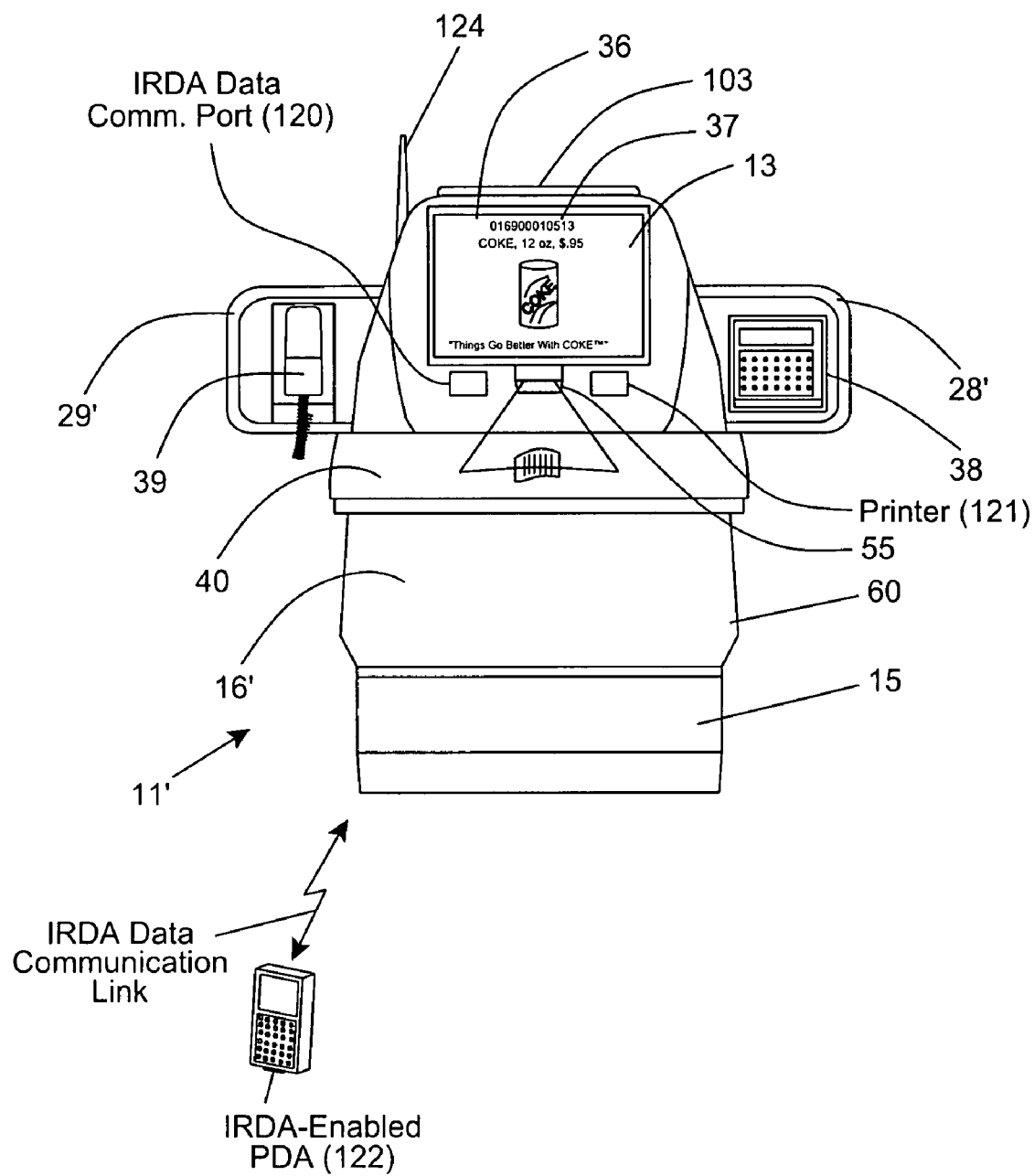
FIG. 11 is an elevated front view of the POS-based bar code reading system with an integrated Internet-enabled customer-kiosk terminal illustrated in FIG. 9, showing (i) the customer-kiosk transaction terminal (with LCD panel and touch-screen keyboard integrated therewith) provided on the customer's side of the system, (ii) the transaction terminal associated with the ATM submodule, (iii) the hand-set associated with the voice-over-IP phone module, and (iv) the courtesy desk surface disposed beneath the customer-kiosk transaction terminal.

As shown in FIG. 11, the customer at the POS station faces (i) the Internet-enabled customer-kiosk-terminal 13 (with LCD panel 36 and touch-screen keyboard 37 integrated therewith) provided on the cashier's side of the system, as well as (ii) the financial transaction terminal 38 associated with the ATM submodule 28', (iii) the hand-set 39 associated with the voice-over-IP phone module 29', and (iv) the courtesy desk surface 40 disposed beneath the customer-kiosk transaction terminal 13. Preferably, the display screen 36 is provided with an Advertisement/Promotion Mode of display operation so that in addition to constantly displaying the name of the retailer's store, address location, time and date of transaction (useful during check writing operations), it is also capable of displaying advertisements and promotions (of the hosting retailer or other retailers) while the cashier is not scanning products and the price and product information thereof is being displayed during its Price/Product Information Display Mode. The enabling infrastructure for enabling the creation and delivery of such product/service advertisements and promotions on the Internet-enabled customer kiosk terminal 13 is taught in great detail in published WIPO Publication No. WO 01/37540 A2 by IPF, Inc., supra, incorporated herein by reference. Notably, such advertising and promotions can relate to the products offered for sale in the hosting retailer store, services and products offered for sale in local and/or regional markets, as well as community news, sporting events, recreational events as well as local educational programs and the like.

Figure 12A:
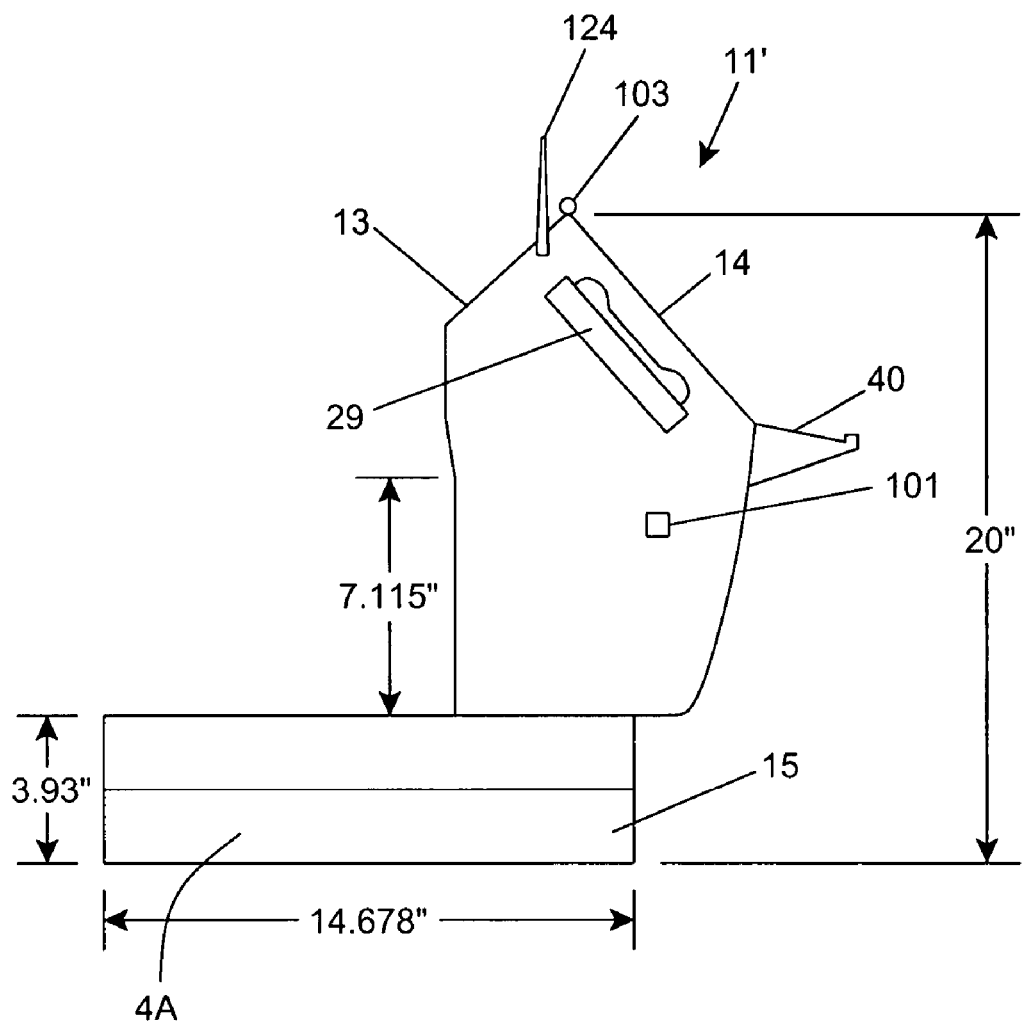
FIG. 12A is an elevated first side view of the POS-based bar code reading with an integrated Internet-enabled customer-kiosk terminal illustrated in FIG. 9.
Figure 12B:
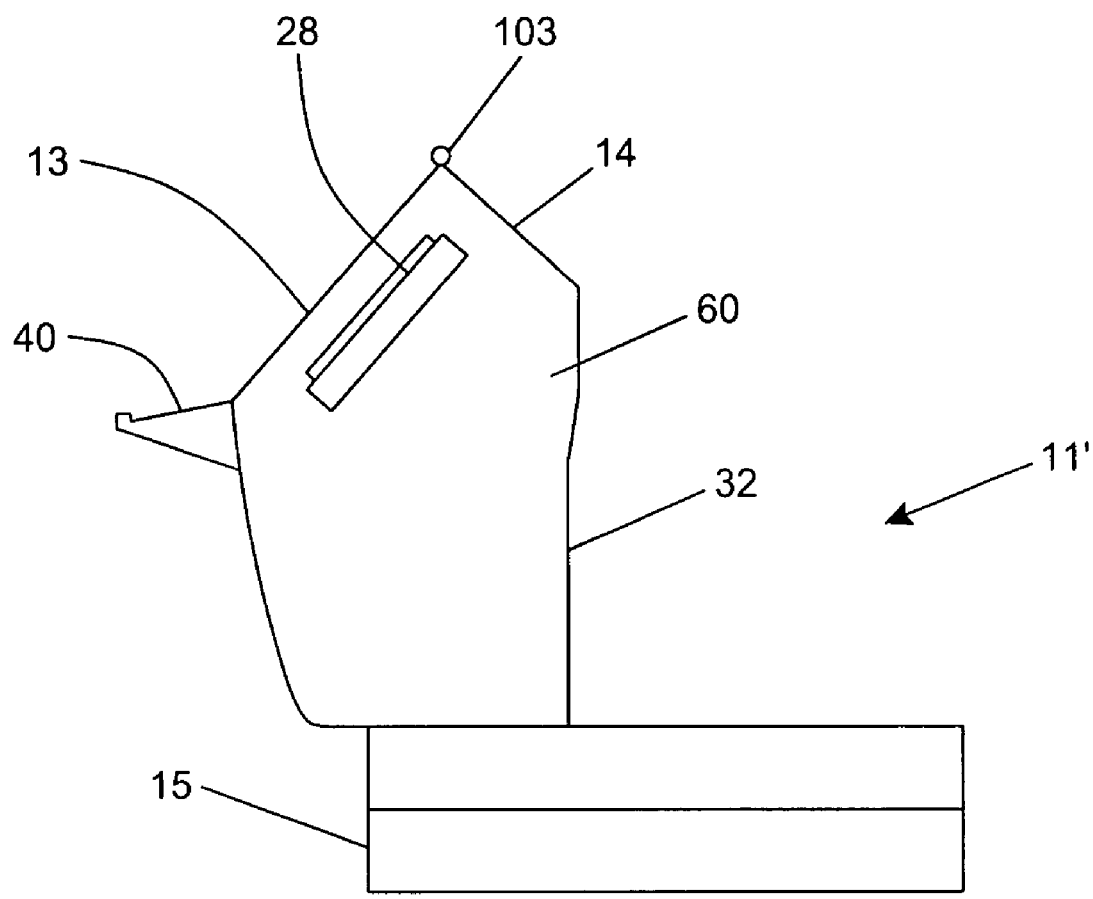
FIG. 12B is an elevated second side view of the POS-based laser scanning bar code reading with an integrated Internet-enabled customer-kiosk terminal illustrated in FIG. 9.

Side views of the POS-based laser scanning bar code reading system with an integrated internet-enabled customer-kiosk terminal 11' are shown in FIGS. 12A and 12B, and illustrate that the cashier-scale-terminal/customer-kiosk-terminal Unit 16' and the POS-based bioptical laser scanning bar code reading unit 15 are contained in housing 60 having a generally unitary construction. Notably, each submodule described above can be provided with a spring-biased hinge-type connector designed to establish the necessary electrical and physical connections between the module and the system housing, while enabling the module to (i) undergo controlled rotation about its hinge when struck by an outside force such as when the customer's hand or arm strikes the module during customer interaction, (ii) retract in a controlled manner, and (iii) automatically return to its original unretracted position. Such a module connector mechanism should reduce the risk of damage to the system and its subcomponents and possibly customers who might bump into the service modules during checkout operations. As shown, an IrDA data communications port 120 is provided on the customer's side of the system below the LCD panel. The purpose of this IrDA communications port is to collect data (e.g. electronic coupon data) collected by an IrDA-enabled PDA used by the customer to collect electronic coupons in or outside of the retailer's store. During the retail transaction, the customer will be prompted by a particular service screen displayed on the LCD panel on the customer's side, to scan any bar coded coupons (or barcode ID card) using 1D/2D bar code reader 55 or transmit any electronic coupons to IrDA data communications port 120 which might be collected in the customer's IrDA-enabled PDA 122 in hand at the time of the retail transaction.

Figure 13A:
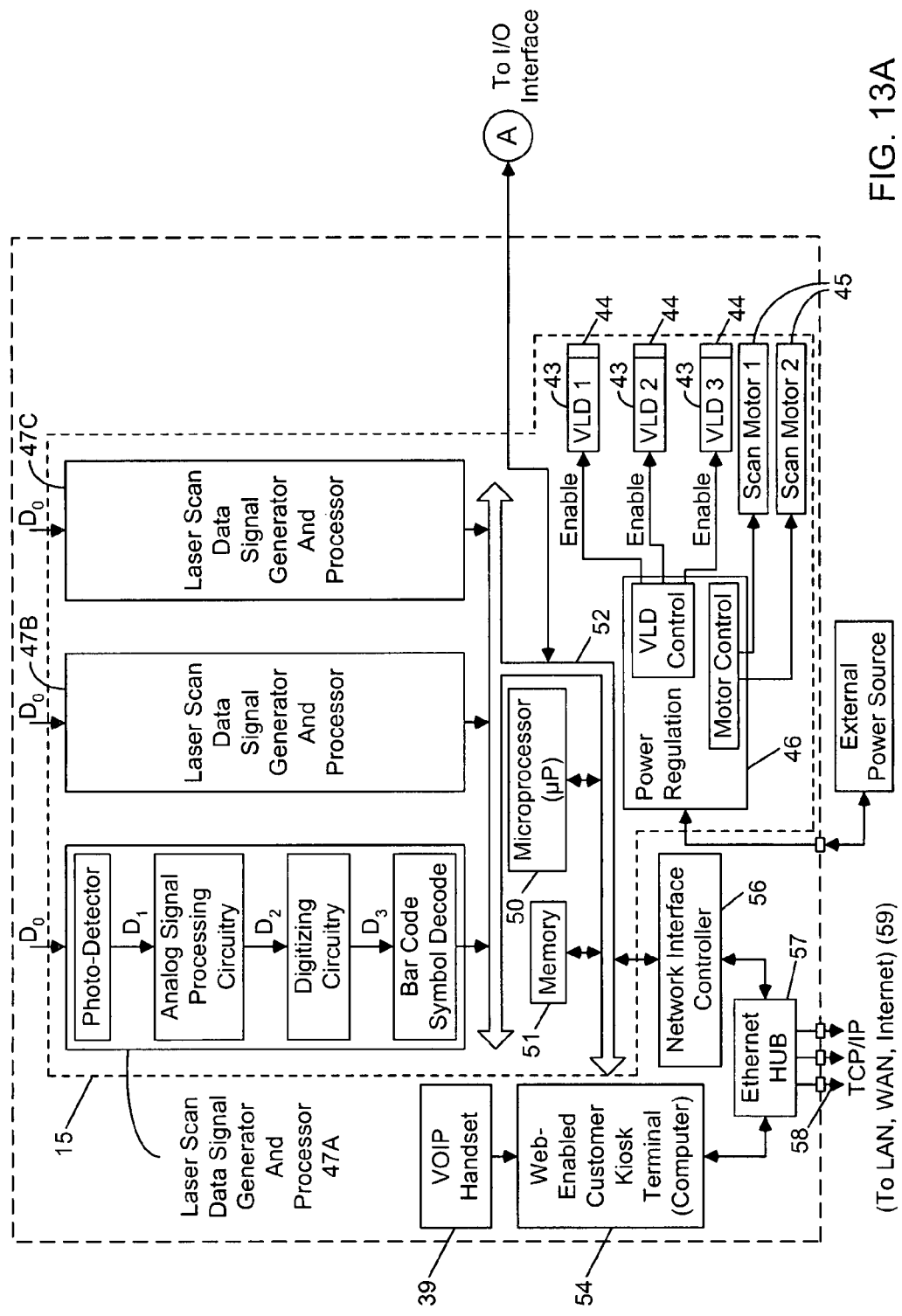
FIGS. 13A and 13B, taken together, set forth a block-schematic representation of the system diagram of the POS-based bar code reading system of the present invention with an integrated Internet-enabled customer-kiosk terminal as shown in FIGS. 9 through 12B.
Figure 13B:
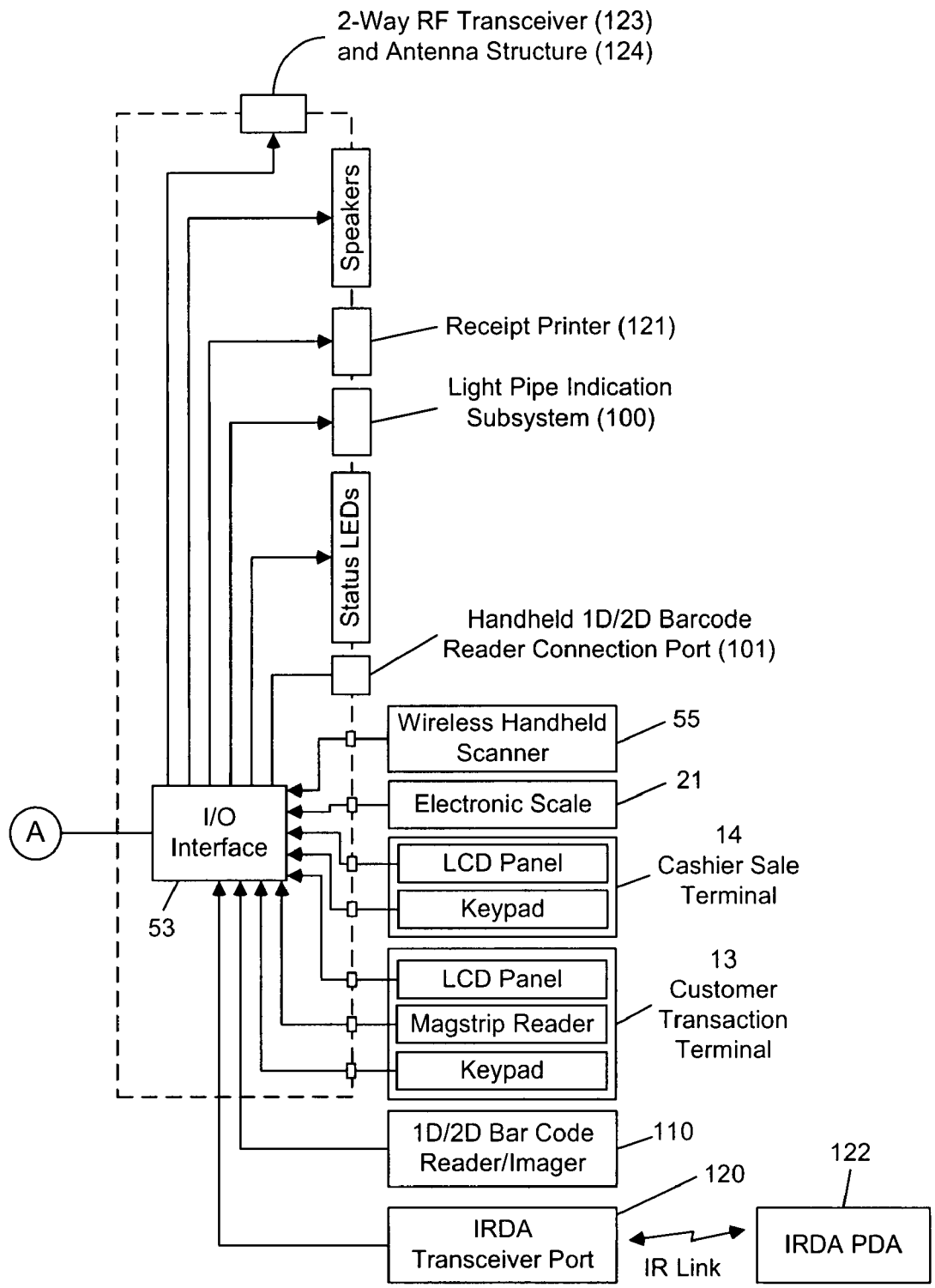

In FIGS. 13A and 13B, a system diagram is provided for the POS-based bar code reading system with an integrated internet-enabled customer-kiosk terminal 11' illustrated in FIGS. 9 through 12B. As shown, the system 11' comprises: a plurality of VLDs 43, light focusing optics 44, scanning motors 45 power regulation circuitry 46 and scanning optics (as part of unit 15) for producing and scanning laser scanning beams so as to project a laser scanning pattern through the horizontal and vertical scanning windows of the system, and scan bar codes on objects being moved thereby by the cashier, and light collection optics for collecting the focusing the return laser light signal for subsequent photodetection; a plurality of laser scan data generator and processing modules 47A, 47B and 47C, including a plurality of photodetectors, for producing scan data signals D0 through D3, that are ultimately decode-processed in order to produce symbol character data representative of the bar code symbol scanned by the system; a microprocessor 50, memory architecture 51, system bus architecture (having different levels of buses) 52 and an I/O interface 53 connected to such buses for enabling the collection, processing and transport of data elements generated by the various components in the system; cashier-scale terminal 14 having a LCD panel, keypad and associated circuitry; customer-transaction terminal 13 (i.e. having a LCD panel, a keypad, a magstripe reader, and associated circuitry); Internet-enabled customer-kiosk terminal (i.e. computer subsystem) 54 realized as a microcomputing system running an operating system (OS), networking software to support the TCP/IP protocol, Internet access software (e.g. Web browser software such as Microsoft Explorer) to access the WWW and other information resources on the Internet, and peripheral hardware and software components such as a LCD panel 36, touch-screen keypad 37 mounted thereon (forming customer transaction terminal 13), and a speech/voice recognition interface and a bar code symbol reader integrated with the microcomputing system; voice-over-IP telephone handset 39 integrated with the microcomputing system, and having software components running thereon to support its voice communication functions over the Internet, or alternatively, over a Public Telecommunications Switching Network (PTSN) in a manner known in the art; a network interface controller (NIC) card 56 operably connected to system bus architecture 52, for enabling data packet communications over an packet-switched information network (e.g. Internet); an multiport Ethernet hub device 57 connected to the NIC card 56 and the Internet-enabled customer-kiosk terminal 54, so that the entire POS-based bar code reading system with internet-enabled customer-kiosk terminal 11' has one or more Ethernet data ports 55 for operable connection to a TCP/IP network such as a retail LAN which, in turn, is connected to the Internet; a LED-driven light-pipe based bar code read indication subsystem 101, as described above, mounted through the surface of the system housing, and being operably connected to the I/O interface 53, and controlled by microprocessor 50; a USB (or like) data communication port connector 101, operably connected to I/O interface 57, for interconnection with a matching USB connector associated with a hand-held 1D/2D bar code reader, or hand-held image-based 1D/2D bar code reader/OCR-enabled imager 102, for reading 1D and 2D bar code symbol structures (e.g. applied to identification cards, passports, shipping labels, etc.) as well as performing OCR processing on alphanumeric character strings printed on similar types of identification cards, shipping labels, forms, and the like in diverse end-user environments; a printer (i.e. thermal or dot-matrix type) 121 installed in the system housing on the customer side thereof for printing customer receipts for the various types of transactions supported by the system; IrDA data communications port 120 installed on the customer side of the system housing, preferably below the LCD panel on that side of the system, for enabling data communication between IrDA-enabled PDAs (122) or PDTs owned or used by the customer to collect electronic data associated with discount coupons, and other kinds of value-added services; and a 2-way RF transceiver 123 interfaced with the I/O subsystem, and a RF antenna structure 124 coupled to RF transceiver 123, enable the system to function as a RF base station in a retail information network (LAN) and support 2-way RF-based high-speed data communication between the base station and multiple wireless RF-based PDTs used by retailers' employees and customers alike in the retail store environment.

As described above, the interactive dual-LCD panel POS-based retail transaction terminal system shown in FIGS. 2 through 8 supports various types of retail transactions. When using this interactive cashier/customer terminal system, both the customer and the cashier or sales clerk (i.e. retailer service personnel) are provided with their own color LCD panel, data entry devices and other peripheral-type transaction-supporting equipment necessary to support data entry and display operations on both the cashier and customer sides of the terminal system.

In the illustrative embodiments, microprocessor 50 within the system runs an interactive retail transaction application program stored in memory 51, shown in FIGS. 8A and 8B. Preferably, this interactive retail transaction application is rapidly developed by the retailer on a separate retailer development computer (i.e. PC) using an integrated development and development environment (IDE) like the one taught in copending application Ser. No. 10/342,441 filed Jan. 12, 2003, incorporated herein by reference, and then downloaded to memory 51 to run on microprocessor 50 during run-time or deployment operations within the retail store environment. Preferably, this IDE is used to develop and program the GUI screens sequentially displayed on the LCD panels of both the cashier and customer terminals in the system, in a manner choreographed according to a retailer's transaction or service script that is carried out by the application during the particular retail transaction. Notably, this IDE employs "WYSIWYG" type GUI display screen editors with simple "drag and drop" operation, visually-operated SQL database editors, and easy to use "event-driven" control logic editors to bind objects at the presentation layer of the system (i.e. within the GUI screens to objects at the database layer of the system (i.e. within the SQL database), occurring at the control layer of the system.

In general, the retailer transaction application will display GUI screens on the cashier's LCD panel s to prompt the cashier or sales clerk to particular forms of human interaction action required to support a specific kind of retail transactions desired by the hosting retailer. At the same time, the retail transaction application also generates corresponding GUI display screens on the customer's LCD panel prompting the customer to respond with appropriate responses and forms of human interactive to carry out the transaction and receive, if desired, particular kinds of services that create value and hopefully meaning in the lives of both the cashier and customer. Notably, within the constraints of the particular retail transaction, the retailer's transaction or service script (embodied within the retailer transaction application) will specify the various scenarios of cashier/customer interaction that the retailer would like to see be played out at the interactive terminal system, so that a particular (ideally unique) kind or brand of customer experience will be consistently delivered to each and every customer that passes through the POS-station, regardless of the level of intellectual and social skills possessed by the retail sales clerk/cashier or customer standing on the other side of the POS-based interactive kiosk terminal system of the present invention, hopefully making eye-to-eye contact with the sales clerk attempting to attend to the needs and wants of the customer, in effort to provide customer satisfaction, and loyalty.

In accordance with such inventive principles, the retailer's transaction or service script (specified by the retailer during application development) can be designed to bring about a particular kind and quality of behavioral interaction between both the cashier/salesclerk and the customer that creates and enhances the brand experience in the retail store, regardless of the fact that the store support high volumes of consumer traffic and offering products and services at discount prices. Such interaction is achieved by displaying GUI screens designed to guide these parties to the retail transaction so that a predetermined quality of customer service is delivered to the customer by the retail cashier/salesclerk at the retailer POS station. At the same time, the retailer's service script can be designed so that it permits a high degree of improvisation naturally demanded by customers and retail cashiers and clerks (i.e. retail service personnel). For example, the retailer's service script can also include the display of motivational and/or inspiring quotes and/or imagery on the LCD panels both the cashier and customer sides of the terminal system, so as to encourage positive attitudes, cordial responses and compassionate levels human interaction within the retail store, in effort to promote a sense of well being and pleasure at the POS-based terminal system.

Figure 14:
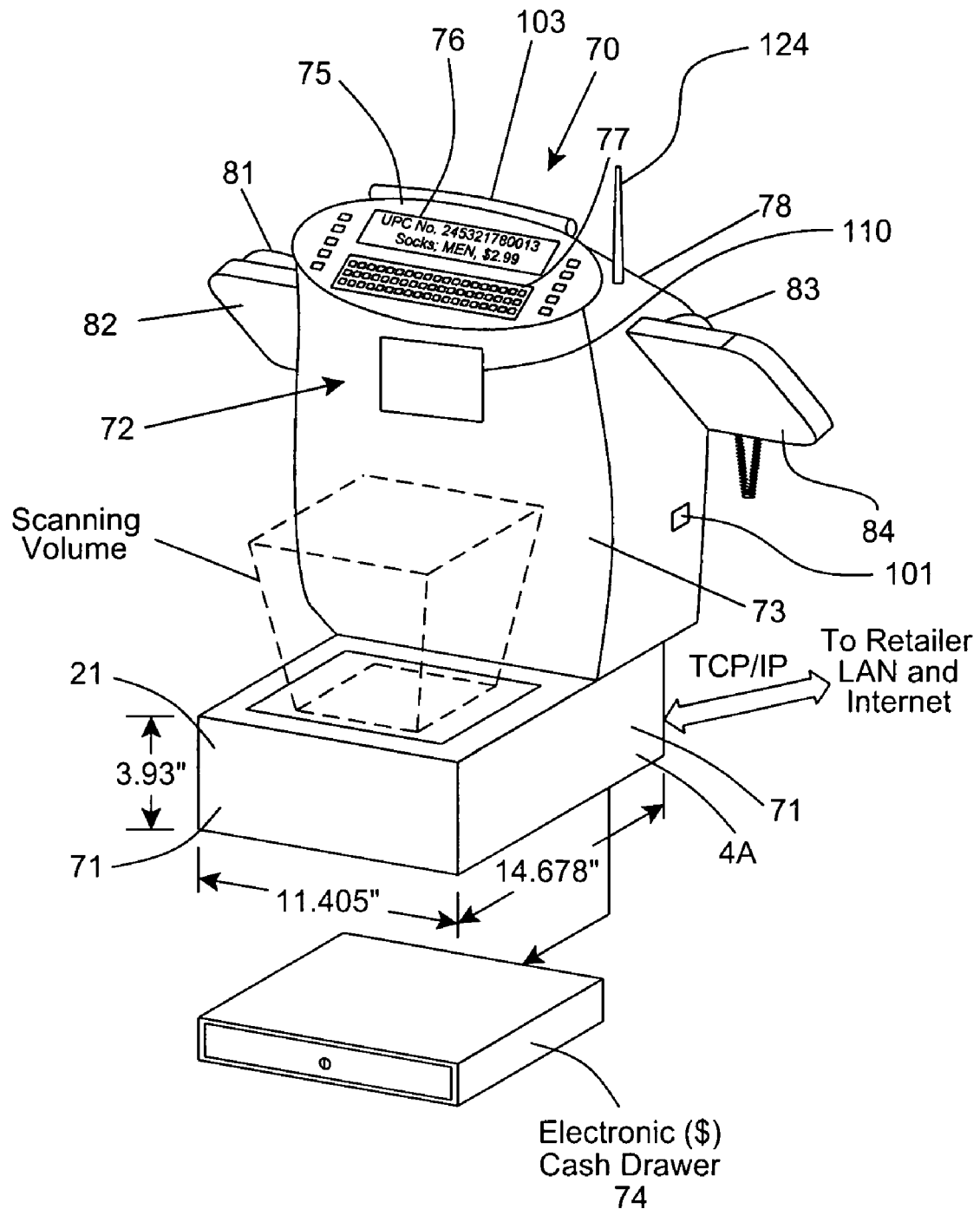
FIG. 14 is the first illustrative of the POS-based bar code reading cash register system with an integrated Internet-enabled customer-kiosk terminal of the present invention, wherein a POS-based bottom laser scanning unit is integrated with a cashier-scale-transaction-terminal/customer-kiosk-terminal unit enclosed in a housing of unitary construction, and having an electronically-controlled cash drawer operably associated with the system.

First Illustrative Embodiment of the POS-Based Bar Code Reading Cash Register System with an Integrated Internet-Enabled Customer-Kiosk Terminal of the Present Invention In FIG. 14, there is shown is a first illustrative of the POS-based bar code reading cash register system with an integrated internet-enabled customer-kiosk terminal of the present invention 70. As shown, a POS-based bottom-type laser scanning bar code reading unit 71 is integrated with a cashier-checkout-terminal/customer-kiosk-terminal unit 72 enclosed in a scanner/kiosk housing 73 of generally unitary construction. Also as shown, the system 70 includes an electronically-controlled cash drawer 74 operably associated with the system, and mountable beneath a counter surface in a manner well known in the art.

As shown in FIG. 14, the POS-based bar code reading cash register system is provided with an integrated 2-D bar code symbol reader 110 located on the cashier's side of the terminal. The purpose of the 2-D bar code symbol reader 110 is to enable the reading of 2-D bar code symbols and optical characters applied on various types of substrates such as, for example, personal identification cards, the holders of which may be required to present by law when entering into particular kinds of consumer transactions (e.g. purchase of alcoholic beverages, tobacco, firearms, ammunition, and other controlled substances). Exemplary 1D/2D bar code symbol readers and linear and area type imagers 110 are disclosed in U.S. Pat. Nos. 6,347,163; 6,123,262; 6,036,094; 5,988,505; 5,621,203; and 5,523,552; as well as in International Application PCT/US01/44011 filed Nov. 21, 2001, published by WIPO as WO 02/43195 A2, each said reference being incorporated herein by reference in its entirety.

Figure 15:
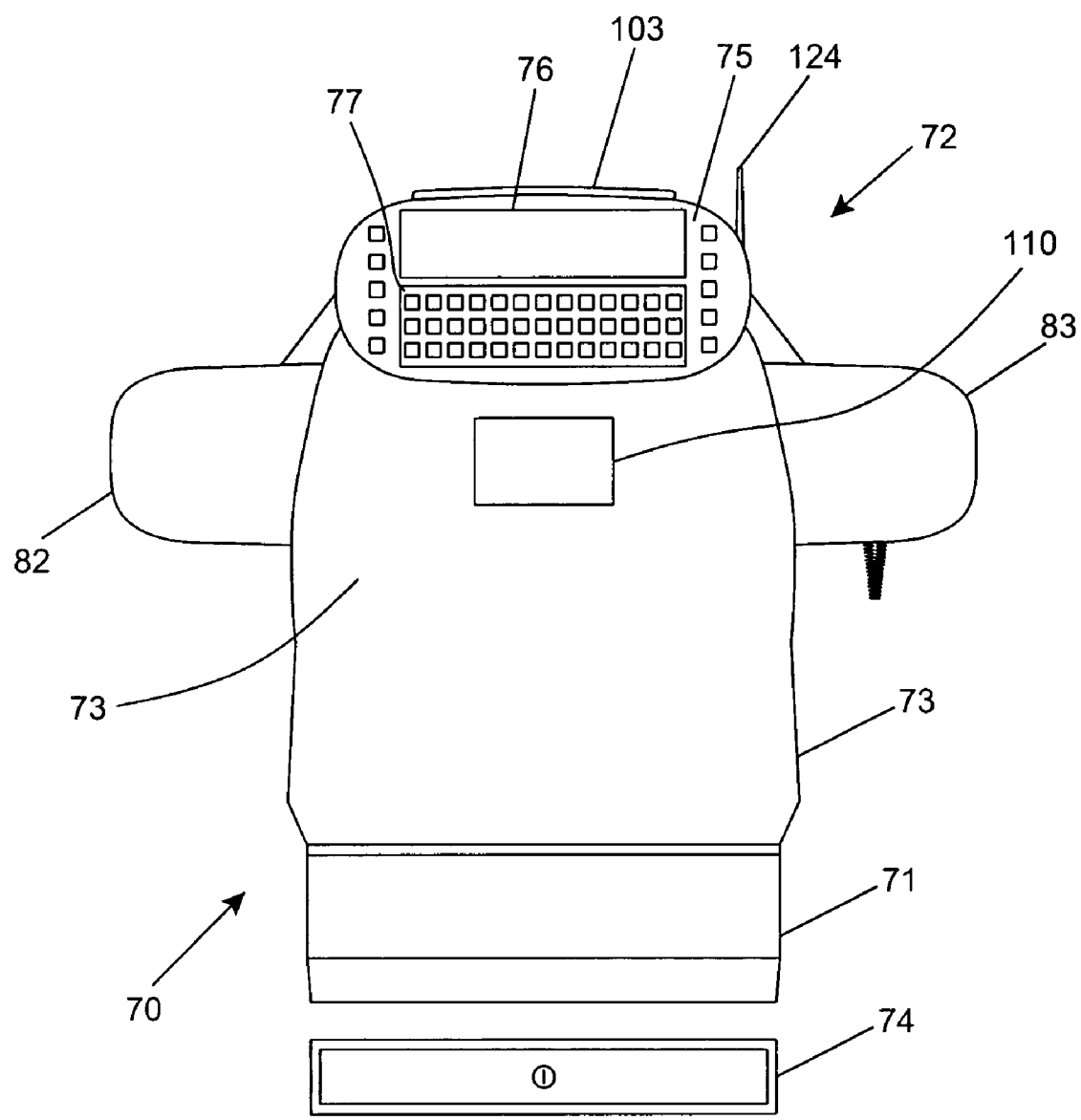
FIG. 15 is an elevated rear view of the POS-based laser scanning bar code reading cash register system with an integrated Internet-enabled customer-kiosk terminal illustrated in FIG. 14, showing the cashier-scale-transaction terminal (with LCD panel and membrane keyboard) provided on the cashier's side of the system.

As shown in FIG. 15, POS-Based Bar Code Reading Cash Register System With An Integrated And Internet-Enabled Customer-Kiosk Terminal 70 comprises: a cashier-transaction terminal 75 (with a LCD panel 76 and a membrane keyboard 77) provided on the cashier's side of the system; a customer-kiosk transaction terminal 78 (with a LCD panel 79 and a touch-screen keyboard 80 integrated therewith) supported on the customer's side of the system as shown; a financial transaction terminal 81 associated with an ATM submodule 82 mounted to a first side of the scanner/kiosk housing; a hand-set 83 associated with the voice-over-IP phone module 84 mounted to the second side of the scanner/kiosk housing; and a courtesy desk surface 85 disposed beneath the customer-kiosk transaction terminal 78. These components are generally similar to the components described in connection with systems shown in FIGS. 3A and 9, supra.

In the preferred embodiment, it will be desirable to provide a vibration damping mechanism between the scale/bar code reader subsystem and the structures that support the customer kiosk terminal where vibrational energy and shock producing forces will be generated during normal operation. The function of the vibration damping mechanism will be to damp such forces and isolate the weigh scale subsystem therefrom to ensure accurate scale readings.

Figure 16:
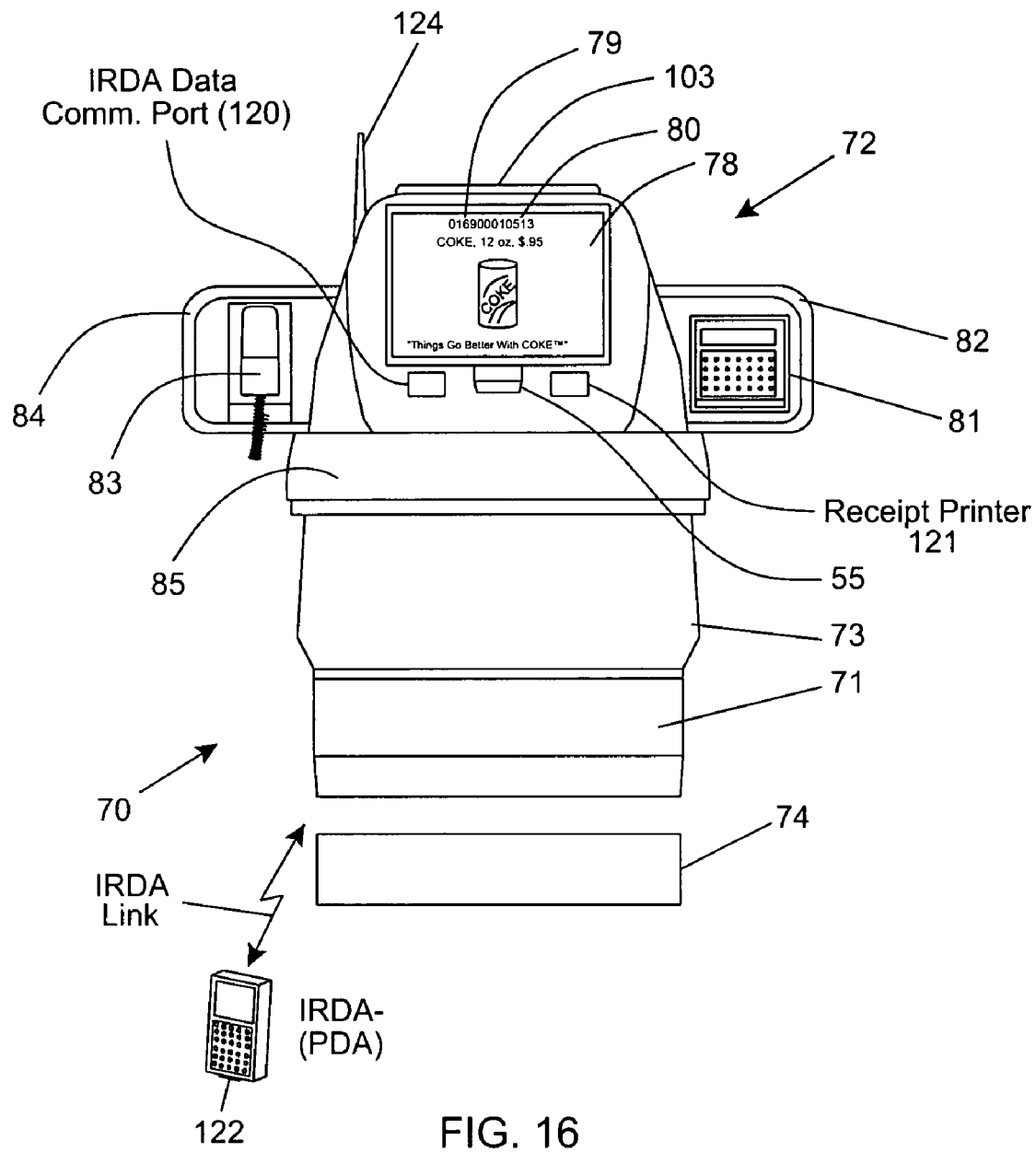
FIG. 16 is an elevated front view of the POS-based bar code reading cash register system with an integrated Internet-enabled customer-kiosk terminal illustrated in FIG. 14, showing (i) the customer-kiosk transaction terminal (with LCD panel and touch-screen keyboard integrated therewith) provided on the customer's side of the system, (ii) the transaction terminal associated with the ATM submodule, (iii) the hand-set associated with the voice-over-IP phone module, and (iv) the courtesy desk surface disposed beneath the customer-kiosk transaction terminal.
Figure 17A:
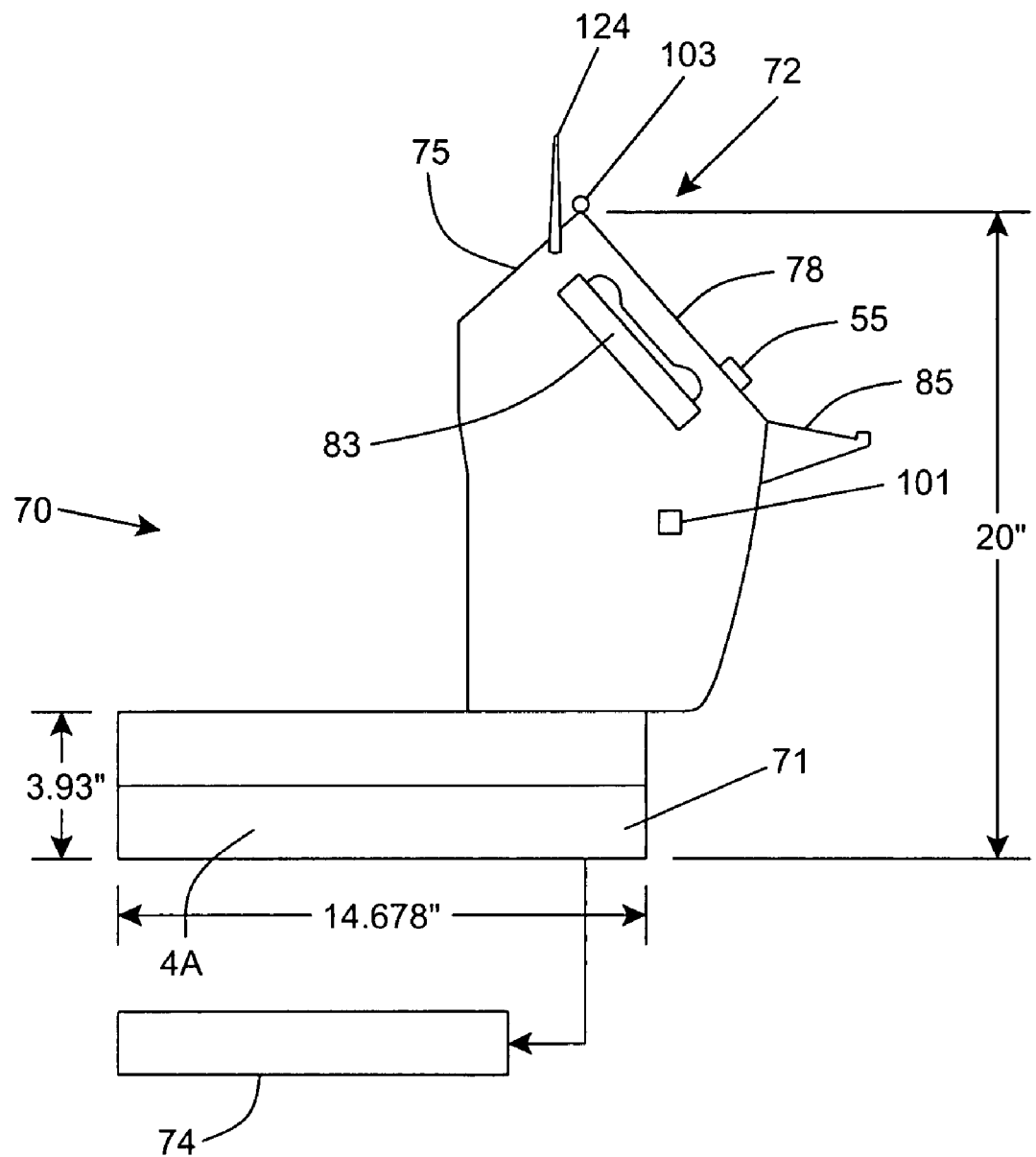
FIG. 17A is an elevated first side view of the POS-based bar code reading cash register system with an integrated Internet-enabled customer-kiosk terminal illustrated in FIG. 14.

Front and rear view of the POS-based bar code reading cash register system with an integrated internet-enabled customer-kiosk terminal 70 are shown in FIGS. 15 and 16, and show how the cashier and customer, respectively, face the system during checkout operations. Side views of the POS-Based Bar Code Reading Cash Register System With An Integrated Internet-Enabled Customer-Kiosk Terminal 70 are shown in FIGS. 17A and 17B.

Figure 17B:
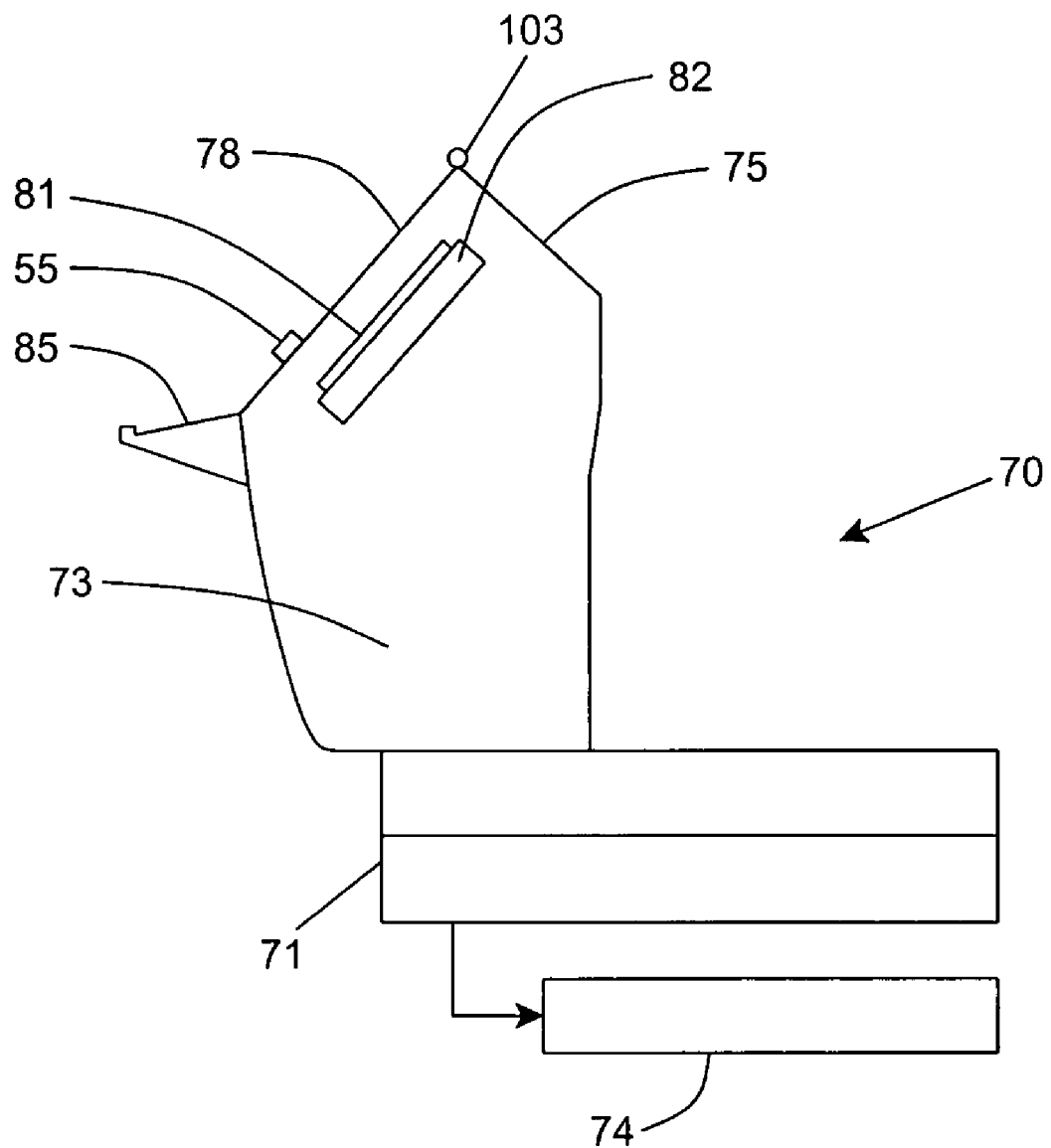
FIG. 17B is an elevated second side view of the POS-based bar code reading cash register system with an integrated Internet-enabled customer-kiosk terminal illustrated in FIG. 14.
Figure 18A:
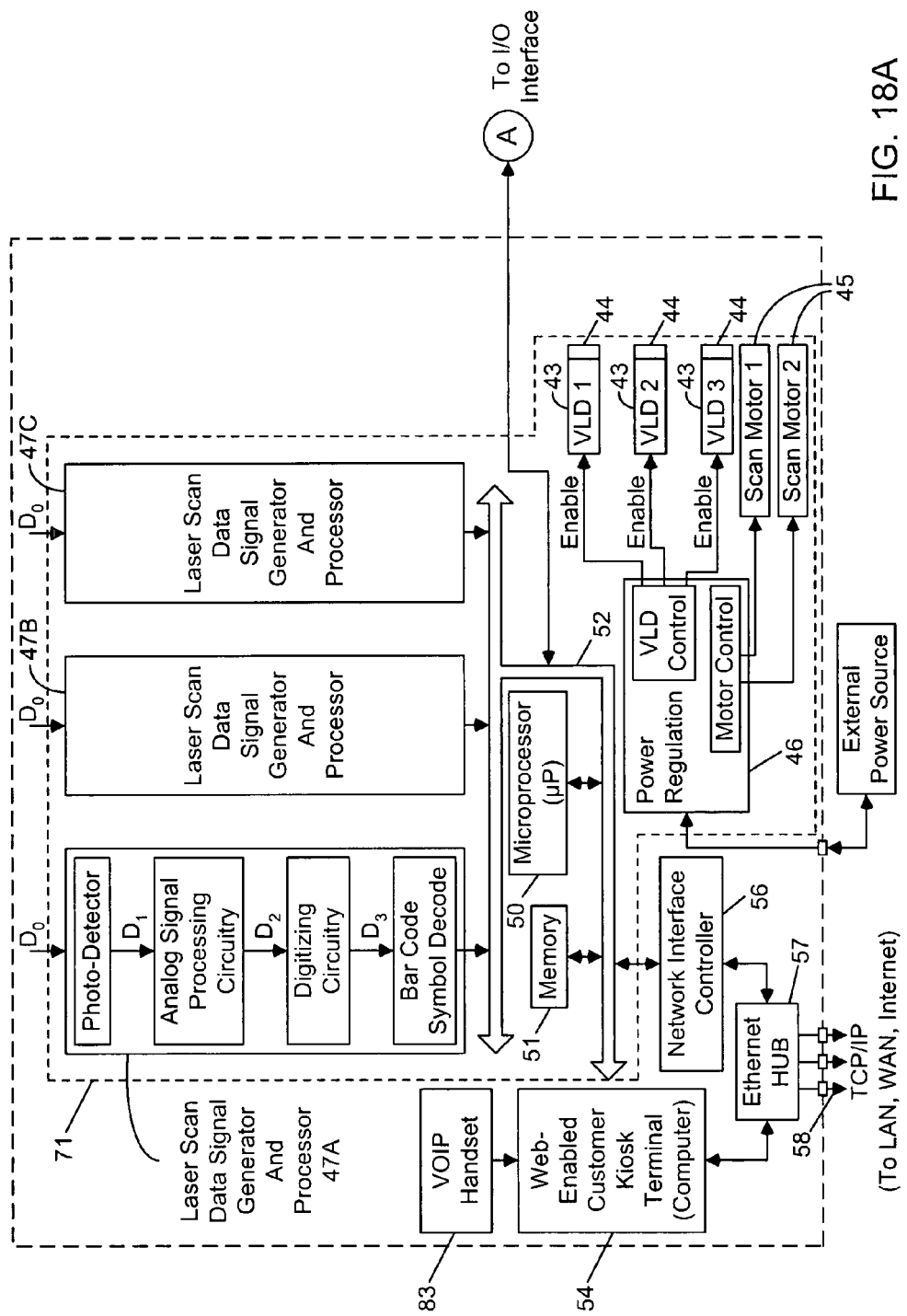
FIGS. 18A and 18B, taken together, set forth a block-schematic representation of the system diagram of the POS-based bar code reading cash register system with an integrated Internet-enabled customer-kiosk terminal shown in FIGS. 14 through 17B.
Figure 18B:
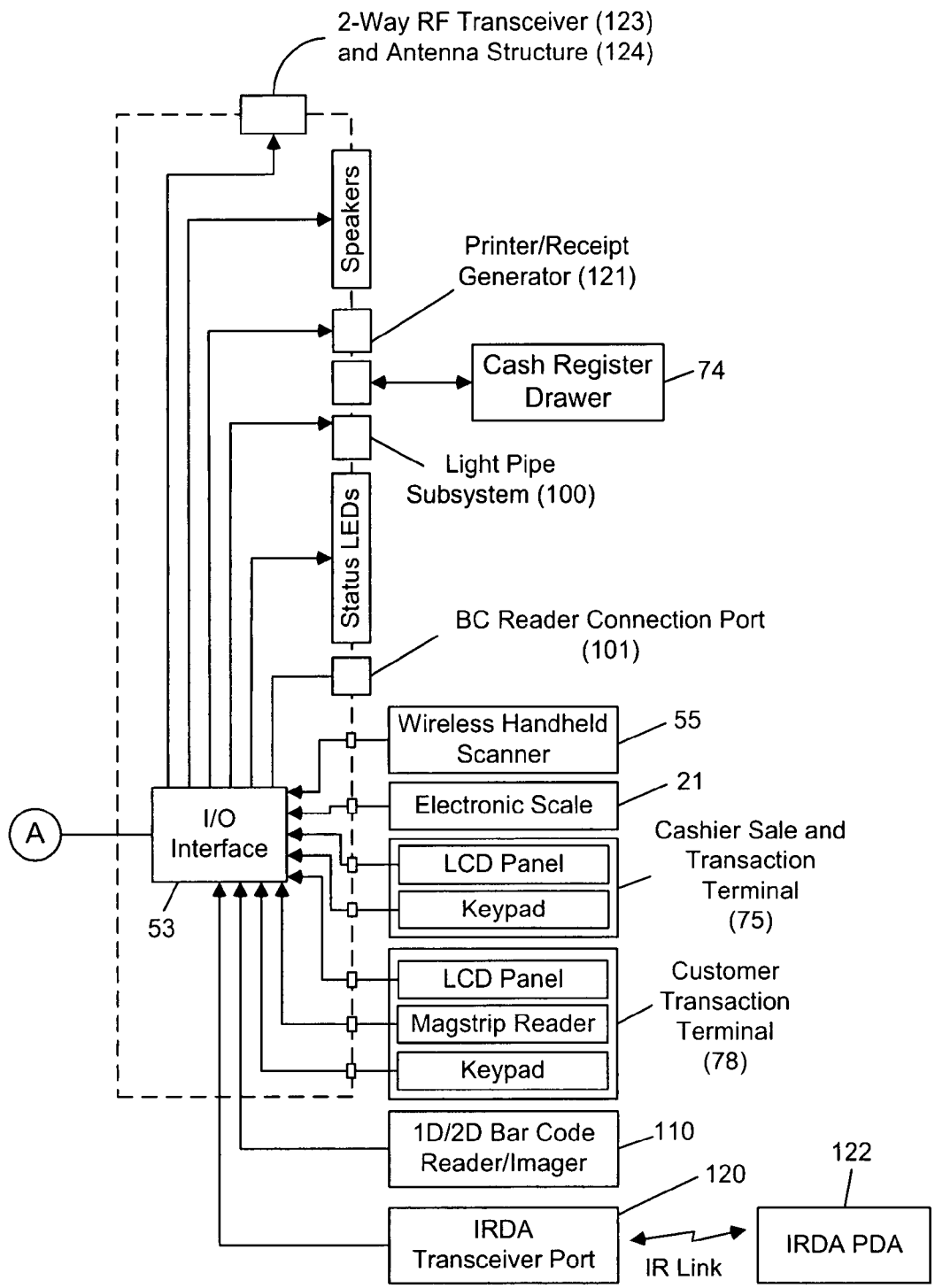

In FIGS. 18A and 18B, a system diagram is provided for the POS-based bar code reading cash register system with an integrated internet-enabled customer-kiosk terminal 70 illustrated in FIGS. 17 through 17B. As shown, the system comprises: a plurality of VLDs 43, light focusing optics 44, scanning motors 45, power regulation circuitry 46, and scanning optics (as part of Unit 71) for producing and scanning laser scanning beams so as to project a laser scanning pattern through the horizontal scanning window of the system, and scan bar codes on objects being moved thereby by the cashier, and light collection optics for collecting the focusing the return laser light signal for subsequent photodetection; a plurality of laser scan data generator and processing modules 47A, 47B and 47C, including a plurality of photodetectors, for producing scan data signals D0 through D3, that are ultimately decode-processed in order to produce symbol character data representative of the bar code symbol scanned by the system; a microprocessor 50, memory architecture 51, system bus architecture (having different levels of buses) 52 and an I/O interface 53 connected to such buses for enabling the collection, processing and transport of data elements generated by the various components in the system; cashier-scale-transaction terminal 75 having LCD panel 76, keypad 77 and associated circuitry, for entering and processing information relating to (i) purchase items to be weighed by the electronic scale subsystem 21, as well as (ii) customer information enabling a consumer transaction to be transacted at the system, and enable the opening of the electronically-controlled cash drawer 74 during the appropriate stage of the consumer transaction; financial transaction terminal 81 (i.e. having LCD panel, keypad, magstripe reader, and associated circuitry); Internet-enabled customer-kiosk terminal (i.e. computer subsystem) 54 realized as a microcomputing system running an operating system (OS), networking software to support the TCP/IP protocol, Internet access software (e.g. Web browser software such as Microsoft Explorer) to access the WWW and other information resources on the Internet, and peripheral hardware and software components such as a LCD panel 79, touch-screen keypad 80 mounted thereon, and a speech/voice recognition interface and a bar code symbol reader integrated with the microcomputing system; voice-over-IP telephone handset 83 integrated with the microcomputing system, and having software components running thereon to support its voice communication functions over the Internet, or alternatively, over a Public Telecommunications Switching Network (PTSN) in a manner known in the art; a network interface controller (NIC) card 56 operably connected to system bus architecture 52, for enabling data packet communications over an packet-switched information network (e.g. Internet); an multiport Ethernet hub device 57 connected to the NIC card and the Internet-enabled customer-kiosk terminal 54, so that entire POS-Based Bar Code Reading System With Internet-Enabled Customer-Kiosk Terminal 70 has one or more Ethernet data ports 55 for operable connection to a TCP/IP network such as a retail LAN which, in turn, is connected to the Internet; a LED-driven light-pipe based bar code read indication subsystem 100, as described above, mounted through the surface of the system housing, and being operably connected to the I/O interface 53, and controlled by microprocessor 50; a USB (or like) data communication port connector 101, operably connected to I/O interface 53, for interconnection with a matching USB connector associated with a hand-held 1D/2D bar code reader, or hand-held image-based 1D/2D bar code reader/OCR-enabled imager 102, for reading 1D and 2D bar code symbol structures (e.g. applied to identification cards, passports, shipping labels, etc.) as well as performing OCR processing on alphanumeric character strings printed on similar types of identification cards, shipping labels, forms, and the like in diverse end-user environments; a printer (i.e. thermal or dot-matrix type) 121 installed in the system housing on the customer side thereof for printing customer receipts for the various types of transactions supported by the system; IrDA data communications port 120 installed on the customer side of the system housing, preferably below the LCD panel on that side of the system, for enabling data communication between IrDA-enabled PDAs (122) or PDTs owned or used by the customer to collect electronic data associated with discount coupons, and other kinds of value-added services; and a 2-way RF transceiver 123 interfaced with the I/O subsystem, and a RF antenna structure 124 coupled to RF transceiver 123, enable the system to function as a RF base station in a retail information network (LAN) and support 2-way RF-based high-speed data communication between the base station and multiple wireless RF-based PDTs used by retailers' employees and customers alike in the retail store environment.

Notably, each submodule described above can be provided with a spring-biased hinge-type connector designed to establish the necessary electrical and physical connections between the module and the system housing, while enabling the module to (i) undergo controlled rotation about its hinge when struck by an outside force such as when the customer's hand or arm strikes the module during customer interaction, (ii) retract in a controlled manner, and (iii) automatically return to its original unretracted position. Such a module connector mechanism should reduce the risk of damage to the system and its subcomponents and possibly customers who might bump into the service modules during checkout operations.

As shown, an IrDA data communications port 120 is provided on the customer's side of the system below the LCD panel. The purpose of this IrDA communications port is to collect data (e.g. electronic coupon data) collected by an IrDA-enabled PDA used by the customer to collect electronic coupons in or outside of the retailer's store. During the retail transaction, the customer will be prompted by a particular service screen displayed on the LCD panel on the customer's side, to scan any bar coded coupons (or barcode ID card) using 1D/2D bar code reader 55 or transmit any electronic coupons to IrDA data communications port 120 which might be collected in the customer's IrDA-enabled PDA 122 in hand at the time of the retail transaction.

As described above, the interactive dual-LCD panel POS-based retail transaction terminal system, shown in FIGS. 2 through 8 supports various types of retail transactions. When using this interactive cashier/customer terminal system, both the customer and the cashier or sales clerk (i.e. retailer service personnel) are provided with their own color LCD panel, data entry devices and other peripheral-type transaction-supporting equipment necessary to support data entry and display operations on both the cashier and customer sides of the terminal system.

In the illustrative embodiments, microprocessor 50 within the system runs an interactive retail transaction application program stored in memory 51, shown in FIGS. 8A and 8B. Preferably, this interactive retail transaction application is rapidly developed by the retailer on a separate retailer development computer (i.e. PC) using an integrated development and development environment (IDE) like the one taught in copending application Ser. No. 10/342,441 filed Jan. 12, 2003, incorporated herein by reference, and then downloaded to memory 51 to run on microprocessor 50 during run-time or deployment operations within the retail store environment. Preferably, this IDE is used to develop and program the GUI screens sequentially displayed on the LCD panels of both the cashier and customer terminals in the system, in a manner choreographed according to a retailer's transaction or service script that is carried out by the application during the particular retail transaction. Notably, this IDE employs "WYSIWYG" type GUI display screen editors with simple "drag and drop" operation, visually-operated SQL database editors, and easy to use "event-driven" control logic editors to bind objects at the presentation layer of the system (i.e. within the GUI screens to objects at the database layer of the system (i.e. within the SQL database), occurring at the control layer of the system.

In general, the retailer transaction application will display GUI screens on the cashier's LCD panel s to prompt the cashier or sales clerk to particular forms of human interaction action required to support a specific kind of retail transactions desired by the hosting retailer. At the same time, the retail transaction application also generates corresponding GUI display screens on the customer's LCD panel prompting the customer to respond with appropriate responses and forms of human interactive to carry out the transaction and receive, if desired, particular kinds of services that create value and hopefully meaning in the lives of both the cashier and customer. Notably, within the constraints of the particular retail transaction, the retailer's transaction or service script (embodied within the retailer transaction application) will specify the various scenarios of cashier/customer interaction that the retailer would like to see be played out at the interactive terminal system, so that a particular (ideally unique) kind or brand of customer experience will be consistently delivered to each and every customer that passes through the POS-station, regardless of the level of intellectual and social skills possessed by the retail sales clerk/cashier or customer standing on the other side of the POS-based interactive kiosk terminal system of the present invention, hopefully making eye-to-eye contact with the sales clerk attempting to attend to the needs and wants of the customer, in effort to provide customer satisfaction, and loyalty.

In accordance with such inventive principles, the retailer's transaction or service script (specified by the retailer during application development) can be designed to bring about a particular kind and quality of behavioral interaction between both the cashier/salesclerk and the customer that creates and enhances the brand experience in the retail store, regardless of the fact that the store support high volumes of consumer traffic and offering products and services at discount prices. Such interaction is achieved by displaying GUI screens designed to guide these parties to the retail transaction so that a predetermined quality of customer service is delivered to the customer by the retail cashier/salesclerk at the retailer POS station. At the same time, the retailer's service script can be designed so that it permits a high degree of improvisation naturally demanded by customers and retail cashiers and clerks (i.e. retail service personnel). For example, the retailer's service script can also include the display of motivational and/or inspiring quotes and/or imagery on the LCD panels both the cashier and customer sides of the terminal system, so as to encourage positive attitudes, cordial responses and compassionate levels human interaction within the retail store, in effort to promote a sense of well being and pleasure at the POS-based terminal system.

By virtue of its novel construction, the POS-based bar code reading cash register system with an integrated internet-enabled customer-kiosk terminal 70 shown in FIG. 14 is capable of performing all of the functions enabled by the bioptical scanner 28, the ATM terminal 6, the price display panel 3, and the cash register computer 4 configured together in the prior art POS-based checkout counter system shown in FIG. 1. Moreover, the system 70 of the present invention does so in a system form factor having a unitary construction that occupies only a fraction of the space required by prior art system of FIG. 1, while enabling a variety of Internet-based services that offer real value to customers as they are checking out their purchase items.

Figure 19:
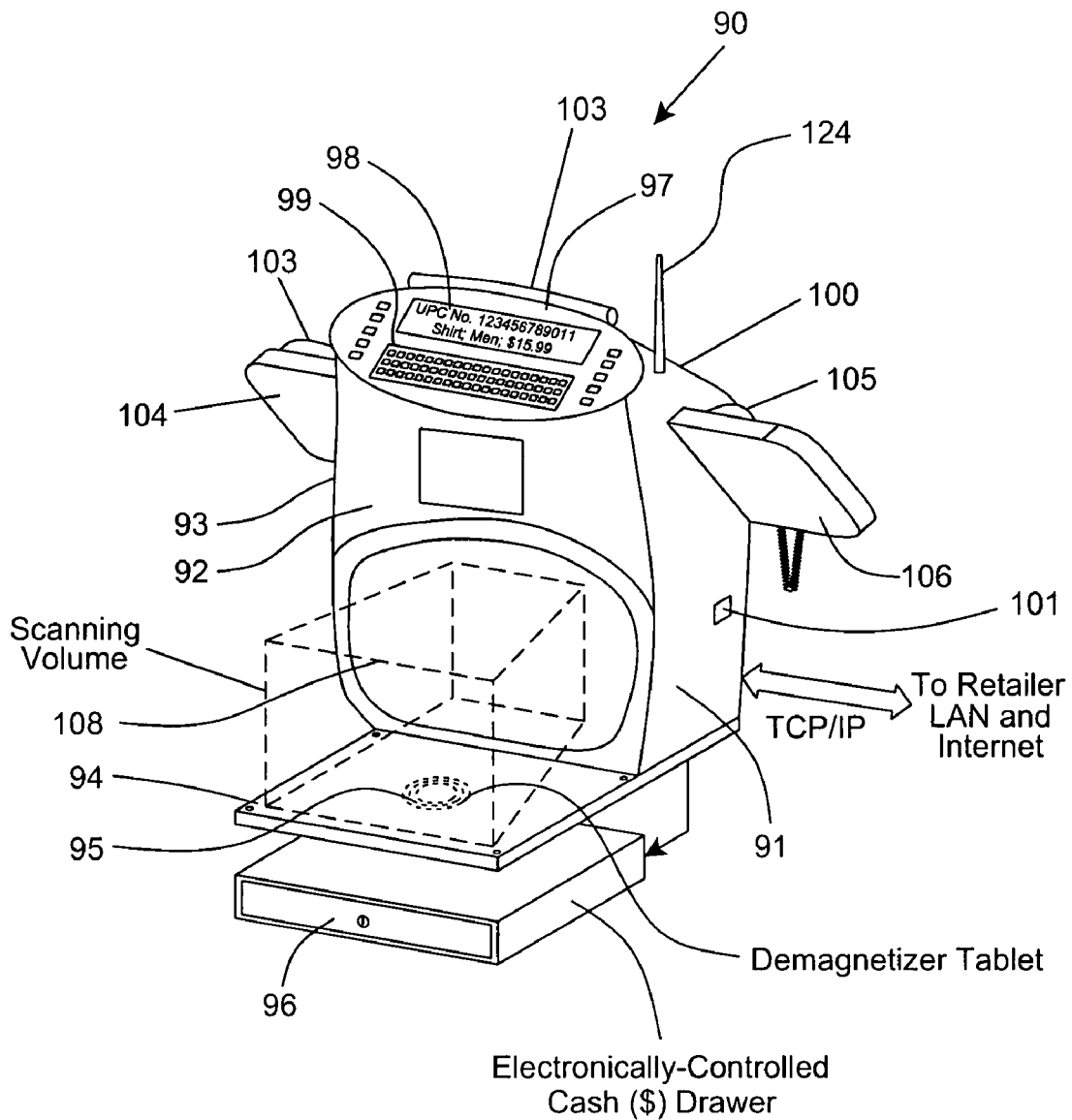
FIG. 19 is a perspective view of the second illustrative of the POS-based bar code reading cash register system with Internet-enabled customer-kiosk terminal of the present invention, wherein a POS-based vertical/projection laser scanning bar code reading unit is integrated with a cashier-transaction-terminal/customer-kiosk-terminal unit enclosed in a housing of unitary construction and having an electronically-controlled cash drawer operably associated with the system, and wherein the base portion of the system (mountable to a countertop surface) contains an electromagnetic-based demagnetization coil structure for demagnetizing product security tags, labels and the like during retail checkout operations.

Second Illustrative Embodiment of the POS-Based Bar Code Reading Cash Register System with an Integrated Internet-Enabled Customer-Kiosk Terminal of the Present Invention In FIG. 19, there is illustrated the second illustrative of the POS-based scanning cash register system with an integrated internet-enabled customer-kiosk terminal of the present invention 90. As shown therein, a POS-based vertical/projection-type laser scanning bar code reading unit 91 is integrated with a cashier-transaction-terminal/customer-kiosk-terminal unit 92 and enclosed in a housing 93 of unitary construction. As there is no horizontal scanning unit in this design, the system is supported upon a relatively thin (e.g. 2") base plate-like structure 94 which contains an electromagnetic-based demagnetization coil structure 95 for demagnetizing product security tags, labels and the like during retail checkout operations. Also, an electronically-controlled cash drawer 96, which can be mounted beneath a counter surface, is operably associated with the system.

As shown in FIG. 19, the POS-based bar code reading cash register system 90 is provided with an integrated 1-D/2-D bar code symbol reader located on the cashier's side of the terminal. The purpose of the 2-D bar code symbol reader is to enable the reading of 2-D bar code symbols and optical characters applied on various types of substrates such as, for example, personal identification cards, the holders of which may be required to present by law when entering into particular kinds of consumer transactions (e.g. purchase of alcoholic beverages, tobacco, firearms, ammunition, and other controlled substances). Exemplary 1D/2D bar code symbol readers and linear and area type imagers 110 are disclosed in U.S. Pat. Nos. 6,347,163; 6,123,262; 6,036,094; 5,988,505; 5,621,203; and 5,523,552; as well as in International Application PCT/US01/44011 filed Nov. 21, 2001, published by WIPO as WO 02/43195 A2, each said reference being incorporated herein by reference in its entirety.

Figure 20:
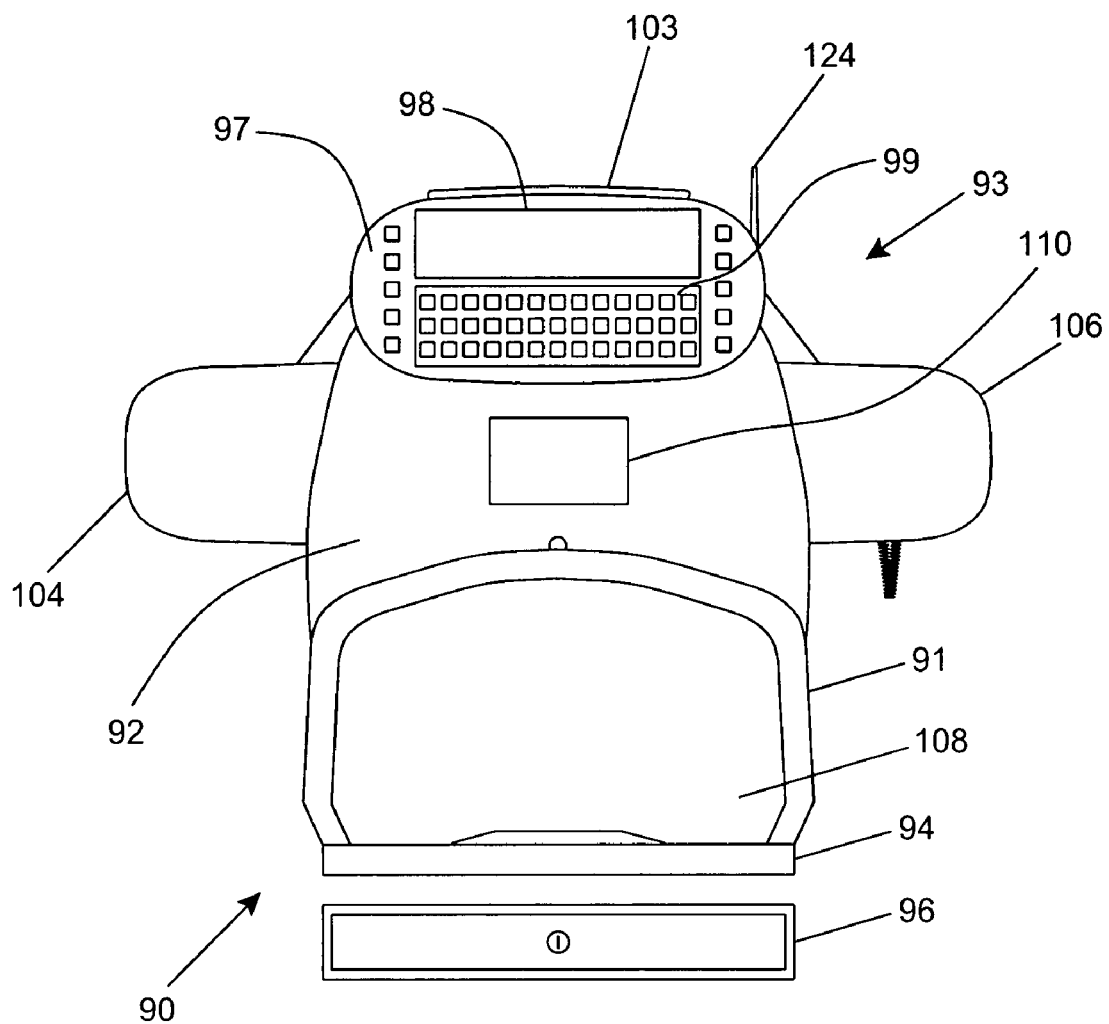
FIG. 20 is an elevated rear view of the POS-based bar code reading cash register system with an integrated Internet-enabled customer-kiosk terminal illustrated in FIG. 19, showing the cashier-transaction terminal (with LCD panel and membrane keyboard) provided on the cashier's side of the system.

As shown in FIG. 20, POS-based bar code reading cash register system with an integrated and internet-enabled customer-kiosk terminal 90 comprises: a cashier-transaction terminal 97 (with a LCD panel 98 and a membrane keyboard 99) provided on the cashier's side of the system; a customer-kiosk transaction terminal 100 (with a LCD panel 101 and a touch-screen keyboard 102 integrated therewith) supported on the customer's side of the system; a financial transaction terminal 103 associated with an ATM submodule 104 mounted to a first side of the scanner/kiosk housing 93; a hand-set 105 associated with the voice-over-IP phone module 106 mounted to the second side of the scanner/kiosk housing 93; and a courtesy desk surface 107 disposed beneath the customer-kiosk transaction terminal 100. Most of these components are generally similar to the components described in connection with systems shown in FIG. 14, supra.

Figure 21:
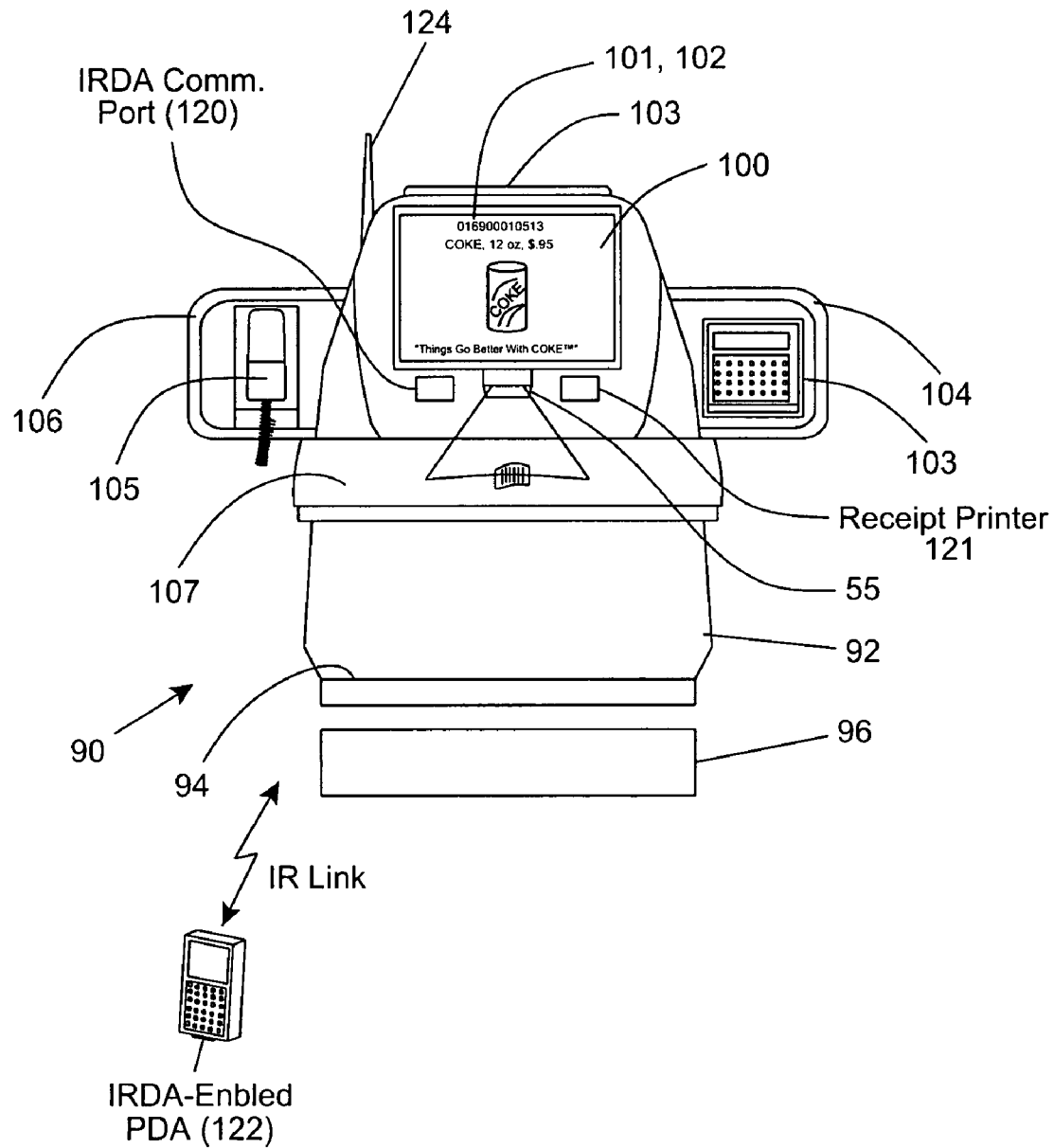
FIG. 21 is an elevated front view of the POS-based bar code reading cash register system with an integrated Internet-enabled customer-kiosk terminal illustrated in FIG. 20, showing (i) the customer-kiosk transaction terminal (with LCD panel and touch-screen keyboard integrated therewith) provided on the customer's side of the system, (ii) the transaction terminal associated with the ATM submodule, (iii) the hand-set associated with the voice-over-IP phone module, and (iv) the courtesy desk surface disposed beneath the customer-kiosk transaction terminal.
Figure 22A:
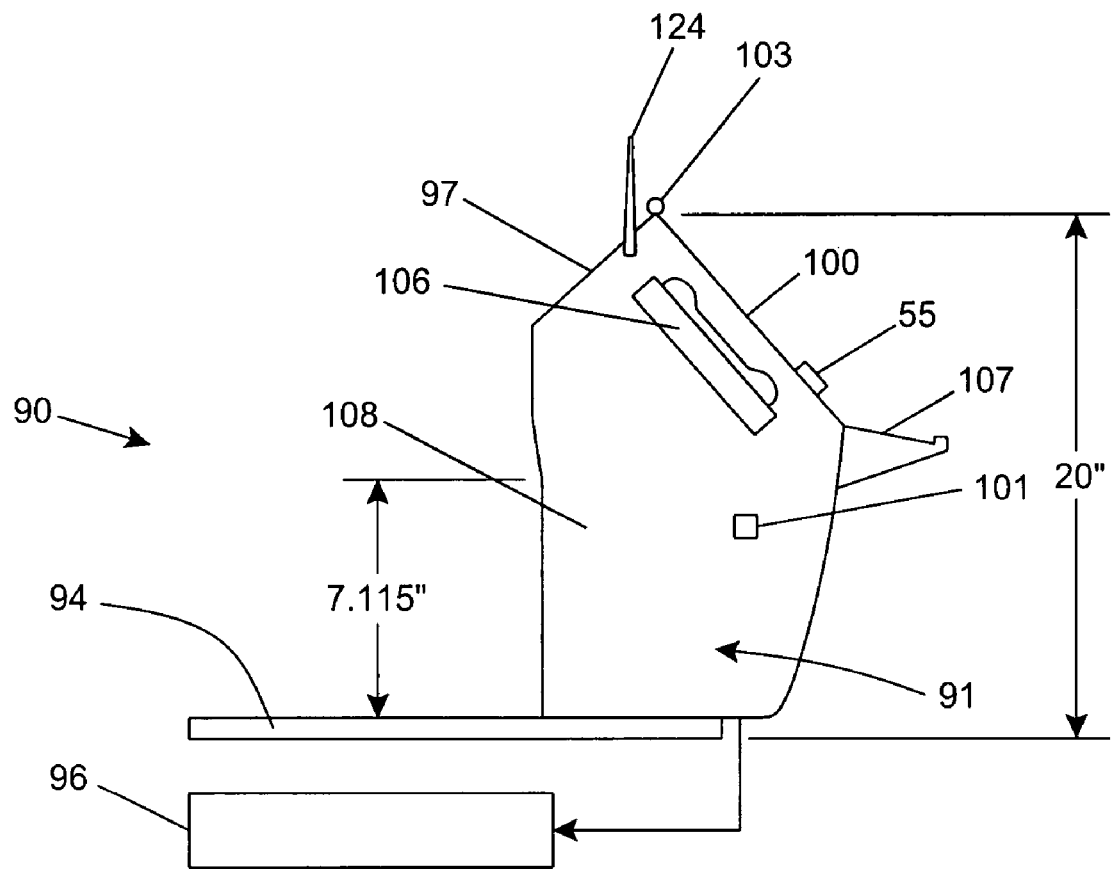
FIG. 22A is an elevated first side view of the POS-based bar code reading cash register system with an integrated Internet-enabled customer-kiosk terminal illustrated in FIG. 19.
Figure 22B:
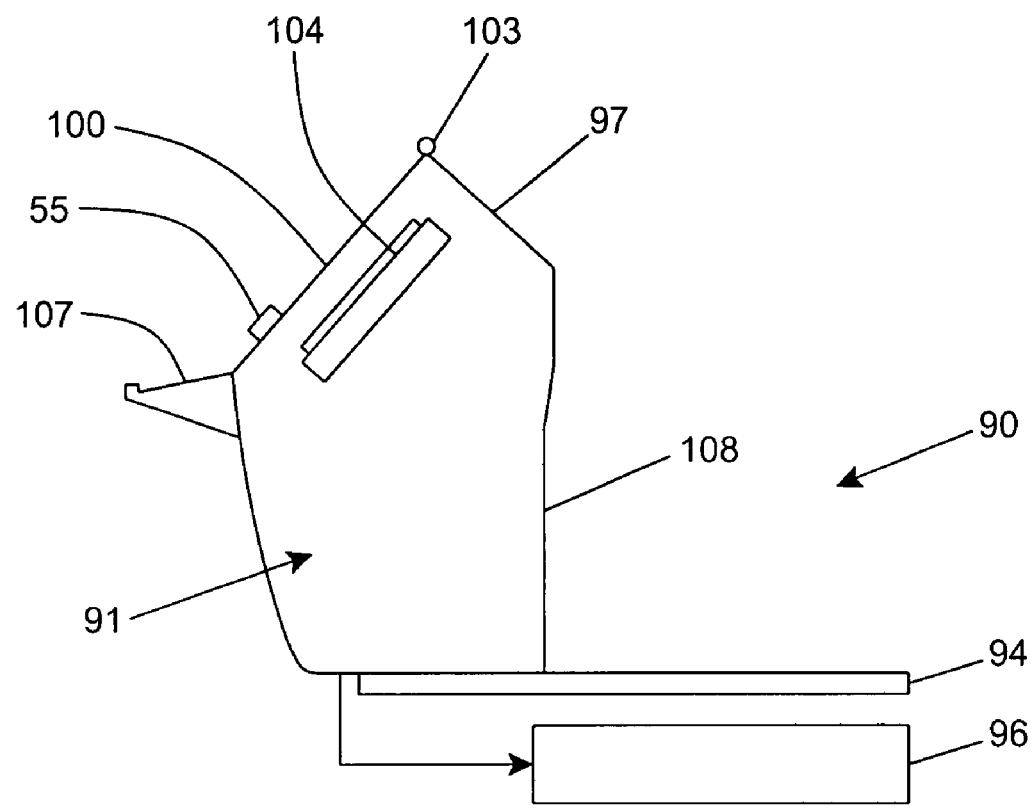
FIG. 22B is an elevated second side view of the POS-based bar code reading cash register system with an integrated internet-enabled customer-kiosk terminal illustrated in FIG. 19.

Front and rear view of the POS-based bar code reading cash register system with an integrated internet-enabled customer-kiosk terminal 90 are shown in FIGS. 20 and 21, and show how the cashier and, respectively, face the system during checkout operations. Side views of the POS-based bar code reading cash register system with an integrated internet-enabled customer-kiosk terminal 90 are shown in FIGS. 22A and 22B.

In the preferred embodiment, it will be desirable to provide a vibration damping mechanism between the scale/bar code reader subsystem and the structures that support the customer kiosk terminal where vibrational energy and shock producing forces will be generated during normal operation. The function of the vibration damping mechanism will be to damp such forces and isolate the weigh scale subsystem therefrom to ensure accurate scale readings.

Notably, each submodule described above can be provided with a spring-biased hinge-type connector designed to establish the necessary electrical and physical connections between the module and the system housing, while enabling the module to (i) undergo controlled rotation about its hinge when struck by an outside force such as when the customer's hand or arm strikes the module during customer interaction, (ii) retract in a controlled manner, and (iii) automatically return to its original unretracted position. Such a module connector mechanism should reduce the risk of damage to the system and its subcomponents and possibly customers who might bump into the service modules during checkout operations.

As shown, an IrDA data communications port 120 is provided on the customer's side of the system below the LCD panel. The purpose of this IrDA communications port is to collect data (e.g. electronic coupon data) collected by an IrDA-enabled PDA used by the customer to collect electronic coupons in or outside of the retailer's store. During the retail transaction, the customer will be prompted by a particular service screen displayed on the LCD panel on the customer's side, to scan any bar coded coupons (or barcode ID card) using 1D/2D bar code reader 55 or transmit any electronic coupons to IrDA data communications port 120 which might be collected in the customer's IrDA-enabled PDA 122 in hand at the time of the retail transaction.

Figure 23A:
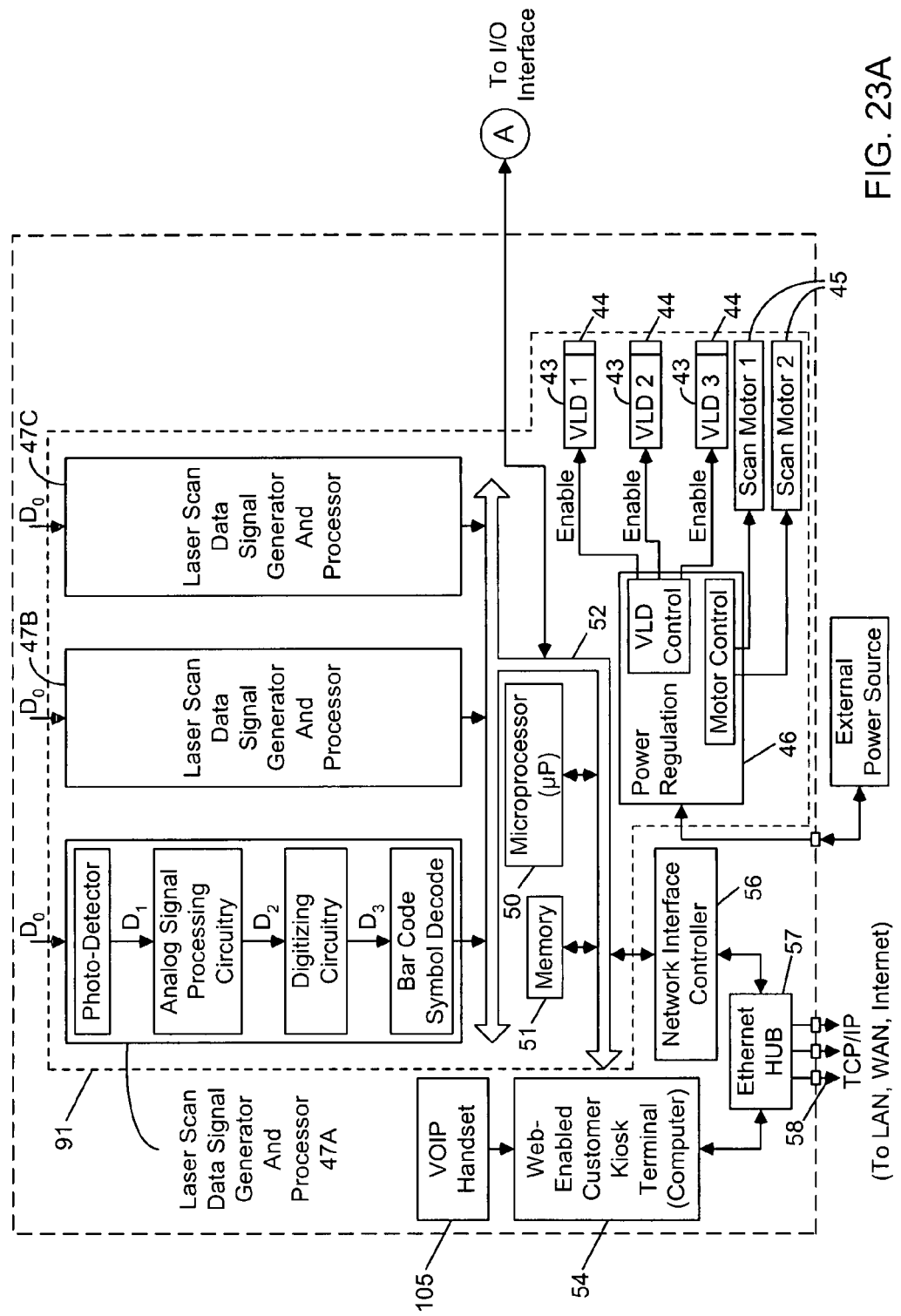
FIGS. 23A and 23B, taken together, set forth a block-schematic representation of the system diagram of the POS-based bar code reading cash register system with an integrated Internet-enabled customer-kiosk terminal shown in FIGS. 19 through 22B.
Figure 23B:
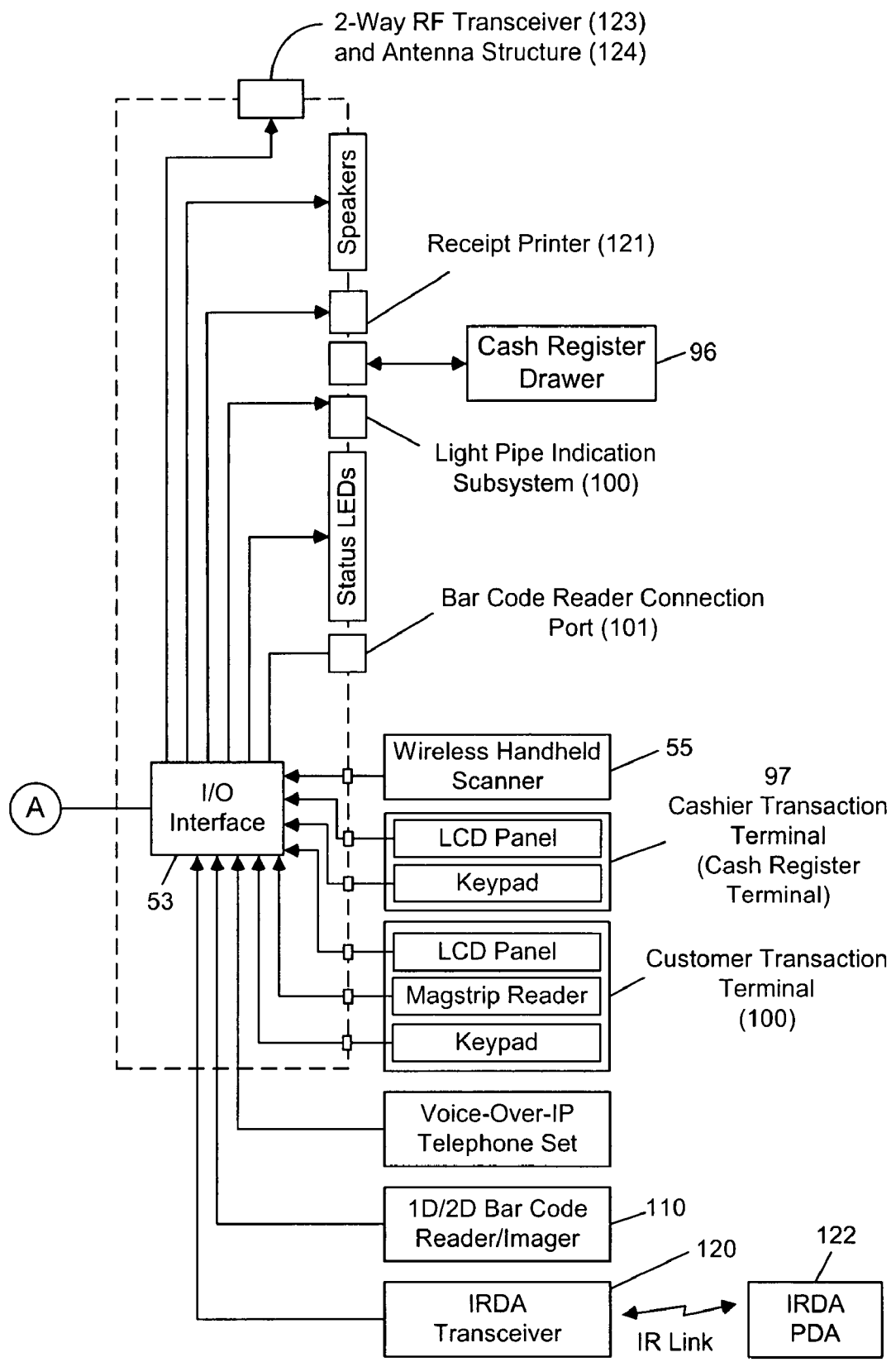

In FIG. 23, a system diagram is provided for the POS-based bar code reading cash register system with an integrated internet-enabled customer-kiosk terminal 90 illustrated in FIGS. 22A through 22B. As shown, the system comprises: a plurality of VLDs 43, light focusing optics 44, scanning motors 45, power regulation circuitry 46, and scanning optics (as part of Unit 91) for producing and scanning laser scanning beams so as to project a laser scanning pattern through the vertical scanning window 108 of the system, and scan bar codes on objects being moved thereby by the cashier, and light collection optics for collecting the focusing the return laser light signal for subsequent photodetection; a plurality of laser scan data generator and processing modules 47A, 47B and 47C, including a plurality of photodetectors, for producing scan data signals D0 through D3, that are ultimately decode-processed in order to produce symbol character data representative of the bar code symbol scanned by the system; a microprocessor 50, memory architecture 51, system bus architecture (having different levels of buses) 52 and an I/O interface 53 connected to such buses for enabling the collection, processing and transport of data elements generated by the various components in the system; cashier-transaction terminal 97 having LCD panel 98, keypad 99 and associated circuitry, for entering and processing information relating to (i) purchase items and (ii) customer information to enable a consumer transaction to be transacted at the system, and enable the opening of the electronically-controlled cash drawer 96 during the appropriate stage of the consumer transaction; customer-transaction terminal 103 (i.e. having LCD panel, keypad, magstripe reader, and associated circuitry); Internet-enabled customer-kiosk terminal (i.e. computer subsystem) 54 realized as a microcomputing system running an operating system (OS), networking software to support the TCP/IP protocol, Internet access software (e.g. Web browser software such as Microsoft Explorer) to access the WWW and other information resources on the Internet, and peripheral hardware and software components such as LCD panel 101, touch-screen keypad 102 mounted thereon, and a speech/voice recognition interface and a bar code symbol reader integrated with the microcomputing system; a voice-over-IP telephone handset 105 integrated with the microcomputing system, and having software components running thereon to support its voice communication functions over the Internet, or alternatively, over a Public Telecommunications Switching Network (PTSN) in a manner known in the art; a network interface controller (NIC) card 56 operably connected to system bus architecture 52, for enabling data packet communications over an packet-switched information network (e.g. Internet); a multiport Ethernet hub device 57 connected to the NIC card and the Internet; a LED-driven light-pipe based bar code read indication subsystem 100, as described above, mounted through the surface of the system housing, and being operably connected to the I/O interface 53, and controlled by microprocessor 50; a USB (or like) data communication port connector 101, operably connected to I/O interface 53, for interconnection with a matching USB connector associated with a hand-held 1D/2D bar code reader, or hand-held image-based 1D/2D bar code reader/OCR-enabled imager 102, for reading 1D and 2D bar code symbol structures (e.g. applied to identification cards, passports, shipping labels, etc.) as well as performing OCR processing on alphanumeric character strings printed on similar types of identification cards, shipping labels, forms, and the like in diverse end-user environments; a printer (i.e. thermal or dot-matrix type) 121 installed in the system housing on the customer side thereof for printing customer receipts for the various types of transactions supported by the system; IrDA data communications port 120 installed on the customer side of the system housing, preferably below the LCD panel on that side of the system, for enabling data communication between IrDA-enabled PDAs (122) or PDTs owned or used by the customer to collect electronic data associated with discount coupons, and other kinds of value-added services; and a 2-way RF transceiver 123 interfaced with the I/O subsystem, and a RF antenna structure 124 coupled to RF transceiver 123, enable the system to function as a RF base station in a retail information network (LAN) and support 2-way RF-based high-speed data communication between the base station and multiple wireless RF-based PDTs used by retailers' employees and customers alike in the retail store environment.

As described above, the interactive dual-LCD panel POS-based retail transaction terminal system, shown in FIGS. 2 through 8, supports various types of retail transactions. When using this interactive cashier/customer terminal system, both the customer and the cashier or sales clerk (i.e. retailer service personnel) are provided with their own color LCD panel, data entry devices and other peripheral-type transaction-supporting equipment necessary to support data entry and display operations on both the cashier and customer sides of the terminal system.

In the illustrative embodiments, microprocessor 50 within the system runs an interactive retail transaction application program stored in memory 51, shown in FIGS. 8A and 8B. Preferably, this interactive retail transaction application is rapidly developed by the retailer on a separate retailer development computer (i.e. PC) using an integrated development and development environment (IDE) like the one taught in copending application Ser. No. 10/342,441 filed Jan. 12, 2003, incorporated herein by reference, and then downloaded to memory 51 to run on microprocessor 50 during run-time or deployment operations within the retail store environment. Preferably, this IDE is used to develop and program the GUI screens sequentially displayed on the LCD panels of both the cashier and customer terminals in the system, in a manner choreographed according to a retailer's transaction or service script that is carried out by the application during the particular retail transaction. Notably, this IDE employs "WYSIWYG" type GUI display screen editors with simple "drag and drop" operation, visually-operated SQL database editors, and easy to use "event-driven" control logic editors to bind objects at the presentation layer of the system (i.e. within the GUI screens to objects at the database layer of the system (i.e. within the SQL database), occurring at the control layer of the system.

In general, the retailer transaction application will display GUI screens on the cashier's LCD panel s to prompt the cashier or sales clerk to particular forms of human interaction action required to support a specific kind of retail transactions desired by the hosting retailer. At the same time, the retail transaction application also generates corresponding GUI display screens on the customer's LCD panel prompting the customer to respond with appropriate responses and forms of human interactive to carry out the transaction and receive, if desired, particular kinds of services that create value and hopefully meaning in the lives of both the cashier and customer. Notably, within the constraints of the particular retail transaction, the retailer's transaction or service script (embodied within the retailer transaction application) will specify the various scenarios of cashier/customer interaction that the retailer would like to see be played out at the interactive terminal system, so that a particular (ideally unique) kind or brand of customer experience will be consistently delivered to each and every customer that passes through the POS-station, regardless of the level of intellectual and social skills possessed by the retail sales clerk/cashier or customer standing on the other side of the POS-based interactive kiosk terminal system of the present invention, hopefully making eye-to-eye contact with the sales clerk attempting to attend to the needs and wants of the customer, in effort to provide customer satisfaction, and loyalty.

In accordance with such inventive principles, the retailer's transaction or service script (specified by the retailer during application development) can be designed to bring about a particular kind and quality of behavioral interaction between both the cashier/salesclerk and the customer that creates and enhances the brand experience in the retail store, regardless of the fact that the store support high volumes of consumer traffic and offering products and services at discount prices. Such interaction is achieved by displaying GUI screens designed to guide these parties to the retail transaction so that a predetermined quality of customer service is delivered to the customer by the retail cashier/salesclerk at the retailer POS station. At the same time, the retailer's service script can be designed so that it permits a high degree of improvisation naturally demanded by customers and retail cashiers and clerks (i.e. retail service personnel). For example, the retailer's service script can also include the display of motivational and/or inspiring quotes and/or imagery on the LCD panels both the cashier and customer sides of the terminal system, so as to encourage positive attitudes, cordial responses and compassionate levels human interaction within the retail store, in effort to promote a sense of well being and pleasure at the POS-based terminal system.

By virtue of its novel construction, the POS-based bar code reading cash register system with an integrated internet-enabled customer-kiosk terminal 90 shown in FIG. 19 is capable of performing all of the functions enabled by the bioptical scanner 2, the ATM terminal 6, the price display panel 3, and the cash register computer 4 configured together in the prior art POS-based checkout counter system 1 shown in FIG. 1. Moreover, system 90 of the present invention does so in a system form factor having a unitary construction that occupies only a fraction of the space required by the prior art system of FIG. 1, while enabling a variety of Internet-based services that offer real value to customers as they are checking out their purchase items.

Illustrative Embodiment of the POS-Based Bar Code Reading System of the Present Invention Embodying a Light-Pipe Based Bar Code Read Indication Subsystem In FIGS. 24A through 25B, the POS-based bioptical laser scanning bar code reading system 11 illustrated in FIGS. 2 through 4B is shown with a light-pipe based bar code read indication subsystem 115 integrated into the top portion of its system housing. The primary purpose of this optical arrangement is to visually inform both the cashier and customer alike, of each instance that a scanned bar code read has been successfully scanned and decoded (i.e. read) during bar code symbol scanning operations, and to make such visual indications occur in an aesthetically pleasing, if not artistically beautiful manner, to the pleasure and enjoyment of retail customers at the POS checkout station.

The POS-based bioptical laser scanning bar code reading system 11 is specified in greater detail in copending application Ser. Nos. 10/045,577 filed Jan. 11, 2002 and 10/138,936 filed May 3, 2002, which are incorporated herein by reference in their entirety.

Figure 24A:
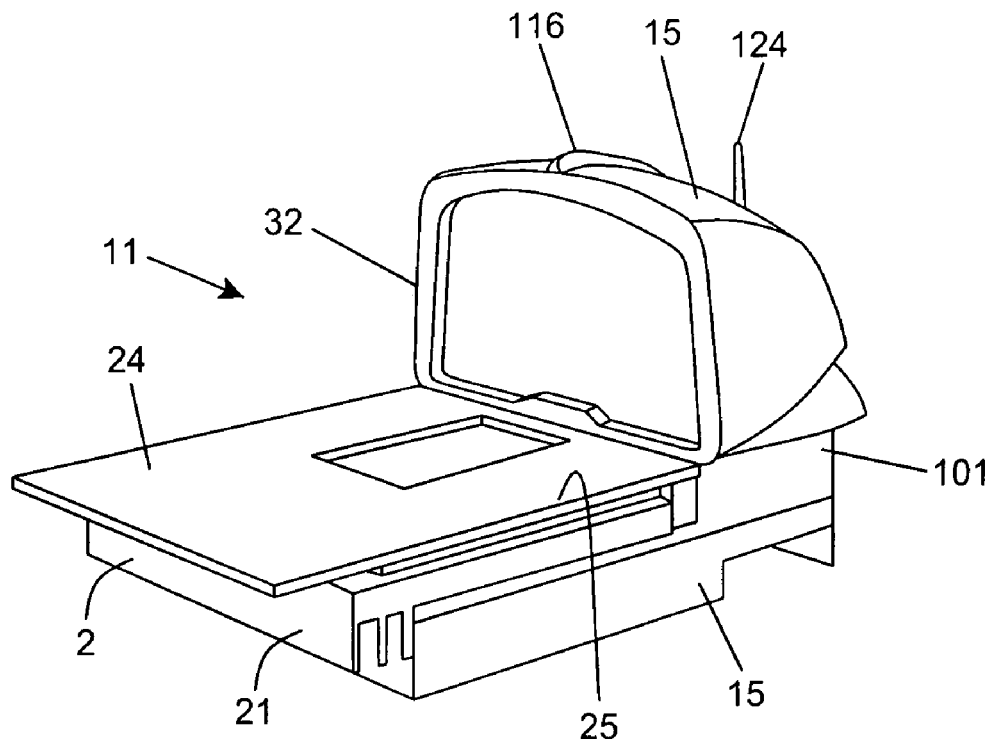
FIG. 24A is a first perspective of a POS-based bioptical laser scanning bar code reading system of the present invention, into which the light-pipe based bar code read indication subsystem is integrated in the top portion of the system housing so that both the cashier and customer, alike, are reliably informed of each instance a good bar code read occurs during bar code scanning operations.
Figure 24B:
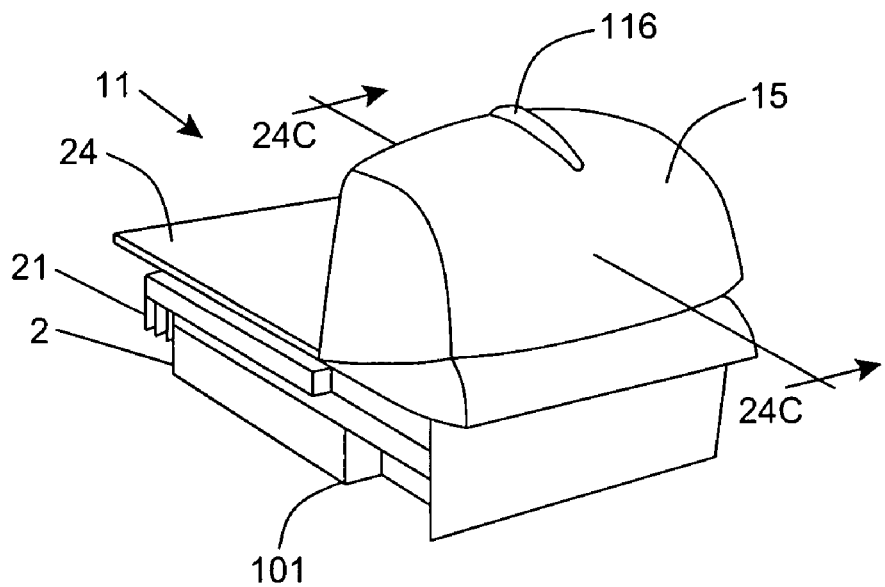
FIG. 24B is a second perspective the POS-based bioptical laser scanning bar code reading system of FIG. 23A, showing that the light-pipe structure of the present invention is embedded within the top surface of the system housing, and extending within the transverse plane of the bioptical scanning system, clearly visible to both the customer and cashier alike.

As best shown in FIG. 24B, the light-pipe structure 116 of this subsystem 115 is mounted within through a narrow elongated aperture 117 formed in the upper surface of the system housing, extending within the transverse plane of the bioptical scanning system. In the illustrative embodiment, the light-pipe structure 116 is about 60 millimeters (i.e. 4") in length, but could be longer or shorter in other alternative applications of the present invention. The light pipe structure 116 can be maintained in place about elongated aperture 117 by fasteners, adhesive, or other means known in the bar code scanner manufacturing art.

Figure 24C:
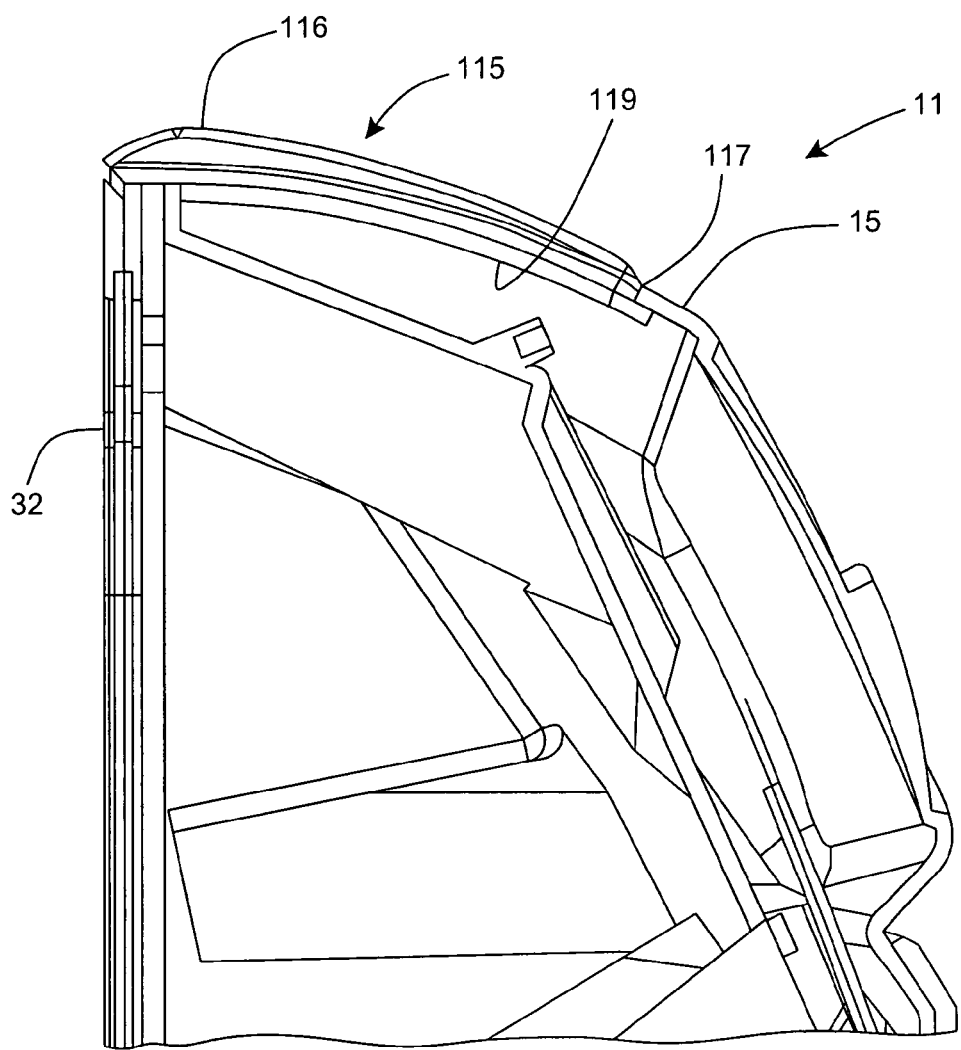
FIG. 24C is a cross-sectional view of the POS-based bioptical laser scanning bar code reading system of the present invention, taken along line 24C-24C in FIG. 23B, showing that the light pipe structure is illuminated from below the mounting aperture formed through the top portion of the system housing, by way of an array of light brightness LEDs mounted on a narrow PC board supporting LED driver circuitry powered from the power distribution system provided for within the system housing.
Figure 25A:
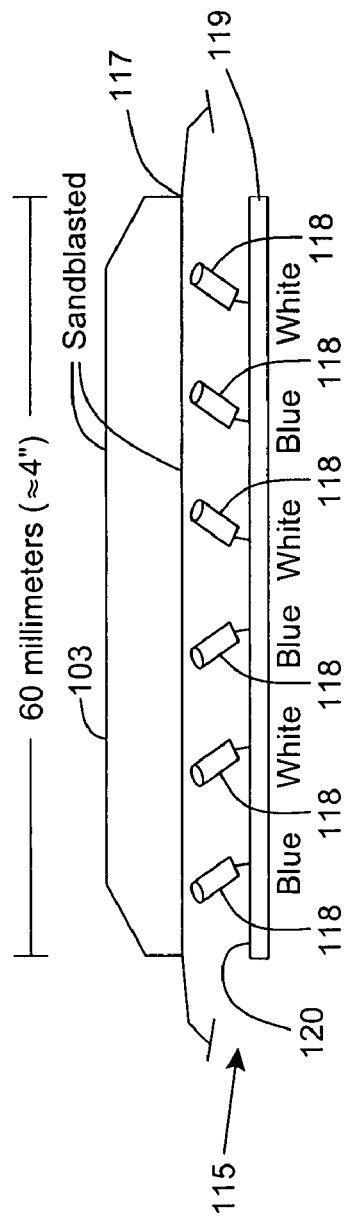
FIG. 25A is a close-enlarged view of the light pipe structure shown in FIG. 24C, illuminated from beneath by an array of alternately colored LEDs mounted on a LED driver board mounted to the underside of the system housing.

As shown in FIG. 24C, the light pipe structure 116 is illuminated from below the mounting aperture 117, by an array of six high-brightness LEDs 118 mounted on a narrow PC board 119 supporting LED driver circuitry 120, schematically depicted in detail in FIG. 25B. In the illustrative embodiment, LED driver circuitry 120 is powered from the power distribution system provided for within the system housing. In FIG. 25A, this arrangement is shown in greater detail, removed from the system housing into which this subassembly is mounted. The visible illumination emitted from the LEDs is injected through the bottom surface of the light pipe structure 116, reflects and scatters internally within the light pipe structure, and escapes at generally all surface points exposed external to the system housing so that both the cashier and customer alike can see the entire light pipe structure glow with bluish-white illumination upon each successful read of a scanned bar code symbol at the POS checkout station. Notably, the light pipe structure of the present invention is designed to minimize total internal reflection (or trapping) of inject light in order to maximize the light transmission efficiency, and thus brightness, of the light pipe structure during illumination.

Figure 25B:
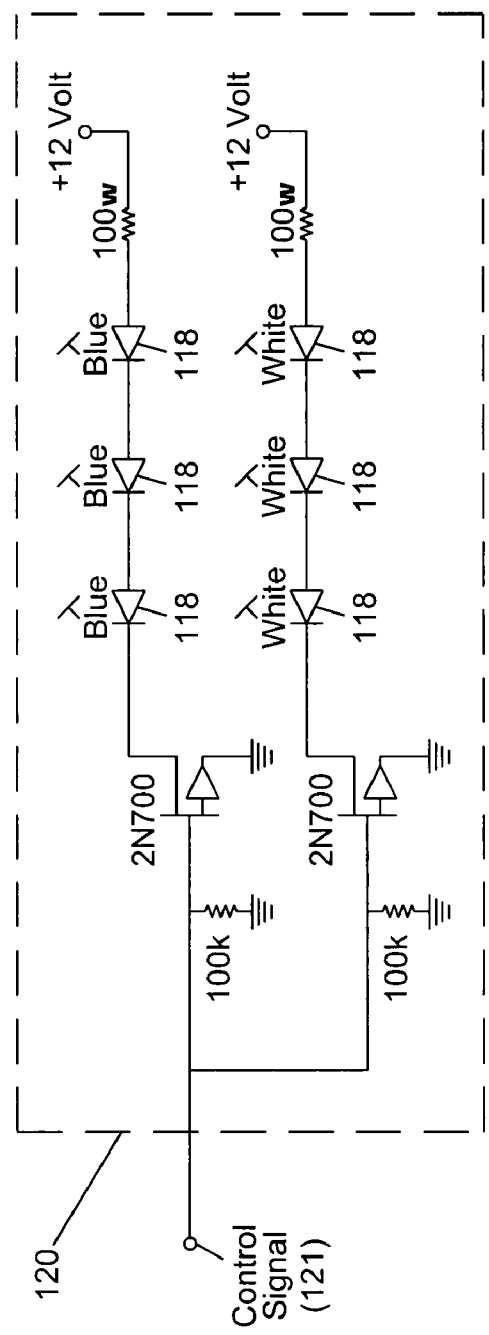
FIG. 25B is a schematic diagram for the LED-driven light-pipe bar code read indication subsystem shown in FIGS. 23A through 24C.

In FIG. 25B, the electrical circuit used in the LED-driven light-pipe bar code read indication subsystem is shown comprising: three "blue" light emitting diode (LEDs), connected in electrical series configuration with a 100 Ohm resister, and a current source formed by an FET configured with a 10 kiloOhm resistor, as shown, driven between 12 volts and electrical ground potential; and three "white" light emitting diode (LEDs), connected in electrical series configuration with a 100 Ohm resister, and a current source formed by an FET configured with a 10 kiloOhm resistor, as shown, driven between 12 volts and electrical ground potential. All of these electrical components are mounted on PC board 119, with the blue and white LEDs arranged in an sequentially alternating manner, as indicated in FIG. 25A. As shown, first consecutive triplet of LEDs 118 is oriented at a first angle off normal with respect to the planar input surface of light pipe structure 116, whereas the second consecutive triplet of LEDs 118 is oriented at a second angle off normal with respect to the planar input surface of light pipe structure 116. The PC board 119 in turn is mounted to the interior of the system housing, directly beneath the light pipe structure which can be fabricated from a light transmissive plastic material, either molded, or ground and polished to a suitable geometry required by the particular application at hand. In the illustrative embodiment, all surfaces of the light pipe structure 116 are sand-blasted so that incoming light rays from the LEDs are highly diffused as they are injected into the light pipe structure 116. Also, the outgoing light rays are further diffused as they exit the light pipe structure in a substantially isotropic manner. By virtue of such light diffusion, neither the customer nor the cashier can view the LEDs located beneath the light pipe structure 116.

In the preferred embodiment, it will be desirable to provide a vibration damping mechanism between the scale/bar code reader subsystem and the structures that support the customer kiosk terminal where vibrational energy and shock producing forces will be generated during normal operation. The function of the vibration damping mechanism will be to damp such forces and isolate the weigh scale subsystem therefrom to ensure accurate scale readings.

Notably, each submodule described above can be provided with a spring-biased hinge-type connector designed to establish the necessary electrical and physical connections between the module and the system housing, while enabling the module to (i) undergo controlled rotation about its hinge when struck by an outside force such as when the customer's hand or arm strikes the module during customer interaction, (ii) retract in a controlled manner, and (iii) automatically return to its original unretracted position. Such a module connector mechanism should reduce the risk of damage to the system and its subcomponents and possibly customers who might bump into the service modules during checkout operations.

As shown, an IrDA data communications port 120 is provided on the customer's side of the system below the LCD panel. The purpose of this IrDA communications port is to collect data (e.g. electronic coupon data) collected by an IrDA-enabled PDA used by the customer to collect electronic coupons in or outside of the retailer's store. During the retail transaction, the customer will be prompted by a particular service screen displayed on the LCD panel on the customer's side, to scan any bar coded coupons (or barcode ID card) using 1D/2D bar code reader 55 or transmit any electronic coupons to IrDA data communications port 120 which might be collected in the customer's IrDA-enabled PDA 122 in hand at the time of the retail transaction.

As shown in the system diagram of FIGS. 25C1 and 25C2, the light pipe based bar code read indication subsystem 115 is connected to the I/O interface 53 of the system, and is driven by a control signal 121 supplied to the input of the FETs. Notably, a control signal (e.g. 50 Volts) is generated under the control of the microprocessor 50 whenever a bar code symbol is successfully scanned and decoded (i.e. read). The generation of the control signal drives the LEDs in the circuit shown in FIG. 25B and causes the light pipe structure to conspicuously illuminate a bluish-white light along its entire surface. Such illumination indicates to both the cashier and customer that a scanned bar code symbol has been successfully decoded, and that the corresponding product and price information is being displayed on the terminal LCD panels before these parties to the retail transaction.

As shown in FIGS. 25C1 and 25C2, the system further comprises: a plurality of VLDs 43, light focusing optics 44, scanning motors 45, power regulation circuitry 46, and scanning optics (as part of Unit 91) for producing and scanning laser scanning beams so as to project a laser scanning pattern through the vertical scanning window 108 of the system, and scan bar codes on objects being moved thereby by the cashier, and light collection optics for collecting the focusing the return laser light signal for subsequent photodetection; a plurality of laser scan data generator and processing modules 47A, 47B and 47C, including a plurality of photodetectors, for producing scan data signals D0 through D3, that are ultimately decode-processed in order to produce symbol character data representative of the bar code symbol scanned by the system; a microprocessor 50, memory architecture 51, system bus architecture (having different levels of buses) 52 and an I/O interface 53 connected to such buses for enabling the collection, processing and transport of data elements generated by the various components in the system; cashier-transaction terminal 97 having LCD panel 98, keypad 99 and associated circuitry, for entering and processing information relating to (i) purchase items and (ii) customer information to enable a consumer transaction to be transacted at the system, and enable the opening of the electronically-controlled cash drawer 96 during the appropriate stage of the consumer transaction; customer-transaction terminal 103 (i.e. having LCD panel, keypad, magstripe reader, and associated circuitry); Internet-enabled customer-kiosk terminal (i.e. computer subsystem) 54 realized as a microcomputing system running an operating system (OS), networking software to support the TCP/IP protocol, Internet access software (e.g. Web browser software such as Microsoft Explorer) to access the WWW and other information resources on the Internet, and peripheral hardware and software components such as LCD panel 101, touch-screen keypad 102 mounted thereon, and a speech/voice recognition interface and a bar code symbol reader integrated with the microcomputing system; a voice-over-IP telephone handset 105 integrated with the microcomputing system, and having software components running thereon to support its voice communication functions over the Internet, or alternatively, over a Public Telecommunications Switching Network (PTSN) in a manner known in the art; a network interface controller (NIC) card 56 operably connected to system bus architecture 52, for enabling data packet communications over an packet-switched information network (e.g. Internet); an multiport Ethernet hub device 57 connected to the NIC card and the Internet-enabled customer-kiosk terminal 54, so that entire POS-based bar code reading system with internet-enabled customer-kiosk terminal 90 has one or more Ethernet data ports 55 for operable connection to a TCP/IP network such as a retail LAN which, in turn, is connected to the Internet; a LED-driven light-pipe based bar code read indication subsystem 115, mounted through the surface of the system housing, and being operably connected to the I/O interface 53, and controlled by microprocessor 50; a USB (or like) data communication port connector 101, operably connected to I/O interface 53, for interconnection with a matching USB connector associated with a hand-held 1D/2D bar code reader, or hand-held image-based 1D/2D bar code reader/OCR-enabled imager 102, for reading 1D and 2D bar code symbol structures (e.g. applied to identification cards, passports, shipping labels, etc.) as well as performing OCR processing on alphanumeric character strings printed on similar types of identification cards, shipping labels, forms, and the like in diverse end-user environments; a printer (i.e. thermal or dot-matrix type) 121 installed in the system housing on the customer side thereof for printing customer receipts for the various types of transactions supported by the system; IrDA data communications port 120 installed on the customer side of the system housing, preferably below the LCD panel on that side of the system, for enabling data communication between IrDA-enabled PDAs (122) or PDTs owned or used by the customer to collect electronic data associated with discount coupons, and other kinds of value-added services; and a 2-way RF transceiver 123 interfaced with the I/O subsystem, and a RF antenna structure 124 coupled to RF transceiver 123, enable the system to function as a RF base station in a retail information network (LAN) and support 2-way RF-based high-speed data communication between the base station and multiple wireless RF-based PDTs used by retailers' employees and customers alike in the retail store environment.

As described above, the interactive dual-LCD panel POS-based retail transaction terminal system, shown in FIGS. 2 through 8, supports various types of retail transactions. When using this interactive cashier/customer terminal system, both the customer and the cashier or sales clerk (i.e. retailer service personnel) are provided with their own color LCD panel, data entry devices and other peripheral-type transaction-supporting equipment necessary to support data entry and display operations on both the cashier and customer sides of the terminal system.

In the illustrative embodiments, microprocessor 50 within the system runs an interactive retail transaction application program stored in memory 51, shown in FIGS. 8A and 8B. Preferably, this interactive retail transaction application is rapidly developed by the retailer on a separate retailer development computer (i.e. PC) using an integrated development and development environment (IDE) like the one taught in copending application Ser. No. 10/342,441 filed Jan. 12, 2003, incorporated herein by reference, and then downloaded to memory 51 to run on microprocessor 50 during run-time or deployment operations within the retail store environment. Preferably, this IDE is used to develop and program the GUI screens sequentially displayed on the LCD panels of both the cashier and customer terminals in the system, in a manner choreographed according to a retailer's transaction or service script that is carried out by the application during the particular retail transaction. Notably, this IDE employs "WYSIWYG" type GUI display screen editors with simple "drag and drop" operation, visually-operated SQL database editors, and easy to use "event-driven" control logic editors to bind objects at the presentation layer of the system (i.e. within the GUI screens to objects at the database layer of the system (i.e. within the SQL database), occurring at the control layer of the system.

In general, the retailer transaction application will display GUI screens on the cashier's LCD panel s to prompt the cashier or sales clerk to particular forms of human interaction action required to support a specific kind of retail transactions desired by the hosting retailer. At the same time, the retail transaction application also generates corresponding GUI display screens on the customer's LCD panel prompting the customer to respond with appropriate responses and forms of human interactive to carry out the transaction and receive, if desired, particular kinds of services that create value and hopefully meaning in the lives of both the cashier and customer. Notably, within the constraints of the particular retail transaction, the retailer's transaction or service script (embodied within the retailer transaction application) will specify the various scenarios of cashier/customer interaction that the retailer would like to see be played out at the interactive terminal system, so that a particular (ideally unique) kind or brand of customer experience will be consistently delivered to each and every customer that passes through the POS-station, regardless of the level of intellectual and social skills possessed by the retail sales clerk/cashier or customer standing on the other side of the POS-based interactive kiosk terminal system of the present invention, hopefully making eye-to-eye contact with the sales clerk attempting to attend to the needs and wants of the customer, in effort to provide customer satisfaction, and loyalty.

In accordance with such inventive principles, the retailer's transaction or service script (specified by the retailer during application development) can be designed to bring about a particular kind and quality of behavioral interaction between both the cashier/salesclerk and the customer that creates and enhances the brand experience in the retail store, regardless of the fact that the store support high volumes of consumer traffic and offering products and services at discount prices. Such interaction is achieved by displaying GUI screens designed to guide these parties to the retail transaction so that a predetermined quality of customer service is delivered to the customer by the retail cashier/salesclerk at the retailer POS station. At the same time, the retailer's service script can be designed so that it permits a high degree of improvisation naturally demanded by customers and retail cashiers and clerks (i.e. retail service personnel). For example, the retailer's service script can also include the display of motivational and/or inspiring quotes and/or imagery on the LCD panels both the cashier and customer sides of the terminal system, so as to encourage positive attitudes, cordial responses and compassionate levels human interaction within the retail store, in effort to promote a sense of well being and pleasure at the POS-based terminal system.

Modifications

Notably, the light pipe structures 101 and 116 can be segmented into two or more smaller light pipe elements of different lengths, and illuminated by different colored LEDs and the like.

While the various embodiments of the laser scanning bar code reading subsystems employed in the systems of the present invention have been described in connection with linear (1-D) bar code symbol scanning applications, it should be clear, however, that the scanning apparatus and methods of the present invention are equally suited for scanning 2-D bar code symbols, as well as alphanumeric characters (e.g. textual information) in optical character recognition (OCR) applications, as well as scanning graphical images in graphical scanning arts. It is also understood that the bar code reading subsystems employed in the systems of the present invention can be realized as image-based bar code reading systems as taught in copending U.S. application Ser. No. 09/954,477 filed on Sep. 17, 2001 and International Application PCT/US01/44011 filed Nov. 21, 2001, published by WIPO as WO 02/43195 A2, incorporated herein by reference.

Several modifications to the illustrative embodiments have been described above. It is understood, however, that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A point of sale (POS) based code driven retail transaction system configured to enable the reading of code symbols on cashier and customer sides thereof, during a retail transaction being carried out at a point-of-sale (POS) station, said POS-based code driven retail transaction system comprising:

a housing for installation in or on a countertop surface at said POS station, and having surfaces defining a cashier's side, and a customer's side of said POS-based code driven retail transaction system;

a computer network installed within said housing;

a computing subsystem, disposed in said housing, and operably connected to said computer network, for running programs including a retail transaction application program;

a first code symbol reading unit integrated within said housing, operably connected to said computing system, and having a first scanning window for scanning code symbols on products passed through a first scanning region provided on said cashier's side;

a cashier terminal integrated with said housing on said cashier's side, connected to said computing subsystem, and having a first visual display panel and a first manual data entry device integrated within said housing on said cashier's side;

a second code symbol reading unit installed on said customer's side, connected to said computer subsystem, and having a second scanning window for scanning code symbols on objects passed through a second scanning region provided on said customer's side;

a customer terminal integrated with said housing, connected to said computer subsystem, arranged on said cashier's side, directly opposite said cashier terminal, and having a second visual display panel and second manual data entry device integrated with said housing on said customer's side, so that the cashier and customer are facing each other during a retail transaction conducted at said POS-based code driven retail transaction system;

wherein said first code symbol reading unit allows the cashier to read code symbols passed through said first scanning region, and said cashier terminal allows the cashier to enter data into said computing subsystem and display information on said first display panel;

wherein said second code symbol reading unit allows the consumer to read code symbols passed through said second scanning region, and said customer terminal allows the customer to enter data into said computing subsystem and display information on said second display panel, including price information associated with products that have been scanned by the cashier using said first code symbol reading unit; and wherein during the running of said retail transaction application program, said computing subsystem displays graphical user interface (GUI) screens on said first visual display panel to prompt said cashier to particular forms of action required to support said retail transaction, and said retail transaction application program generates GUI display screens on said second visual display panel prompting said customer to respond as required to carry out said retail transaction.

2. The POS-based code driven retail transaction terminal system of claim 1, wherein said first code reading unit comprises a laser scanning type bar code symbol reader.

3. The POS-based code driven retail transaction terminal system of claim 1, wherein said second code symbol reading unit comprises an imaging-type of bar code symbol reader for use by said customer.

4. The POS-based code driven retail transaction terminal system of claim 1, wherein said customer terminal displays advertisements or promotions on said second visual display panel while the cashier is not scanning products.

5. The POS-based code driven retail transaction terminal system of claim 1, wherein said customer terminal comprises an automated teller machine (ATM) module and a phone module integrated to said housing on said customer's side.

6. The POS-based code driven retail transaction terminal system of claim 1, wherein said computing subsystem has an operating system (OS), networking software to support transmission control protocol/internet protocol (TCP/IP), and information network access software to access the world wide web (WWW) and other information resources on a global information network.

7. The POS-based code driven retail transaction terminal system of claim 1, wherein said first visual display panel is realized as a first liquid crystal display (LCD) panel, and said second visual display panel is realized as a second liquid crystal display (LCD) panel.

8. The POS-based code symbol driven retail transaction terminal system of claim 7, wherein said first manual data entry device is realized as a first touch-screen keypad mounted on said second liquid crystal display (LCD) panel.

9. The POS-based code symbol driven retail transaction terminal system of claim 7, wherein said second manual data entry device is realized as a second touch-screen keypad mounted on said second liquid crystal display (LCD) panel.

10. The POS-based code driven retail transaction terminal system of claim 1, wherein said computing subsystem further comprises:
 a network interface controller operably connected to a system bus architecture, for enabling data packet communications over said computer network; and
 a multi-port Ethernet hub device connected to said network controller card and said customer terminal, so that said computing subsystem has one or more Ethernet data ports for operable connection to said communication network.

11. The POS-based code driven retail transaction terminal system of claim 1, wherein said cashier's side further includes an electronic produce scale integrated within a portion of said housing, for weighing produce and displaying a computed price on said first visual display panel.

12. The POS-based code driven retail transaction terminal system 1, wherein said customer terminal displays advertisements or promotions on said second visual display panel while the cashier is not scanning products.

13. The POS-based code driven retail transaction terminal system 1, wherein said code symbol includes 1D bar code symbol, 2D bar code symbols, and data matrix symbols.

* * * * *